(12) United States Patent
Kimura et al.

(10) Patent No.: US 8,568,836 B2
(45) Date of Patent: Oct. 29, 2013

(54) ORGANIC THIN FILM FORMING METHOD, AUXILIARY AGENT FOR FORMING AN ORGANIC THIN FILM, AND SOLUTION FOR FORMING AN ORGANIC THIN FILM

(75) Inventors: Nobuo Kimura, Naka-gun (JP); Yoshitaka Fujita, Ichihara (JP); Tomoya Hidaka, Ichihara (JP)

(73) Assignee: Nippon Soda Co., Ltd., Tokyo (JP)

( * ) Notice: Subject to any disclaimer, the term of this patent is extended or adjusted under 35 U.S.C. 154(b) by 853 days.

(21) Appl. No.: 11/658,108

(22) PCT Filed: Jul. 21, 2005

(86) PCT No.: PCT/JP2005/013376
§ 371 (c)(1),
(2), (4) Date: Sep. 19, 2007

(87) PCT Pub. No.: WO2006/009202
PCT Pub. Date: Jan. 26, 2006

(65) Prior Publication Data
US 2008/0213494 A1    Sep. 4, 2008

(30) Foreign Application Priority Data

Jul. 22, 2004 (JP) ................................ 2004-214174
Nov. 30, 2004 (JP) ................................ 2004-347439

(51) Int. Cl.
*B05D 1/18* (2006.01)
(52) U.S. Cl.
USPC ....................................................... 427/430.1
(58) Field of Classification Search
USPC ....................................................... 427/430.1
See application file for complete search history.

(56) References Cited

U.S. PATENT DOCUMENTS

| | | | |
|---|---|---|---|
| 4,999,249 A * | 3/1991 | Deschler et al. | 428/447 |
| 5,302,683 A * | 4/1994 | Weidner et al. | 528/21 |
| 5,798,144 A * | 8/1998 | Varanasi et al. | 427/384 |
| 5,907,013 A | 5/1999 | Ogawa | |
| 5,981,056 A | 11/1999 | Ogawa et al. | |
| 6,235,833 B1 | 5/2001 | Akamatsu et al. | |
| 7,422,642 B2 * | 9/2008 | Kimura et al. | 148/243 |
| 7,776,403 B2 * | 8/2010 | Kimura et al. | 427/407.1 |
| 2001/0019773 A1 * | 9/2001 | Akamatsu et al. | 428/429 |
| 2002/0127331 A1 | 9/2002 | Ogawa et al. | |

FOREIGN PATENT DOCUMENTS

| | | |
|---|---|---|
| JP | A-04-120082 | 4/1992 |
| JP | A-04-132637 | 5/1992 |
| JP | A-4-221630 | 8/1992 |
| JP | 04-367721 | 12/1992 |
| JP | A-4-367721 | 12/1992 |
| JP | A-07-068219 | 3/1995 |
| JP | A-08-012375 | 1/1996 |
| JP | A-08-120491 | 5/1996 |
| JP | A-08-215637 | 8/1996 |
| JP | A-8-337654 | 12/1996 |
| JP | 09-208438 | 8/1997 |
| JP | A-11-228942 | 8/1999 |
| JP | 11-322368 | 11/1999 |
| JP | 2000-053421 | 2/2000 |
| JP | A-2000-129247 | 5/2000 |
| JP | A-2004-002187 | 1/2004 |
| WO | WO 03/076064 A1 | 9/2003 |
| WO | WO 03076064 A1 * | 9/2003 |
| WO | WO 2004091810 A1 * | 10/2004 |

OTHER PUBLICATIONS

Ken Kojio et al., Novel Method to Prepare Organosilane Monolayers on Solid Substrate, Bull. Chem. Soc. Jpn., 74, 1397-1401 (2001).
Jan. 4, 2012 Notice of Allowance issued in Japanese Application No. 2009-137506 with English-language translation.

* cited by examiner

*Primary Examiner* — David Turocy
(74) *Attorney, Agent, or Firm* — Oliff & Berridge, PLC

(57) ABSTRACT

An organic thin film forming method for forming an organic thin film on a substrate surface comprising: contacting the substrate with a solution for forming an organic thin film obtained from an auxiliary agent for forming an organic thin film obtained by mixing a metal surfactant (1) having at least one hydrolytic group and a compound capable of interacting with the metal surfactant (1), and a metal surfactant (2) having at least one hydrolytic group, in an organic solvent, wherein a solution for forming an organic thin film is used in which the moisture content has been adjusted or maintained to be within a predetermined range; and, an auxiliary agent for forming an organic thin film and a solution for forming an organic thin film used in this method.

9 Claims, 3 Drawing Sheets

$2\theta\chi$

ORGANIC THIN FILM FORMING METHOD, AUXILIARY AGENT FOR FORMING AN ORGANIC THIN FILM, AND SOLUTION FOR FORMING AN ORGANIC THIN FILM

The present application is a 35 U.S.C. 371 national stage filing of International Application No. PCT/JP2005/013376, filed Jul. 21, 2005, which claims priority on Japanese Patent Application No. 2004-214174 filed on Jul. 22, 2004, and on Japanese Patent Application No. 2004-347439 filed on Nov. 30, 2004, the contents of which are incorporated herein by reference.

TECHNICAL FIELD

The present invention relates to an organic thin film forming method for forming an organic thin film on a substrate surface, an auxiliary agent for forming an organic thin film used in this forming method, and a solution for forming an organic thin film.

BACKGROUND ART

The modification of surfaces of substrates composed of glass, metal, plastic, ceramics and so forth has been carried out for any purpose in various fields in the prior art. For example, a fluorine-containing silane coupling agent has been coated onto a glass or plastic surface to impart water repellency and oil repellency thereto.

Examples of methods for forming a coating film for modifying a substrate surface are described in Patent documents 1 to 3, which disclose production methods of a chemically adsorbed film having high peeling resistance and transparency, and which does not impair the luster of the substrate surface or transparency of the substrate. However, the production methods of a chemically adsorbed film described in these publications had the problem of generating harmful chlorine gas during film production since a coated film is formed by a hydrochloric acid elimination reaction between a chlorosilane surfactant and active hydrogen on the substrate surface.

Methods for forming a chemically adsorbed film by a dealcohol reaction of an alkoxysilane surfactant. However, this method had the problem of the reaction rate of the dealcohol reaction being excessively slow, thereby preventing film formation from being carried out expediently.

In addition, although a method has been proposed for accelerating the dealcohol reaction by using a dealcohol catalyst, the addition of a dealcohol catalyst alone only ended up causing the surfactant to crosslink with itself due to moisture in the air, thereby inhibiting the reaction at the solid-liquid interface on the substrate surface, and making it difficult to efficiently form a unimolecular, chemically adsorbed film.

In order to solve these problems, Patent documents 4 proposes a method for forming a chemically adsorbed film covalently bonded by means of siloxane bonds by contacting a mixed solution containing at least an alkoxysilane surfactant, a non-aqueous solvent free of active hydrogen, and a silanol condensation catalyst with a substrate surface. Examples of the silanol condensation catalyst disclosed therein include at least one substance selected from the group consisting of a carboxylic acid metal salt, carboxylic acid ester metal salt, carboxylic acid metal salt polymer, carboxylic acid metal salt chelate, titanic acid ester, and titanic acid ester chelate.

In addition, a method in which an organic solvent solution of a silane surfactant is spread over the surface of a silicon wafer onto which has been dropped purified water to form a crystalline monolayer is known in Non-patent document 1 as an example of a method for forming a chemically adsorbed film having crystallinity on the surface of a substrate.

Moreover, methods for immobilizing a water repellent film composed of a unimolecular layer on a substrate surface via silanol groups using a monomer or polymer of a hydrolysis product of a fluoroalkyl group-containing silane compound hydrolyzed in the presence of an acid catalyst are known in Patent document 5.

However, these methods had problems consisting of film formation requiring a long period of time, and the silanol condensation catalyst inhibiting adsorption if film formation is carried out with the catalyst still present in the solution, thereby preventing the formation of a fine, monolayer. In addition, these methods had limitations on the type of substrate able to be used, and were unable to be used to form a crystalline chemically adsorbed film on a noncrystalline substrate.

Thus, there has been a desire for the development of a technology for rapidly forming a fine, monolayer having few impurities in fields such as fine patterning for the design of electrical devices in particular.

Patent document 1: Japanese Unexamined Patent Application, First Publication Nos. H4-132637
Patent document 2: Japanese Unexamined Patent Application, First Publication Nos. H4-221630
Patent document 3: Japanese Unexamined Patent Application, First Publication Nos. H4-367721
Patent document 4: Japanese Unexamined Patent Application, First Publication No. H8-337654
Patent document 5: Japanese Unexamined Patent Application, First Publication Nos. H11-228942
Patent document 6: Japanese Unexamined Patent Application, First Publication Nos. H11-322368
Non-patent document 1: Bull. Chem. Soc. Jpn., 74, 1397-1401 (2001)

DISCLOSURE OF THE INVENTION

In consideration of these circumstances, an object of the present invention is to provide an organic thin film forming method capable of rapidly forming a fine, monolayer having few impurities, and a solution for forming an organic thin film used in that forming method.

As a result of conducting extensive studies to solve the aforementioned problems, the inventors of the present invention found that a fine, monolayer (organic thin film) having few impurities can be rapidly formed on a substrate by preparing a solution for forming an organic thin film, obtained by adding a metal surfactant (2) having at least one hydrolytic group to an auxiliary agent for forming an organic thin film obtained by mixing a metal surfactant (1) having at least one hydrolytic group with a compound capable of interacting with the metal surfactant (1), and contacting this solution with a substrate after adjusting or maintaining the moisture content of this solution to within a predetermined range, and that the concentration of a hydroxyl group-containing compound, which is the hydrolysis product of the metal surfactant, present in an organic solvent solution is maintained within the range of 20 to 2000 ppm, thereby leading to completion of the present invention.

According to a first aspect of the present invention, an organic thin film forming method is provided described in any of (1) to (23) below.

(1) An organic thin film forming method for forming an organic thin film on a substrate surface comprising: contacting the substrate with a solution for forming an organic thin film obtained from an auxiliary agent for forming an organic thin film obtained by mixing a metal surfactant (1) having at least one hydrolytic group and a compound capable of interacting with the metal surfactant (1), and a metal surfactant (2) having at least one hydrolytic group, in an organic solvent; wherein, the solution for forming an organic thin film is used in which the moisture content has been adjusted or maintained to be within a predetermined range.

(2) The organic thin film forming method described in (1) above wherein, the auxiliary agent for forming an organic thin film is obtained by mixing the metal surfactant (1), the compound capable of interacting with the metal surfactant (1), and water in an organic solvent.

(3) The organic thin film forming method described in (1) or (2) above wherein, the compound capable of interacting with the metal surfactant (1) is at least one type of metal alkoxide or partial hydrolysis product of a metal alkoxide.

(4) The organic thin film forming method described in (3) above, wherein the metal of the metal alkoxide or the partial hydrolysis product of a metal alkoxide is at least one type selected from the group consisting of titanium, zirconium, aluminum, silicon, germanium, indium, tin, tantalum, zinc, tungsten and lead.

(5) The organic thin film forming method described in any of (1) to (4) above, wherein the auxiliary agent for forming an organic thin film contains 0.5 to 2.0 moles of the metal surfactant (1) to 1 mole of the compound capable of interacting with the metal surfactant (1).

(6) The organic thin film forming method described in any of (1) to (4) above, wherein the auxiliary agent for forming an organic thin film contains 0.8 to 1.5 moles of the metal surfactant (1) to 1 mole of the compound capable of interacting with the metal surfactant (1).

(7) The organic thin film forming method according to any of (1) to (6) above, wherein the metal surfactant (1) is a compound represented by formula (I):

$$R^1_n M X_{m-n} \tag{I}$$

(wherein, $R^1$ represents an optionally substituted hydrocarbon group having 10 to 30 carbon atoms, an optionally substituted halogenated hydrocarbon group having 10 to 30 carbon atoms, a hydrocarbon group containing a linking group, or a halogenated hydrocarbon group containing a linking group, M represents at least one type of metal atom selected from the group consisting of a silicon atom, germanium atom, tin atom, titanium atom and zirconium atom, X represents a hydroxyl group or a hydrolytic group, m represents the valence of M, n represents a positive integer from 1 to (m−1), $R^1$ may be the same or different when n is 2 or more, and X may be the same or different when (m−n) is 2 or more).

(8) The organic thin film forming method described in (7) above, wherein the compound represented by the formula (I) is a compound represented by formula (II)

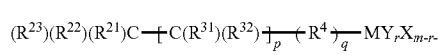
(II)

(wherein, M, X and m are the same as previously defined, $R^{21}$-$R^{23}$, $R^{31}$ and $R^{32}$ respectively and independently represent a hydrogen atom or fluorine atom, $R^4$ represents an alkylene group, vinylene group, ethynylene group, arylene group or divalent linking group containing a silicon atom and/or oxygen atom, Y represents a hydrogen atom, alkyl group, alkoxy group, fluorine-containing alkyl group or fluorine-containing alkoxy group, p represents or a natural number, q represents 0 or 1, the group represented by the formula $C(R^{31})(R^{32})$ may be the same or different when p is 2 or more, r represents 0 or a positive integer from 1 to (m−2), Y may be the same or different when r is 2 or more, and X may be the same or different when (m−r−1) is 2 or more, provided that at least one of Y and X is a hydroxyl group or hydrolytic group).

(9) The organic thin film forming method described in any of (1) to (8) above, wherein the metal surfactant (2) is a compound represented by formula (III):

$$R^{11}_{n1} M^1 X^1_{m1-n1} \tag{III}$$

(wherein, $R^{11}$ represents an optionally substituted hydrocarbon group, an optionally substituted halogenated hydrocarbon group, a hydrocarbon group containing a linking group, or a halogenated hydrocarbon group containing a linking group, $M^1$ represents at least one type of metal atom selected from the group consisting of a silicon atom, germanium atom, tin atom, titanium atom and zirconium atom, $X^1$ represents a hydroxyl group or a hydrolytic group, $m^1$ represents the valence of M, $n^1$ represents a positive integer from 1 to ($m^1$−1), $R^{11}$ may be the same or different when $n^1$ is 2 or more, and $X^1$ may be the same or different when ($m^1$−$n^1$) is 2 or more).

(10) The organic thin film forming method described in (9) above, wherein the compound represented by formula (III) above is a compound represented by formula (IV):

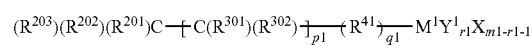
(IV)

(wherein, $M^1$, $X^1$ and $m^1$ are the same as previously defined, $R^{201}$~$R^{203}$, $R^{301}$ and $R^{302}$ respectively and independently represent a hydrogen atom or fluorine atom, $R^{41}$ represents an alkylene group, vinylene group, ethynylene group, arylene group or divalent linking group containing a silicon atom and/or oxygen atom, $Y^1$ represents a hydrogen atom, alkyl group, alkoxy group, fluorine-containing alkyl group or fluorine-containing alkoxy group, $p^1$ represents 0 or a natural number, $q^1$ represents 0 or 1, the group represented by the formula $C(R^{301})(R^{302})$ may be the same or different when $p^1$ is 2 or more, $r^1$ represents 0 or a positive integer from 1 to ($m^1$−2), $Y^1$ may be the same or different when $r^1$ is 2 or more, and $X^1$ may be the same or different when ($m^1$−$r^1$−1) is 2 or more, provided that at least one of $Y^1$ and $X^1$ is a hydroxyl group or hydrolytic group).

(11) The organic thin film forming method described in any of (1) to (10) above, wherein the organic thin film is water-repellent and oil-repellent before being exposed to light.

(12) The organic thin film forming method described in any of (1) to (11) above, wherein the organic thin film has a water contact angle of 80° or more and toluene contact angle of 20° or more before being exposed to light.

(13) The organic thin film forming method described in any of (1) to (12) above, wherein the hydrolytic group is an alkoxy group or an acyloxy group having 1 to 4 carbon atoms.

(14) The organic thin film forming method according to any of (1) to (13) above, wherein the auxiliary agent for forming an organic thin film is used such that the solid content in the auxiliary agent for forming an organic thin film in terms of the number of moles as oxide is 0.001 to 1 mole to 1 mole of the metal surfactant (2).

(15) The organic thin film forming method according to any of (1) to (14) above, wherein the step in which the solution for forming an organic thin film is contacted with the substrate is a step in which the substrate is immersed in the solution for forming an organic thin film.

(16) The organic thin film forming method according to any of (1) to (15) above, wherein the moisture content of the solution for forming an organic thin film is adjusted or maintained to within a predetermined range by providing an aqueous layer in contact with the solution for forming an organic thin film, placing in the presence of a moisture-retaining substance while containing water, or blowing in a gas containing moisture.

(17) The organic thin film forming method described in any of (1) to (16) above, wherein the moisture content of the solution for forming an organic thin film is 50 to 1000 ppm.

(18) The organic thin film forming method described in any of (1) to (17) above, wherein the organic solvent is a hydrocarbon solvent or a fluorocarbon solvent.

(19) The organic thin film forming method described in any of (1) to (18) above, wherein a substrate having active hydrogen on the surface thereof is used for the substrate.

(20) The organic thin film forming method described in any of (1) to (19) above, wherein a substrate composed of at least one type selected from the group consisting of metal, ceramics, glass and plastic is used for the substrate.

(21) The organic thin film forming method described in any of (1) to (20) above, wherein the organic thin film is formed in the form of a chemically adsorbed film.

(22) The organic thin film forming method described in any of (1) to (20) above, wherein the organic thin film is formed in the form of a self-assembly monolayer.

(23) The organic thin film forming method described in any of (1) to (22) above, wherein the organic thin film is formed in the form of a monolayer.

According to a second aspect of the present invention, an auxiliary agent for forming an organic thin film is provided as described in any of (24) to (35) below.

(24) An auxiliary agent for forming an organic thin film obtained by mixing in an organic solvent a metal surfactant (1) having at least one hydrolytic group, and a compound capable of interacting with the metal surfactant (1).

(25) The auxiliary agent for forming an organic thin film described in (24) above, wherein the metal surfactant (1) is used at 0.5 to 2.0 moles to 1 mole of the compound capable of interacting with the metal surfactant (1).

(26) The auxiliary agent for forming an organic thin film described in (24) above, wherein the metal surfactant (1) is used at 0.8 to 1.5 moles to 1 mole of the compound capable of interacting with the metal surfactant (1).

(27) The auxiliary agent for forming an organic thin film described in any of (24) to (26), wherein the compound capable of interacting with the metal surfactant (1) is at least one type of metal alkoxide or a partial hydrolysis product of a metal alkoxide.

(28) The auxiliary agent for forming an organic thin film described in any of (24) to (27) above, wherein the metal of the metal alkoxide or the partial hydrolysis product of a metal alkoxide is at least one type selected from the group consisting of titanium, zirconium, aluminum, silicon, germanium, indium, tin, tantalum, zinc, tungsten and lead.

(29) The auxiliary agent for forming an organic thin film described in any of (24) to (28) above, wherein the metal surfactant (1) is a compound represented by formula (I):

(wherein, $R^1$ represents an optionally substituted hydrocarbon group having 10 to 30 carbon atoms, an optionally substituted halogenated hydrocarbon group having 10 to 30 carbon atoms, a hydrocarbon group containing a linking group, or a halogenated hydrocarbon group containing a linking group, M represents at least one type of metal atom selected from the group consisting of a silicon atom, germanium atom, tin atom, titanium atom and zirconium atom, X represents a hydroxyl group or a hydrolytic group, m represents the valence of M, n represents a positive integer from 1 to (m−1), $R^1$ may be the same or different when n is 2 or more, and X may be the same or different when (m−n) is 2 or more).

(30) The auxiliary agent for forming an organic thin film described in (29) above, wherein the compound represented by the formula (I) is a compound represented by formula (II):

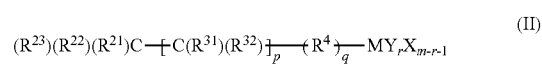

(wherein, M, X and m are the same as previously defined, $R^{21}$-$R^{23}$, $R^{31}$ and $R^{32}$ respectively and independently represent a hydrogen atom or fluorine atom, $R^4$ represents an alkylene group, vinylene group, ethynylene group, arylene group or divalent linking group containing a silicon atom and/or oxygen atom, Y represents a hydrogen atom, alkyl group, alkoxy group, fluorine-containing alkyl group or fluorine-containing alkoxy group, p represents 0 or a natural number, q represents 0 or 1, the group represented by the formula $C(R^{31})(R^{32})$ may be the same or different when p is 2 or more, r represents 0 or a positive integer from 1 to (m−2), Y may be the same or different when r is 2 or more, and X may be the same or different when (m−r−1) is 2 or more, provided that at least one of Y and X is a hydroxyl group or hydrolytic group).

(31) The auxiliary agent for forming an organic thin film described in any of (24) to (30) above, wherein the hydrolytic group is an alkoxy group or an acyloxy group having 1 to 4 carbon atoms.

(32) The auxiliary agent for forming an organic thin film described in any of (24) to (31) above, wherein the organic solvent is a hydrocarbon solvent or a fluorocarbon solvent.

(33) The auxiliary agent for forming an organic thin film described in any of (24) to (32) above, wherein the organic thin film is formed in the form of a chemically adsorbed film.

(34) The auxiliary agent for forming an organic thin film described in any of (24) to (32) above, wherein the organic thin film is formed in the form of a self-assembly monolayer.

(35) The auxiliary agent for forming an organic thin film described in any of (24) to (34) above, wherein the organic thin film is formed in the form of a monolayer.

According to a third aspect of the present invention, a solution for forming an organic thin film is provided which is obtained by mixing the auxiliary agent for forming an organic thin film described in any of (24) to (35) above and a metal surfactant (2) having at least one hydrolytic group; wherein, the solution is prepared by adjusting or maintaining the moisture content of the solution to be within a predetermined range.

According to a fourth aspect of the present invention, an organic thin film forming method is provided as described in any of (36) to (63) below.

(36) An organic thin film forming method comprising: forming an organic thin film on the surface of a substrate by contacting the substrate with an organic solvent solution obtained by mixing a metal surfactant having at least one hydrolytic group and a catalyst capable of interacting with the surfactant; wherein, the organic solvent solution contains a predetermined amount of moisture, and contains 20 to 2000 ppm of a hydroxide group-containing compound which is the hydrolysis product of the metal surfactant.

(37) The organic thin film forming method described in (36) above, wherein the metal surfactant having at least one hydrolytic group is a compound represented by formula (V):

$$R^{100}{}_n MX_{m-n} \qquad (V)$$

(wherein, $R^{100}$ represents an optionally substituted hydrocarbon group, an optionally substituted halogenated hydrocarbon group, a hydrocarbon group containing a linking group, or a halogenated hydrocarbon group containing a linking group, M represents at least one type of metal atom selected from the group consisting of a silicon atom, germanium atom, tin atom, titanium atom and zirconium atom, X represents a hydrolytic group, n represents an integer from 1 to (m−1), m represents the valence of M, $R^{100}$ may be the same or different when n is 2 or more, and X may be the same or different when (m−n) is 2 or more).

(38) The organic thin film forming method described in (37) above, wherein the hydrolytic group represented by X is a $C_1$-$C_6$ alkoxy group or acyloxy group.

(39) The organic thin film forming method described in any of (36) to (38) above, wherein the hydroxide group-containing compound is a compound represented by formula (VI):

$$R^{100}{}_n MX_{m-n-1}(OH) \qquad (VI)$$

(wherein, $R^{100}$ represents an optionally substituted hydrocarbon group, an optionally substituted halogenated hydrocarbon group, a hydrocarbon group containing a linking group, or a halogenated hydrocarbon group containing a linking group, M represents at least one type of metal atom selected from the group consisting of a silicon atom, germanium atom, tin atom, titanium atom and zirconium atom, X represents a hydrolytic group, n represents an integer from 1 to (m−1), m represents the valence of M, $R^{100}$ may be the same or different when n is 2 or more, and X may be the same or different when (m−n−1) is 2 or more).

(40) An organic thin film forming method comprising: forming an organic thin film on the surface of a substrate by contacting the substrate with an organic solvent solution containing 20 to 2000 ppm of a hydroxide group-containing compound represented by formula (VI):

$$R^{100}{}_n MX_{m-n-1}(OH) \qquad (VI)$$

(wherein, $R^{100}$ represents an optionally substituted hydrocarbon group, an optionally substituted halogenated hydrocarbon group, a hydrocarbon group containing a linking group, or a halogenated hydrocarbon group containing a linking group, M represents at least one type of metal atom selected from the group consisting of a silicon atom, germanium atom, tin atom, titanium atom and zirconium atom, X represents a hydrolytic group, n represents an integer from 1 to (m−1), m represents the valence of M, $R^{100}$ may be the same or different when n is 2 or more, and X may be the same or different when (m−n−1) is 2 or more).

(41) The organic thin film forming method described in any of (37) to (40) above, wherein the M is a silicon atom.

(42) The organic thin film forming method described in any of (36) to (41) above, wherein the moisture content of the organic solvent solution is within the range of 50 to 1000 ppm.

(43) The organic thin film forming method described in any of (36) to (42) above, wherein the catalyst capable of interacting with the metal surfactant is at least one type selected from the group consisting of a metal oxide, metal alkoxide, partial hydrolysis product of a metal alkoxide, silanol condensation catalyst and acid catalyst.

(44) The organic thin film forming method described in (43) above, wherein the partial hydrolysis product of a metal alkoxide has the property of stably dispersing without aggregating in the absence of an acid, base and/or dispersion stabilizer in an organic solvent.

(45) The organic thin film forming method described in (43) or (44) above, wherein the partial hydrolysis product of a metal alkoxide is obtained by hydrolyzing within a range of −100° C. to the reflux temperature of the organic solvent using less than 0.5 to 2.0 moles of water based on the amount of metal alkoxide in an organic solvent.

(46) The organic thin film forming method described in any of (43) to (45) above, wherein the metal in the metal oxide, metal alkoxide or partial hydrolysis product of a metal alkoxide is at least one type selected from the group consisting of titanium, zirconium, aluminum, silicon, germanium, indium, tin, tantalum, zinc, tungsten and lead.

(47) The organic thin film forming method described in any of (36) to (46) above, having a step (A) for immersing the substrate in the organic solvent solution.

(48) The organic thin film forming method described in (47) above, having a step (B) for washing the substrate after the step (A).

(49) The organic thin film forming method described in (47) above, having a step (C) for heating the substrate after the step (A).

(50) The organic thin film forming method described in (49) above, further having a step (B) for washing the substrate after the step (A) and before the step (C).

(51) The organic thin film forming method described in any of (36) to (50) above, wherein two or more substrates are repeatedly contacted using the same solution while maintaining the moisture content of the organic solvent solution within a predetermined range.

(52) The organic thin film forming method described in (51) above, wherein the moisture content of the organic solvent solution is maintained within the range of 50 to 1000 ppm.

(53) The organic thin film forming method described in (51) or (52) above, wherein the moisture content of the organic solvent solution is made to be or maintained within a predetermined range by providing an aqueous layer contacting a layer of the organic solvent solution.

(54) The organic thin film forming method described in (51) or (52) above, wherein the moisture content of the organic solvent solution is made to be or maintained within a predetermined range by additionally placing a moisture-retaining substance in the organic solvent solution in the state of containing water.

(55) The organic thin film forming method described in (54) above, wherein the moisture-retaining substance is a glass fiber filter or a cellulose filter.

(56) The organic thin film forming method described in (51) or (52) above, wherein the moisture content of the organic solvent solution is made to be or maintained within a predetermined range by blowing a gas containing moisture into the organic solvent solution.

(57) The organic thin film forming method described in any of (36) to (56) above, wherein the organic solvent solution is a hydrocarbon solvent solution.

(58) The organic thin film forming method described in any of (36) to (57) above, wherein a crystalline organic thin film is formed.

(59) The organic thin film forming method described in any of (36) to (58) above, wherein an organic thin film is formed in the form of a monolayer.
(60) The organic thin film forming method described in any of (36) to (59) above, wherein an organic thin film is formed in the form of a chemically adsorbed film.
(61) The organic thin film forming method described in any of (36) to (60) above, wherein an organic thin film is formed in the form of a self-assembly monolayer.
(62) The organic thin film forming method described in any of (36) to (61), wherein a substrate containing active hydrogen on the surface thereof is used for the substrate.
(63) The organic thin film forming method described in any of (36) to (62) above, wherein a substrate composed from at least one material selected from the group consisting of glass, silicon wafer, ceramics, metal and plastic is used for the substrate.

According to a fifth aspect of the present invention, a solution for forming an organic thin film is provided described in any of (64) to (69) below.
(64) A solution for forming an organic thin film obtained by mixing a metal surfactant having at least one hydrolytic group and a catalyst capable of interacting with the metal surfactant; wherein, the solution contains a predetermined amount of moisture, and contains 20 to 2000 ppm of a hydroxide group-containing compound which is a hydrolysis product of the metal surfactant.
(65) The solution for forming an organic thin film described in (64) above, wherein the metal surfactant having at least one hydrolytic group is a compound represented by formula (V):

$$R^{100}{}_n MX_{m-n} \qquad (V)$$

(wherein, $R^{100}$ represents an optionally substituted hydrocarbon group, an optionally substituted halogenated hydrocarbon group, a hydrocarbon group containing a linking group, or a halogenated hydrocarbon group containing a linking group, M represents at least one type of metal atom selected from the group consisting of a silicon atom, germanium atom, tin atom, titanium atom and zirconium atom, X represents a hydrolytic group, n represents an integer from 1 to (m−1), m represents the valence of M, $R^{100}$ may be the same or different when n is 2 or more, and X may be the same or different when (m−n) is 2 or more).
(66) The solution for forming an organic thin film described in (65) above, wherein the hydrolytic group represented by X is a $C_1$-$C_6$ alkoxy group or acyloxy group.
(67) The solution for forming an organic thin film described in (65) or (66) above, wherein the hydroxide group-containing compound is a compound represented by formula (VI):

$$R^{100}{}_n MX_{m-n-1}(OH) \qquad (VI)$$

(wherein, $R^{100}$ represents an optionally substituted hydrocarbon group, an optionally substituted halogenated hydrocarbon group, a hydrocarbon group containing a linking group, or a halogenated hydrocarbon group containing a linking group, M represents at least one type of metal atom selected from the group consisting of a silicon atom, germanium atom, tin atom, titanium atom and zirconium atom, X represents a hydrolytic group, n represents an integer from 1 to (m−1), m represents the valence of M, $R^{100}$ may be the same or different when n is 2 or more, and X may be the same or different when (m−n−1) is 2 or more).
(68) The solution for forming an organic thin film described in any of (65) to (67) above, wherein the M is a silicon atom.
(69) The solution for forming an organic thin film described in any of (64) to (68) above used in the thin film organic film forming method described in any of (36) to (63) above.

EFFECTS OF THE INVENTION

According to the organic thin film forming method of the present invention, a fine monolayer (organic thin film) having few impurities can be rapidly formed on a substrate composed of various materials.

According to the organic thin film forming method of the present invention, a fine, uniform organic thin film can be repeatedly formed two times or more using the same solution.

The organic thin film forming method of the present invention can be preferably applied to the formation of a design pattern of electrical devices and so forth of equipment requiring heat-resistant, weather-resistant and wear-resistant ultra-thin film coatings such as electrical products, automobiles, industrial equipment, mirrors and eyeglass lenses.

A fine, monolayer (organic thin film) having few impurities can be rapidly formed on a substrate composed of various materials by using the auxiliary agent for forming an organic thin film of the present invention.

The solution for forming an organic thin film of the present invention can be preferably used in the organic thin film forming method of the present invention. According to the solution for forming an organic thin film of the present invention, a fine self-assembly monolayer having few impurities or an adsorbed film, which is unimolecular and uniform, and has superior adhesion and high crystallinity even on a noncrystalline substrate, regardless of the material of the substrate or the presence or absence of crystallinity of the substrate, can be formed.

BEST MODE FOR CARRYING OUT THE INVENTION

Figure 1:
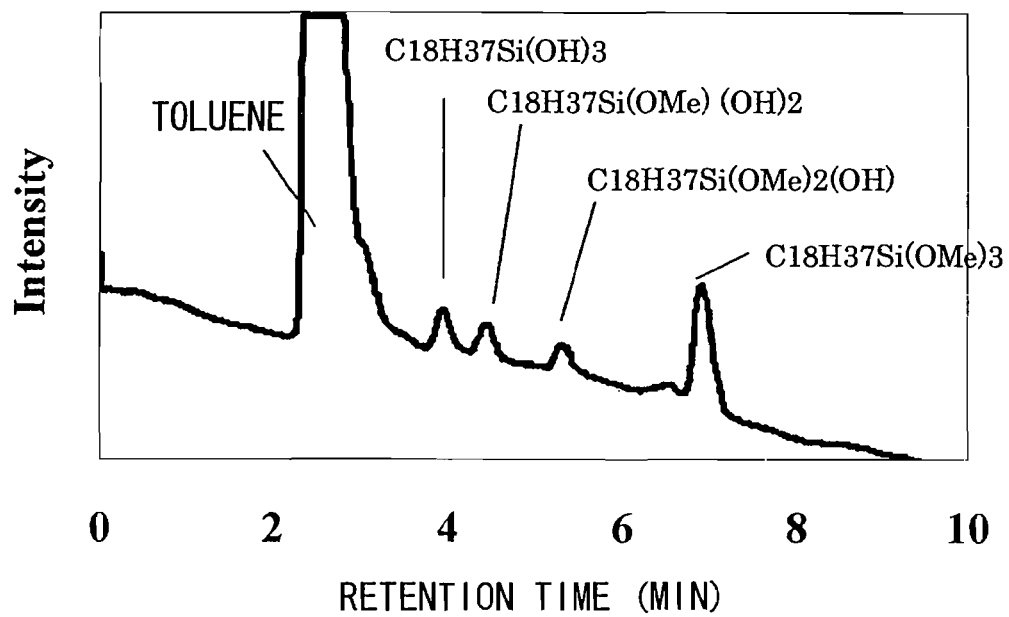
FIG. 1 is a graph showing the separation curve of a standard 1 obtained by HPLC.

The following provides a detailed explanation of the present invention.

(Organic Thin Film Forming Method)

The organic thin film forming method of the present invention forms an organic thin film on the surface of a substrate by a process in which the substrate is contacted with a solution for forming an organic thin film obtained by adding a metal surfactant (2) having at least one hydrolytic group to an auxiliary agent for forming an organic thin film obtained by mixing a metal surfactant (1) having at least one hydrolytic group with a compound capable of interacting with the metal surfactant (1); wherein, a solution for forming an organic thin film is used in which the moisture content has been adjusted or maintained so as to be within a predetermined range.

(1) Metal Surfactant (1) and Metal Surfactant (2)

There are no particular limitations on the metal surfactant (1) and the metal surfactant (2) used in the present invention provided they have at least one functional group able to be hydrolyzed, and a hydrophilic site and a hydrophobic site within a molecule thereof.

One or more types of a compound represented by the aforementioned formula (I) are preferably used for the metal surfactant (1), while one or more types of a compound represented by the aforementioned formula (III) are preferably used for the metal surfactant (2).

In formula (I), $R^1$ represents an optionally substituted hydrocarbon group having 10 to 30 carbon atoms, an optionally substituted halogenated hydrocarbon group having 10 to 30 carbon atoms, a hydrocarbon group containing a linking group, or a halogenated hydrocarbon group containing a linking group. In addition, in formula (III), $R^{11}$ represents an optionally substituted hydrocarbon group, an optionally substituted halogenated hydrocarbon group, a hydrocarbon group containing a linking group, or a halogenated hydrocarbon group containing a linking group.

Examples of an optionally substituted hydrocarbon group represented by $R^1$ include alkyl groups having 10 to 30 carbon atoms such as an n-decyl group or n-octadecyl group; alkenyl groups having 10 to 30 carbon atoms such as an n-decenyl group or n-octadecenyl group; and, aryl groups having 10 to 30 carbon atoms such as a 1-napthyl group or 2-naphthyl group.

Examples of an optionally substituted hydrocarbon group represented by $R^{11}$ include alkyl groups having 1 to 30 carbon atoms such as a methyl group, ethyl group, n-propyl group, isopropyl group, n-butyl group, isobutyl group, sec-butyl group, t-butyl group, n-pentyl group, isopentyl group, neopentyl group, t-pentyl group, n-hexyl group, isohexyl group, n-heptyl group, n-octyl group or n-decyl group; alkenyl groups having 2 to 30 carbon atoms such as a vinyl group, propenyl group, butenyl group or pentenyl group; and, aryl groups such as a phenyl group or naphthyl group.

Examples of an optionally substituted halogenated hydrocarbon group represented by $R^1$ include halogenated alkyl groups having 10 to 30 carbon atoms, halogenated alkenyl groups having 10 to 30 carbon atoms, and halogenated aryl groups having 10 to 30 carbon atoms. Among these, groups in which two or more of the hydrogen atoms in an alkyl group having 10 to 30 carbon atoms are substituted with halogen atoms are preferable, while fluorinated alkyl groups in which two or more of the hydrogen atoms of an alkyl group having 10 to 30 carbon atoms are substituted with fluorine atoms are more preferable.

Examples of an optionally substituted halogenated hydrocarbon group represented by $R^{11}$ include halogenated alkyl groups having 1 to 30 carbon atoms, halogenated alkenyl groups having 2 to 30 carbon atoms, and halogenated aryl groups. More specifically, examples include groups in which one or more of the hydrogen atoms in the hydrocarbon group are substituted with a halogen atom such as a fluorine atom, chlorine atom or bromine atom. Among these, groups in which two or more of the hydrogen atoms of an alkyl group having 1 to 30 carbon atoms are substituted with halogen atoms are preferable, while fluorinated alkyl groups in which two or more of the hydrogen atoms of an alkyl group having 1 to 30 carbon atoms are substituted with fluorine atoms are more preferable. In addition, in the case the fluorinated alkyl group has a branched structure, the branched portion has 1 to 4 carbon atoms and preferably is a short chain having 1 to 2 carbon atoms.

Groups in which one or more fluorine atoms are bonded to a terminal carbon atom are preferable, groups having a $CF_3$ group portion in which three fluorine atoms are bonded to a terminal carbon atom are more preferable, and groups having a perfluoroalkyl group in which all of the hydrogen atoms of the alkyl group are substituted with fluorine atoms on a terminal portion, and an alkylene group represented by $-(CH_2)_h-$ (wherein, h represents an integer of 1 to 29) between metal atoms M to be described later are particularly preferable for the fluorinated alkyl group represented by $R^1$ and $R^{11}$.

The number of fluorine atoms in the fluorinated alkyl group is preferably 60% or more and more preferably 80% or more when represented by [(number of fluorine atoms in fluorinated alkyl group)/(number of hydrogen atoms present in an alkyl group having the same number of carbon atoms corresponding to the fluorinated alkyl group)×100].

Examples of an optionally substituted hydrocarbon group or optionally substituted halogenated hydrocarbon group represented by $R^1$ and $R^{11}$ include carboxyl groups, amide groups, imide groups, ester groups, alkoxy groups such as a methoxy group or ethoxy group, and hydroxyl groups. The number of substituents thereof is preferably from 0 to 3.

Specific examples of a hydrocarbon group having a linking group represented by $R^1$ and $R^{11}$ are the same as the examples of optionally substituted hydrocarbon groups.

In addition, specific examples of a halogenated hydrocarbon group having a linking group represented by $R^1$ and $R^{11}$ are the same as the examples of optionally substituted halogenated hydrocarbon groups.

The linking group is preferably present between a carbon-carbon bond of the hydrocarbon group or halogenated hydrocarbon group, or between a carbon of a hydrocarbon group and a metal atom M to be described later.

Specific examples of linking groups include $-O-$, $-S-$, $-SO_2-$, $-CO-$, $-C(=O)O-$, and $-C(=O)NR^{51}$ (wherein, $R^{51}$ represents a hydrogen atom or alkyl group such as a methyl group, ethyl group, n-propyl group or isopropyl group).

Among these, from the viewpoints of water repellency and durability, $R^1$ is preferably an alkyl group having 10 or more carbon atoms, a fluorinated alkyl group having 10 to 30 carbon atoms, or a fluorinated alkyl group containing a linking group, while $R^{11}$ is preferably an alkyl group having 1 to 30 carbon atoms, a fluorinated alkyl group having 1 to 30 carbon atoms, or a fluorinated alkyl group containing a linking group.

The following indicates preferable specific examples of $R^1$ and $R^{11}$. However, among the following examples, optionally substituted hydrocarbon groups having less than 10 carbon atoms and optionally substituted halogenated hydrocarbon groups having less than 10 carbon atoms are excluded from $R^1$.

Namely, specific examples include, but are not limited to $CH_3-$, $CH_3CH_2-$, $(CH_3)_2CH-$, $(CH_3)_3C-$, $CH_3(CH_2)_2-$, $CH_3(CH_2)_3-$, $CH_3(CH_2)_4-$, $CH_3(CH_2)_5-$, $CH_3(CH_2)_6-$, $CH_3(CH_2)_7-$, $CH_3(CH_2)_8-$, $CH_3(CH_2)_9-$, $CH_3(CH_2)_{10}-$, $CH_3(CH_2)_{11}-$, $CH_3(CH_2)_{12}-$, $CH_3$ $(CH_2)_{13}$—, $CH_3(CH_2)_{14}$—, $CH_3(CH_2)_{15}$—, $CH_3(CH_2)_{16}$—, $CH_3(CH_2)_{17}$—, $CH_3(CH_2)_{18}$—, $CH_3(CH_2)_{19}$—, $CH_3(CH_2)_{20}$—, $CH_3(CH_2)_{21}$—, $CH_3(CH_2)_{22}$—, $CH_3(CH_2)_{23}$—, $CH_3(CH_2)_{24}$—, $CH_3(CH_2)_{25}$—, $CF_3$—, $CF_3CF_2$—, $(CF_3)_2CF$—, $(CF_3)_3C$—, $CF_3(CH_2)_2$—, $CF_3(CF_2)_3(CH_2)_2$—, $CF_3(CF_2)_5(CH_2)_2$—, $CF_3(CF_2)_7(CH_2)_2$—, $CF_3(CF_2)_3(CH_2)_3$—, $CF_3(CF_2)_5(CH_2)_3$—, $CF_3(CF_2)_7(CH_2)_3$—, $CF_3(CF_2)_4O(CF_2)_2(CH_2)_2$—, $CF_3(CF_2)_4O(CF_2)_2(CH_2)_3$—, $CF_3(CF_2)_7O(CF_2)_2(CH_2)_2$—, $CF_3(CF_2)_7CONH(CH_2)_2$—, $CF_3(CF_2)_7CONH(CH_2)_3$—, $CF_3(CF_2)_3O[CF(CF_3)CF(CF_3)O]_2CF(CF_3)CONH(CH_2)_3$—, $CH_3(CF_2)_7(CH_2)_2$—, $CH_3(CF_2)_8(CH_2)_2$—, $CH_3(CF_2)_9(CH_2)_2$—, $CH_3(CF_2)_{10}(CH_2)_2$—, $CH_3(CF_2)_{11}(CH_2)_2$—, $CH_3(CF_2)_{12}(CH_2)_2$—, $CH_3(CF_2)_7(CH_2)_3$—, $CH_3(CF_2)_9(CH_2)_3$—, $CH_3(CF_2)_{11}(CH_2)_3$—, $CH_3CH_2(CF_2)_6(CH_2)_2$—, $CH_3CH_2(CF_2)_8(CH_2)_2$—, $CH_3CH_2(CF_2)_{10}(CH_2)_2$—, $CH_3(CF_2)_4O(CF_2)_2(CH_2)_2$—, $CH_3(CF_2)_7(CH_2)_2O(CH_2)_3$—, $CH_3(CF_2)_8(CH_2)_2O(CH_2)_3$—, $CH_3(CF_2)_9(CH_2)_2O(CH_2)_3$—, $CH_3CH_2(CF_2)_6(CH_2)_2O(CH_2)_3$—, $CH_3(CF_2)_6CONH(CH_2)_3$—, $CH_3(CF_2)_8CONH(CH_2)_3$— and $CH_3(CF_2)_3O[CF(CF_3)CF(CF_3)O]_2CF(CF_3)CONH(CH_2)_3$—.

M and $M^1$ respectively and independently represent one type of atom selected from the group consisting of a silicon atom, germanium atom, tin atom, titanium atom and zirconium atom. Among these, M and $M^1$ are preferably both silicon atoms from the viewpoint of ease of raw material acquisition, reactivity and so forth.

X and $X^1$ respectively and independently represent a hydroxyl group or a hydrolytic group. There are no particular limitations on the hydrolytic group provided it is a group that hydrolyzes by reacting with water. Examples include optionally substituted alkoxy groups having 1 to 6 carbon atoms, optionally substituted acyloxy groups, halogen atoms such as a fluorine atom, chlorine atom, bromine atom or iodine atom, isocyanate groups, cyano groups, amino groups and amide groups.

Examples of an alkoxy group having 1 to 6 carbon atoms include a methoxy group, ethoxy group, n-propoxy group, isopropoxy group, n-butoxy group, sec-butoxy group, t-butoxy group, n-pentyloxy group and n-hexyloxy group. Examples of an acyloxy group include an acetoxy group, propionyloxy group, n-propylcarbonyloxy group, isopropylcarbonyloxy group, and n-butylcarbonyloxy group. Examples of substituents thereof include a carboxyl group, amide group, imide group, ester group and hydroxyl group. Among these, X and $X^1$ are preferably a hydroxyl group, alkoxy group having 1 to 4 carbon atoms, acyloxy group, halogen atom and isocyanate group, and more preferably an alkoxy group having 1 to 4 carbon atoms or an acyloxy group.

n represents an integer from 1 to (m−1), while $n^1$ represents an integer from 1 to ($m^1$−1). n and $n^1$ are preferably 1 in terms of producing a highly dense organic thin film.

m represents the valence of metal atom M, while $m^1$ represents the atom number of metal atom $M^1$.

$R^1$ may be the same or different when n is 2 or more, and X may be the same or different when (m−n) is 2 or more. In addition, $R^{11}$ may be the same or different when $n^1$ is 2 or more, and $X^1$ may be the same or different when ($m^1$−$n^1$) is 2 or more.

In the present invention, a compound represented by the aforementioned formula (II) is more preferable for the compound represented by the aforementioned formula (I), while a compound represented by the aforementioned formula (IV) is more preferable for the compound represented by formula (III).

In formula (II) or formula (IV), M, X, m, $M^1$, $X^1$ and $m^1$ are the same as previously defined.

$R^{21}$~$R^{23}$, $R^{201}$~$R^{203}$, $R^{31}$, $R^{32}$, $R^{301}$ and $R^{302}$ respectively and independently represent a hydrogen atom or a fluorine atom.

$R^4$ and $R^{41}$ respectively and independently represent an alkylene group, vinylene group, ethynylene group, arylene group, or a divalent linking group containing a silicon atom and/or an oxygen atom.

Specific examples of $R^4$ and $R^{41}$ are indicated below.

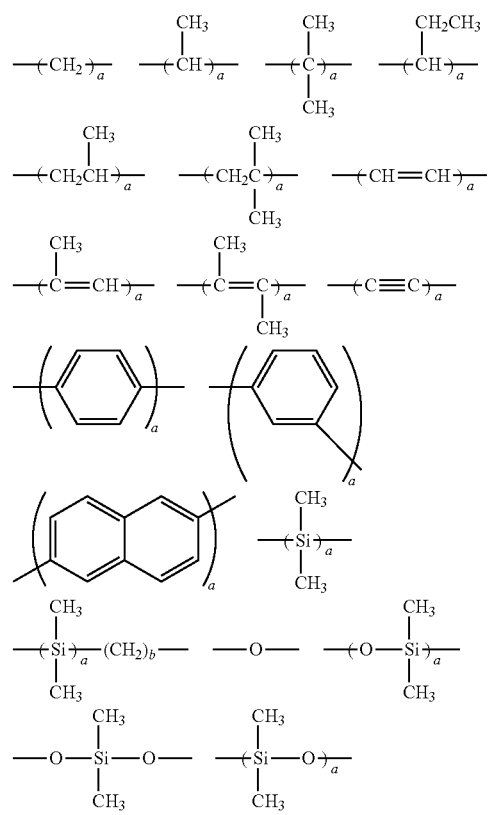

(In the formulas, a and b represent arbitrary natural numbers.)

In the above formulas (II) and (IV), Y and $Y^1$ represent a hydrogen atom; alkyl groups such as a methyl group, ethyl group, n-propyl group, isopropyl group, n-butyl group, isobutyl group, sec-butyl group, t-butyl group, n-pentyl group, isopentyl group, neopentyl group, t-pentyl group, n-hexyl group or isohexyl group; alkoxy groups such as a methoxy group, ethoxy group, n-propoxy group, isopropoxy group, n-butoxy group, sec-butoxy group, t-butoxy group, n-pentyloxy group or n-hexyloxy group; fluorine-containing alkyl groups in which a portion or all of the hydrogen atoms of an alkyl group are substituted with fluorine atoms; or fluorine-containing alkoxy groups in which a portion or all of the hydrogen atoms of an alkoxy group are substituted with fluorine atoms.

r represents 0 or an integer from 1 to (m−2), and $r^1$ represents 0 or an integer from 1 to ($m^1$−2), although r and $r^1$ are preferably 0 in terms of producing a highly dense organic thin film.

Y may be the same or different when r is 2 or more, and X may be the same or different when (m−r−1) is 2 or more. In addition, $Y^1$ may be the same or different when $r^1$ is 2 or more, and $X^1$ may be the same or different when ($m^1$−$r^1$−1) is 2 or more. However, at least one of Y and X is a hydroxyl group or a hydrolytic group, and at least one of $Y^1$ and $X^1$ is a hydroxyl group or a hydrolytic group.

p and $p^1$ represent 0 or a natural number, while q and $q^1$ represent 0 or 1. A group represented by the formula: $C(R^{31})(R^{32})$ may be the same or different when p is 2 or more, and a group represented by the formula: $C(R^{301})(R^{302})$ may be the same or different when $p^1$ is 2 or more.

Specific examples of compounds represented by formula (I) and formula (III) are indicated below. However, among these, hydrocarbon groups or halogenated hydrocarbon groups in which the portion corresponding to $R^1$ has less than 10 carbon atoms are excluded from compounds represented by formula (I).

Although compounds in which the metal atom is a silicon atom are shown as typical examples in the following examples, the present invention is not limited thereto.

Namely, examples include, but are not limited to, $CH_3(CH_2)_5Si(OCH_3)_3$, $CH_3(CH_2)_7Si(OCH_3)_3$, $CH_3(CH_2)_9Si(OCH_3)_3$, $CH_3(CH_2)_{11}Si(OCH_3)_3$, $CH_3(CH_2)_{13}Si(OCH_3)_3$, $CH_3(CH_2)_{15}Si(OCH_3)_3$, $CH_3(CH_2)_{17}Si(OCH_3)_3$, $CH_3(CH_2)_{19}Si(OCH_3)_3$, $CH_3(CH_2)_{21}Si(OCH_3)_3$, $CH_3(CH_2)_{17}Si(OCH_2CH_3)_3$, $CH_3(CH_2)_{17}SiCl_3$, $CH_3(CH_2)_9Si(OCH_3)_3$, $CH_3(CH_2)_9SiCl_3$, $CH_3(CH_2)_9Si(CH_3)(OCH_2CH_3)_2$, $CH_3(CH_2)_9Si(CH_3)_2(OCH_2CH_3)$, $CH_3(CH_2)_9Si(CH_3)_2(OCH_3)$, $CH_3CH_2O(CH_2)_{15}Si(OCH_3)_3$, $CF_3CH_2O(CH_2)_{15}Si(OCH_3)_3$, $CH_3(CH_2)_2Si(CH_3)_2(CH_2)_{15}Si(OCH_3)_3$, $CH_3(CH_2)_6Si(CH_3)_2(CH_2)_9Si(OCH_3)_3$, $CH_3COO(CH_2)_{15}Si(OCH_3)_3$, $CF_3(CF_2)_5(CH_2)_2Si(OCH_3)_3$, $CF_3(CF_2)_7—(CH=CH)_3—Si(OCH_3)_3$, $CH_3CH_2O(CH_2)_{15}Si(OC_2H_5)_3$, $CH_3(CH_2)_2Si(CH_3)_2(CH_2)_{15}Si(OC_2H_5)_3$, $CH_3(CH_2)_6Si(CH_3)_2(CH_2)_9Si(OC_2H_5)_3$, $CF_3(CH_2)_6Si(CH_3)_2(CH_2)_9Si(OC_2H_5)_3$, $CH_3COO(CH_2)_{15}Si(OC_2H_5)_3$, $CF_3COO(CH_2)_{15}Si(OC_2H_5)_3$, $CF_3COO(CH_2)_{15}Si(OCH_3)_3$, $CF_3(CF_2)_9(CH_2)_2Si(OC_2H_5)_3$, $CF_3(CF_2)_7(CH_2)_2Si(OC_2H_5)_3$, $CF_3(CF_2)_5(CH_2)_2Si(OC_2H_5)_3$, $CF_3(CF_2)_7(CH=CH)_3Si(OC_2H_5)_3$, $CF_3(CF_2)_9(CH_2)_2Si(OCH_3)_3$, $CF_3(CF_2)_5(CH_2)_2Si(OCH_3)_3$, $CF_3(CF_2)_7(CH_2)_2Si(CH_3)(OC_2H_5)_2$, $CF_3(CF_2)_7(CH_2)_2Si(CH_3)(OCH_3)_2$, $CF_3(CF_2)_7(CH_2)_2Si(CH_3)_2(OC_2H_5)$, $CF_3(CF_2)_7(CH_2)_2Si(CH_3)_2(OCH_3)$, $CF_3(CH_2)_2SiCl_3$, $CF_3(CF_2)_3(CH_2)_2SiCl_3$, $CF_3(CF_2)_5(CH_2)_2SiCl_3$, $CF_3(CF_2)_7(CH_2)_2SiCl_3$, $CF_3(CF_2)_3(CH_2)_3SiCl_3$, $CF_3(CF_2)_5(CH_2)_3SiCl_3$, $CF_3(CF_2)_7(CH_2)_3SiCl_3$, $CF_3(CF_2)_4O(CF_2)_2(CH_2)_2SiCl_3$, $CF_3(CF_2)_4O(CF_2)_2(CH_2)_3SiCl_3$, $CF_3(CF_2)_7(CH_2)_2O(CH_2)_3SiCl_3$, $CF_3(CF_2)_7CONH(CH_2)_2SiCl_3$, $CF_3(CF_2)_7CONH(CH_2)_3SiCl_3$, $CF_3(CF_2)_3O[CF(CF_3)CF(CF_3)O]_2CF(CF_3)CONH(CH_2)_3SiCl_3$, $CF_3(CF_2)_3(CH_2)_2Si(CH_3)Cl_2$, $CF_3(CF_2)_5(CH_2)_2Si(CH_3)Cl_2$, $CF_3(CH_2)_2Si(CH_3)Cl_2$, $CF_3(CF_2)_3(CH_2)_3Si(CH_3)Cl_2$, $CF_3(CF_2)_5(CH_2)_3Si(CH_3)Cl_2$, $CF_3(CF_2)_7(CH_2)_3Si(CH_3)Cl_2$, $CF_3(CF_2)_4(CF_2)_2(CH_2)_2Si(CH_3)Cl_2$, $CF_3(CF_2)_4(CF_2)_2(CH_2)_3Si(CH_3)Cl_2$, $CF_3(CF_2)_4(CH_2)_2O(CH_2)_3Si(CH_3)Cl_2$, $CF_3(CF_2)_7CONH(CH_2)_2Si(CH_3)Cl_2$, $CF_3(CF_2)_7CONH(CH_2)_3Si(CH_3)Cl_2$, $CF_3(CF_2)_3O[CF(CF_3)CF(CF_3)O]_2CF(CF_3)CONH(CH_2)_3Si(CH_3)Cl_2$, $CH_3(CH_2)_7SiCl_3$, $CH_3(CF_2)_7(CH_2)_2SiCl_3$, $CH_3(CF_2)_7(CH_2)_2Si(CH_3)Cl_2$, $CH_3(CF_2)_7(CH_2)_2Si(OCH_3)_3$, $CH_3(CF_2)_7(CH_2)_2Si(NCO)_3$, $CH_3(CF_2)_8(CH_2)_2SiCl_3$, $CH_3(CF_2)_8(CH_2)_2Si(OCH_3)_3$, $CH_3(CF_2)_8(CH_2)_2Si(NCO)_3$, $CH_3(CF_2)_9(CH_2)_2SiCl_3$, $CH_3(CF_2)_9(CH_2)_2Si(OCH_3)_3$, $CH_3(CF_2)_9(CH_2)_2Si(NCO)_3$, $CH_3CH_2(CF_2)_6(CH_2)_2SiCl_3$, $CH_3CH_2(CF_2)_6(CH_2)_2Si(OCH_3)_3$, $CH_3CH_2(CF_2)_6(CH_2)_2Si(NCO)_3$, $CH_3CH_2(CF_2)_8(CH_2)_2SiCl_3$, $CH_3CH_2(CF_2)_8(CH_2)_2Si(OCH_3)_3$, $CH_3CH_2(CF_2)_8(CH_2)_2Si(NCO)_3$, $CH_3CH_2(CF_2)_{10}(CH_2)_2SiCl_3$, $CH_3(CF_2)_4O(CF_2)_2(CH_2)_2SiCl_3$, $CH_3(CF_2)_7(CH_2)_2O(CH_2)_3SiCl_3$, $CH_3(CF_2)_8(CH_2)_2O(CH_2)_3SiCl_3$, $CH_3(CF_2)_9(CH_2)_2O(CH_2)_3SiCl_3$, $CH_3CH_2(CF_2)_6(CH_2)_2O(CH_2)_3SiCl_3$, $CH_3(CF_2)_6CONH(CH_2)_3SiCl_3$, $CH_3(CF_2)_8CONH(CH_2)_3SiCl_3$, $CH_3(CF_2)_3O[CF(CF_3)CF(CF_3)O]_2CF(CF_3)CONH(CH_2)_3SiCl_3$, $CH_3CH_2O(CH_2)_{15}Si(OCH_3)(OH)_2$, $CF_3CH_2O(CH_2)_{15}Si(OCH_3)_1(OH)_2$, $CH_3(CH_2)_2Si(CH_3)_2(CH_2)_{15}Si(OCH_3)(OH)_2$, $CH_3(CH_2)_6Si(CH_3)_2(CH_2)_9Si(OCH_3)(OH)_2$, $CH_3COO(CH_2)_{15}Si(OCH_3)(OH)_2$, $CF_3(CF_2)_5(CH_2)_2Si(OCH_3)(OH)_2$, $CF_3(CF_2)_7(CH=CH)_3Si(OCH_3)(OH)_2$, $CH_3CH_2O(CH_2)_{15}Si(OC_2H_5)(OH)_2$, $CH_3(CH_2)_2Si(CH_3)_2(CH_2)_{15}Si(OC_2H_5)(OH)_2$, $CH_3(CH_2)_6Si(CH_3)_2(CH_2)_9Si(OC_2H_5)(OH)_2$, $CF_3(CH_2)_6Si(CH_3)_2(CH_2)_9Si(OC_2H_5)(OH)_2$, $CH_3COO(CH_2)_{15}Si(OC_2H_5)(OH)_2$, $CF_3COO(CH_2)_{15}Si(OC_2H_5)(OH)_2$, $CF_3COO(CH_2)_{15}Si(OCH_3)(OH)_2$, $CF_3(CF_2)_9(CH_2)_2Si(OC_2H_5)(OH)_2$, $CF_3(CF_2)_7(CH_2)_2Si(OC_2H_5)(OH)_2$, $CF_3(CF_2)_5(CH_2)_2Si(OC_2H_5)(OH)_2$, $CF_3(CF_2)_7(CH=CH)_3Si(OC_2H_5)(OH)_2$, $CF_3(CF_2)_9(CH_2)_2Si(OCH_3)(OH)_2$, $CF_3(CF_2)_5(CH_2)_2Si(OCH_3)(OH)_2$, $CF_3(CF_2)_7(CH_2)_2Si(CH_3)(OH)_2$, $CF_3(CF_2)_9(CH_2)_2Si(CH_3)(OH)_2$, $CH_3CH_2O(CH_2)_{15}Si(OCH_3)_2(OH)$, $CF_3CH_2O(CH_2)_{15}Si(OCH_3)_2(OH)$, $CH_3(CH_2)_2Si(CH_3)_2(CH_2)_{15}Si(OCH_3)_2(OH)$, $CH_3(CH_2)_6Si(CH_3)_2(CH_2)_9Si(OCH_3)_2(OH)$, $CH_3COO(CH_2)_{15}Si(OCH_3)_2(OH)$, $CF_3(CF_2)_5(CH_2)_2Si(OCH_3)_2(OH)$, $CF_3(CF_2)_7(CH=CH)_3Si(OCH_3)_2(OH)$, $CH_3(CH_2)_2Si(CH_3)_2(CH_2)_{15}Si(OC_2H_5)_2(OH)$, $CH_3(CH_2)_6Si(CH_3)_2(CH_2)_9Si(OC_2H_5)_2(OH)$, $CF_3(CH_2)_6Si(CH_3)_2(CH_2)_9Si(OC_2H_5)_2(OH)$, $CH_3COO(CH_2)_{15}Si(OC_2H_5)_2(OH)$, $CF_3COO(CH_2)_{15}Si(OC_2H_5)_2(OH)$, $CF_3COO(CH_2)_{15}Si(OCH_3)_2(OH)$, $CF_3(CF_2)_9(CH_2)_2Si(OC_2H_5)_2(OH)$, $CF_3(CF_2)_7(CH_2)_2Si(OC_2H_5)_2(OH)$, $CF_3(CF_2)_5(CH_2)_2Si(OC_2H_5)_2(OH)$, $CF_3(CF_2)_7(CH=CH)_3Si(OC_2H_5)_2(OH)$, $CF_3(CF_2)_9(CH_2)_2Si(OCH_3)_2(OH)$, $CF_3(CF_2)_5(CH_2)_2Si(OCH_3)_2(OH)$, $CF_3(CF_2)_7(CH_2)_2Si(CH_3)(OC_2H_5)(OH)$, $CF_3(CF_2)_7(CH_2)_2Si(CH_3)(OCH_3)(OH)$, $CF_3(CH_2)_2Si(OCH_3)(OH)_2$, $CF_3(CF_2)_3(CH_2)_2Si(OCH_3)(OH)_2$, $CF_3(CF_2)_5(CH_2)_2Si(OCH_3)(OH)_2$, $CF_3(CF_2)_7(CH_2)_2Si(OCH_3)(OH)_2$, $CF_3(CF_2)_3(CH_2)_3Si(OCH_3)(OH)_2$, $CF_3(CF_2)_5(CH_2)_3Si(OCH_3)(OH)_2$, $CF_3(CF_2)_7(CH_2)_3Si(OCH_3)(OH)_2$, $CF_3(CF_2)_4O(CF_2)_2(CH_2)_2Si(OCH_3)(OH)_2$, $CF_3(CF_2)_4O(CF_2)_2(CH_2)_3Si(OCH_3)(OH)_2$, $CF_3(CF_2)_7(CH_2)_2O(CH_2)_3Si(OCH_3)(OH)_2$, $CF_3(CF_2)_7CONH(CH_2)_2Si(OCH_3)(OH)_2$, $CF_3(CF_2)_7CONH(CH_2)_3Si(OCH_3)(OH)_2$, $CF_3(CF_2)_3O[CF(CF_3)CF(CF_3)O]_2CF(CF_3)CONH(CH_2)_3Si(OCH_3)(OH)_2$, $CF_3(CH_2)_2Si(OCH_3)_2(OH)$, $CF_3(CH_2)_2Si(OCH_3)_2(OH)$, $CF_3(CF_2)_5(CH_2)_2Si(OCH_3)_2(OH)$, $CF_3(CF_2)_7(CH_2)_2Si(OCH_3)_2(OH)$, $CF_3(CF_2)_3(CH_2)_3Si(OCH_3)_2(OH)$, $CF_3(CF_2)_5(CH_2)_3Si(OCH_3)_2(OH)$, $CF_3(CF_2)_7(CH_2)_3Si(OCH_3)_2(OH)$, $CF_3(CF_2)_4O(CF_2)_2(CH_2)_2Si(OCH_3)_2(OH)$, $CF_3(CF_2)_4O(CF_2)_2(CH_2)_3Si(OCH_3)_2(OH)$, $CF_3(CF_2)_7(CH_2)_2O(CH_2)_3Si(OCH_3)_2(OH)$, $CF_3(CF_2)_7CONH(CH_2)_2Si(OCH_3)_2(OH)$, $CF_3(CF_2)_7CONH(CH_2)_3Si(OCH_3)_2(OH)$, $CF_3(CF_2)_3O[CF(CF_3)CF(CF_3)O]_2CF(CF_3)CONH(CH_2)_3Si(OCH_3)_2(OH)$, $CH_3(CH_2)_7Si(OCH_3)(OH)_2$, $CH_3(CF_2)_7(CH_2)_2Si(OCH_3)(OH)_2$, $CH_3(CF_2)_7(CH_2)_2Si(OCH_3)(OH)_2$, $CH_3(CF_2)_7(CH_2)_2Si(NCO)(OH)_2$, $CH_3(CF_2)_8(CH_2)_2Si(OCH_3)(OH)_2$, $CH_3(CF_2)_8(CH_2)_2Si(NCO)(OH)_2$, $CH_3(CF_2)_9(CH_2)_2Si(OCH_3)(OH)_2$, $CH_3(CF_2)_9(CH_2)_2Si(NCO)(OH)_2$, $CH_3CH_2(CF_2)_6(CH_2)_2Si(OCH_3)(OH)_2$, $CH_3CH_2(CF_2)_6(CH_2)_2Si(OCH_3)(OH)_2$, $CH_3CH_2(CF_2)_6(CH_2)_2Si(NCO)(OH)_2$, $CH_3CH_2(CF_2)_8(CH_2)_2Si(OCH_3)(OH)_2$, $CH_3CH_2(CF_2)_8(CH_2)_2Si(NCO)(OH)_2$, $CH_3CH_2(CF_2)_{10}(CH_2)_2Si(OCH_3)(OH)_2$, $CH_3(CF_2)_4O(CF_2)_2(CH_2)_2Si(OCH_3)(OH)_2$, $CH_3(CF_2)_7(CH_2)_2O(CH_2)_3Si(OCH_3)(OH)_2$, $CH_3(CF_2)_8(CH_2)_2O(CH_2)_3Si(OCH_3)(OH)_2$, $CH_3(CF_2)_9(CH_2)_2O(CH_2)_3Si$ (OCH$_3$)(OH)$_2$, CH$_3$CH$_2$(CF$_2$)$_6$(CH$_2$)$_2$O(CH$_2$)$_3$Si(OCH$_3$)(OH)$_2$, CH$_3$(CF$_2$)$_6$CONH(CH$_2$)$_3$Si(OCH$_3$)(OH)$_2$, CH$_3$(CF$_2$)$_8$CONH(CH$_2$)$_3$Si(OCH$_3$)(OH)$_2$, CH$_3$(CF$_2$)$_3$O[CF(CF$_3$)CF(CF$_3$)O]$_2$CF(CF$_3$)CONH(CH$_2$)$_3$Si(OCH$_3$)(OH)$_2$, CF$_3$(CF$_2$)$_3$(CH$_2$)$_2$Si(CH$_3$)(OCH$_3$)(OH), CF$_3$(CF$_2$)$_5$(CH$_2$)$_2$Si(CH$_3$)(OCH$_3$)(OH), CF$_3$(CF$_2$)$_5$(CH$_2$)$_3$Si(CH$_3$)(OCH$_3$)(OH), CF$_3$(CF$_2$)$_3$(CH$_2$)$_3$Si(CH$_3$)(OCH$_3$)(OH), CF$_3$(CF$_2$)$_5$(CH$_2$)$_3$Si(CH$_3$)(OCH$_3$)(OH), CF$_3$(CF$_2$)$_7$(CH$_2$)$_2$Si(CH$_3$)(OCH$_3$)(OH), CF$_3$(CF$_2$)$_4$(CF$_2$)$_2$(CH$_2$)$_2$Si(CH$_3$)(OCH$_3$)(OH), CF$_3$(CF$_2$)$_4$(CF$_2$)$_2$(CH$_2$)$_3$Si(CH$_3$)(OCH$_3$)(OH), CF$_3$(CF$_2$)$_4$(CH$_2$)$_2$O(CH$_2$)$_3$Si(CH$_3$)(OCH$_3$)(OH), CF$_3$(CF$_2$)$_7$CONH(CH$_2$)$_2$Si(CH$_3$)(OCH$_3$)(OH), CF$_3$(CF$_2$)$_7$CONH(CH$_2$)$_3$Si(CH$_3$)(OCH$_3$)(OH), CF$_3$(CF$_2$)$_3$O[CF(CF$_3$)CF(CF$_3$)O]$_2$CF(CF$_3$)CONH(CH$_2$)$_3$Si(CH$_3$)(OCH$_3$)(OH), CH$_3$(CH$_2$)$_7$Si(OCH$_3$)$_2$(OH), CH$_3$(CF$_2$)$_7$(CH$_2$)$_2$Si(OCH$_3$)$_2$(OH), CH$_3$(CF$_2$)$_7$(CH$_2$)$_2$Si(CH$_3$)(OCH$_3$)(OH), CH$_3$(CF$_2$)$_7$(CH$_2$)$_2$Si(OCH$_3$)$_2$(OH), CH$_3$(CF$_2$)$_7$(CH$_2$)$_2$Si(NCO)$_2$(OH), CH$_3$(CF$_2$)$_8$(CH$_2$)$_2$Si(OCH$_3$)$_2$(OH), CH$_3$(CF$_2$)$_8$(CH$_2$)$_2$Si(NCO)$_2$(OH), CH$_3$(CF$_2$)$_9$(CH$_2$)$_2$Si(OCH$_3$)$_2$(OH), CH$_3$(CF$_2$)$_9$(CH$_2$)$_2$Si(NCO)$_2$(OH), CH$_3$CH$_2$(CF$_2$)$_6$(CH$_2$)$_2$Si(OCH$_3$)$_2$(OH), CH$_3$CH$_2$(CF$_2$)$_6$(CH$_2$)$_2$Si(OCH$_3$)$_2$(OH), CH$_3$CH$_2$(CF$_2$)$_6$(CH$_2$)$_2$Si(NCO)$_2$(OH), CH$_3$CH$_2$(CF$_2$)$_8$(CH$_2$)$_2$Si(OCH$_3$)(OH)CH$_3$CH$_2$(CF$_2$)$_8$(CH$_2$)$_2$Si(NCO)$_2$(OH), CH$_3$CH$_2$(CF$_2$)$_{10}$(CH$_2$)$_2$Si(OCH$_3$)$_2$(OH), CH$_3$(CF$_2$)$_4$O(CF$_2$)$_2$(CH$_2$)$_2$Si(OCH$_3$)$_2$(OH), CH$_3$(CF$_2$)$_7$(CH$_2$)$_2$O(CH$_2$)$_3$Si(OCH$_3$)$_2$(OH), CH$_3$(CF$_2$)$_8$(CH$_2$)$_2$O(CH$_2$)$_3$Si(OCH$_3$)$_2$(OH), CH$_3$(CF$_2$)$_9$(CH$_2$)$_2$O(CH$_2$)$_3$Si(OCH$_3$)$_2$(OH), CH$_3$CH$_2$(CF$_2$)$_6$(CH$_2$)$_2$O(CH$_2$)$_3$Si(OCH$_3$)$_2$(OH), CH$_3$(CF$_2$)$_6$CONH(CH$_2$)$_3$Si(OCH$_3$)$_2$(OH), CH$_3$(CF$_2$)$_8$CONH(CH$_2$)$_3$Si(OCH$_3$)$_2$(OH), CH$_3$(CF$_2$)$_3$O[CF(CF$_3$)CF(CF$_3$)O]$_2$CF(CF$_3$)CONH(CH$_2$)$_3$Si(OCH$_3$)$_2$(OH), CH$_3$CH$_2$O(CH$_2$)$_{15}$Si(OH)$_3$, CF$_3$CH$_2$O(CH$_2$)$_{15}$Si(OH)$_3$, CH$_3$(CH$_2$)$_2$Si(CH$_3$)$_2$(CH$_2$)$_{15}$Si(OH)$_3$, CH$_3$(CH$_2$)$_6$Si(CH$_3$)$_2$(CH$_2$)$_9$Si(OH)$_3$, CH$_3$COO(CH$_2$)$_{15}$Si(OH)$_3$, CF$_3$(CF$_2$)$_5$(CH$_2$)$_2$Si(OH)$_3$, CF$_3$(CF$_2$)$_7$(CH=CH)$_3$Si(OH)$_3$, CH$_3$CH$_2$O(CH$_2$)$_{15}$Si(OH)$_3$, CH$_3$(CH$_2$)$_2$Si(CH$_3$)$_2$(CH$_2$)$_{15}$Si(OH)$_3$, CH$_3$(CH$_2$)$_6$Si(CH$_3$)$_2$(CH$_2$)$_9$Si(OH)$_3$, CF$_3$(CH$_2$)$_6$Si(CH$_3$)$_2$(CH$_2$)$_9$Si(OH)$_3$, CH$_3$COO(CH$_2$)$_{15}$Si(OH)$_3$, CF$_3$COO(CH$_2$)$_{15}$Si(OH)$_3$, CF$_3$COO(CH$_2$)$_{15}$Si(OH)$_3$, CF$_3$(CF$_2$)$_9$(CH$_2$)$_2$Si(OH)$_3$, CF$_3$(CF$_2$)$_7$(CH$_2$)$_2$Si(OH)$_3$, CF$_3$(CF$_2$)$_5$(CH$_2$)$_2$Si(OH)$_3$, CF$_3$(CF$_2$)$_7$(CH=CH)$_3$Si(OH)$_3$, CF$_3$(CF$_2$)$_9$(CH$_2$)$_2$Si(OH)$_3$CF$_3$(CF$_2$)$_5$(CH$_2$)$_2$Si(OH)$_3$, CF$_3$(CF$_2$)$_7$(CH$_2$)$_2$Si(CH$_3$)$_2$(OH), CF$_3$(CH$_2$)$_2$Si(OH)$_3$, CF$_3$(CF$_2$)$_3$(CH$_2$)$_2$Si(OH)$_3$, CF$_3$(CF$_2$)$_5$(CH$_2$)$_2$Si(OH)$_3$, CF$_3$(CF$_2$)$_7$(CH$_2$)$_2$Si(OH)$_3$, CF$_3$(CF$_2$)$_3$(CH$_2$)$_3$Si(OH)$_3$, CF$_3$(CF$_2$)$_5$(CH$_2$)$_3$Si(OH)$_3$, CF$_3$(CF$_2$)$_7$(CH$_2$)$_3$Si(OH)$_3$, CF$_3$(CF$_2$)$_4$O(CF$_2$)$_2$(CH$_2$)$_2$Si(OH)$_3$, CF$_3$(CF$_2$)$_4$O(CF$_2$)$_2$(CH$_2$)$_3$Si(OH)$_3$, CF$_3$(CF$_2$)$_7$(CH$_2$)$_2$O(CH$_2$)$_3$Si(OH)$_3$, CF$_3$(CF$_2$)$_7$CONH(CH$_2$)$_2$Si(OH)$_3$, CF$_3$(CF$_2$)$_7$CONH(CH$_2$)$_3$Si(OH)$_3$, CF$_3$(CF$_2$)$_3$O[CF(CF$_3$)CF(CF$_3$)O]$_2$CF(CF$_3$)CONH(CH$_2$)$_3$Si(OH)$_3$, CH$_3$(CH$_2$)$_7$Si(OH)$_3$, CH$_3$(CF$_2$)$_7$(CH$_2$)$_2$Si(OH)$_3$, CH$_3$(CF$_2$)$_7$(CH$_2$)$_2$Si(OH)$_3$, CH$_3$(CF$_2$)$_7$(CH$_2$)$_2$Si(OH)$_3$, CH$_3$(CF$_2$)$_8$(CH$_2$)$_2$Si(OH)$_3$, CH$_3$(CF$_2$)$_8$(CH$_2$)$_2$Si(OH)$_3$, CH$_3$(CF$_2$)$_9$(CH$_2$)$_2$Si(OH)$_3$, CH$_3$(CF$_2$)$_9$(CH$_2$)$_2$Si(OH)$_3$, CH$_3$CH$_2$(CF$_2$)$_6$(CH$_2$)$_2$Si(OH)$_3$, CH$_3$CH$_2$(CF$_2$)$_6$(CH$_2$)$_2$Si(OH)$_3$, CH$_3$CH$_2$(CF$_2$)$_6$(CH$_2$)$_2$Si(OH)$_3$, CH$_3$CH$_2$(CF$_2$)$_8$(CH$_2$)$_2$Si(OH)$_3$, CH$_3$CH$_2$(CF$_2$)$_8$(CH$_2$)$_2$Si(OH)$_3$, CH$_3$CH$_2$(CF$_2$)$_{10}$(CH$_2$)$_2$Si(OH)$_3$, CH$_3$(CF$_2$)$_4$O(CF$_2$)$_2$(CH$_2$)$_2$Si(OH)$_3$, CH$_3$(CF$_2$)$_7$(CH$_2$)$_2$O(CH$_2$)$_3$Si(OH)$_3$, CH$_3$(CF$_2$)$_8$(CH$_2$)$_2$O(CH$_2$)$_3$Si(OH)$_3$, CH$_3$(CF$_2$)$_9$(CH$_2$)$_2$O(CH$_2$)$_3$Si(OH)$_3$, CH$_3$CH$_2$(CF$_2$)$_6$(CH$_2$)$_2$O(CH$_2$)$_3$Si(OH)$_3$, CH$_3$(CF$_2$)$_6$CONH(CH$_2$)$_3$Si(OH)$_3$, CH$_3$(CF$_2$)$_8$CONH(CH$_2$)$_3$Si(OH)$_3$, CH$_3$(CF$_2$)$_3$O[CF(CF$_3$)CF(CF$_3$)O]$_2$CF(CF$_3$)CONH(CH$_2$)$_3$Si(OH)$_3$, CF$_3$(CF$_2$)$_3$(CH$_2$)$_2$Si(CH$_3$)(OH)$_2$, CF$_3$(CF$_2$)$_5$(CH$_2$)$_2$Si(CH$_3$)(OH)$_2$, CF$_3$(CH$_2$)$_2$Si(CH$_3$)(OH)$_2$, CF$_3$(CF$_2$)$_3$(CH$_2$)$_3$Si(CH$_3$)(OH)$_2$, CF$_3$(CF$_2$)$_5$(CH$_2$)$_3$Si(CH$_3$)(OH)$_2$, CF$_3$(CF$_2$)$_7$(CH$_2$)$_3$Si(CH$_3$)(OH)$_2$, CF$_3$(CF$_2$)$_4$(CF$_2$)$_2$(CH$_2$)$_2$Si(CH$_3$)(OH)$_2$, CF$_3$(CF$_2$)$_4$(CF$_2$)$_2$(CH$_2$)$_3$Si(CH$_3$)(OH)$_2$, CF$_3$(CF$_2$)$_4$(CH$_2$)$_2$O(CH$_2$)$_3$Si(CH$_3$)(OH)$_2$, CF$_3$(CF$_2$)$_7$CONH(CH$_2$)$_2$Si(CH$_3$)(OH)$_2$, CF$_3$(CF$_2$)$_7$CONH(CH$_2$)$_3$Si(CH$_3$)(OH)$_2$, CF$_3$(CF$_2$)$_3$O[CF(CF$_3$)CF(CF$_3$)O]$_2$CF(CF$_3$)CONH(CH$_2$)$_3$Si(CH$_3$)(OH)$_2$, and CH$_3$(CF$_2$)$_7$(CH$_2$)$_2$Si(CH$_3$)(OH).

In addition, these compounds can be used alone or two or more types can be used in combination.

(2) Metal Surfactant Having at Least One Hydrolytic Group

A metal surfactant having at least one hydrolytic group used in the present invention is a compound represented by formula (V).

$$R^{100}{}_n MX_{m-n} \qquad (V)$$

Although there are no particular limitations on the metal surfactant having at least one hydrolytic group used in the present invention provided it has at least one functional group able to be hydrolyzed and a hydrophobic group within the same molecule thereof, that which has a hydrolytic group able to form a bond by reacting with an active hydrogen on the surface of a substrate is preferable. More specifically, preferable examples include compounds represented by the aforementioned formula (V).

In formula (V), $R^{100}$ represents an optionally substituted hydrocarbon group, an optionally substituted halogenated hydrocarbon group, a hydrocarbon group containing a linking group, or a halogenated hydrocarbon group containing a linking group.

Examples of an optionally substituted hydrocarbon group include the substituents described for the aforementioned $R^1$ and $R^{11}$.

Examples of an optionally substituted halogenated hydrocarbon group include halogenated alkyl groups having 1 to 30 carbon atoms, halogenated alkenyl groups having 2 to 30 carbon atoms, and halogenated aryl groups. Specific examples include groups in which one or more of the hydrogen atoms in a hydrocarbon group are substituted with a halogen atom such as a fluorine atom, chlorine atom or bromine atom.

Among these, groups in which two or more of the hydrogen atoms of an alkyl group having 1 to 30 carbon atoms are substituted with halogen atoms are preferable for the halogenated hydrocarbon group, while a fluorinated alkyl group in which two or more of the hydrogen atoms of an alkyl group having 1 to 30 carbon atoms are substituted with fluorine atoms is more preferable. In addition, in the case the fluorinated alkyl group has a branched structure, the branched portion preferably has 1 to 4 carbon atoms, and is preferably a short chain having 1 to 2 carbon atoms.

Examples of fluorinated alkyl groups, the number of fluorine atoms in the fluorinated alkyl groups, substituents of optionally substituted hydrocarbon groups or optionally substituted halogenated hydrocarbon groups, hydrocarbon groups of hydrocarbon groups containing a linking group, and halogenated hydrocarbon groups of halogenated hydrocarbon groups containing a linking group are described for the aforementioned $R^1$ or $R^{11}$.

In addition, the aforementioned linking group is preferably present between a carbon-carbon bond of a hydrocarbon group or a halogenated hydrocarbon group, or between a carbon of a hydrocarbon group and a metal atom M to be described below.

Specific examples of linking groups include —O—, —S—, —SO$_2$—, —CO—, —C(=O)O— and —C(=O)NR$^{21}$ (wherein, R$^{21}$ represents a hydrogen atom or alkyl group such as a methyl group, ethyl group, n-propyl group or isopropyl group).

Among these, from the viewpoints of water repellency and durability, $R^{100}$ is preferably an alkyl group having 1 to 30 carbon atoms, a fluorinated alkyl group having 1 to 30 carbon atoms, or a fluorinated alkyl group containing a linking group.

Preferable specific examples of $R^{100}$ are described for the aforementioned $R^1$ or $R^{11}$.

An example of M is a previously described metal atom.

In addition, X represents a hydrolytic group. There are no particular limitations on the hydrolytic group provided it forms a hydroxyl group by decomposing by reacting with water, examples of which include the aforementioned optionally substituted alkoxy groups having 1 to 6 carbon atoms, optionally substituted acyloxy groups, halogen atoms such as a fluorine atom, chlorine atom, bromine atom or iodine atom, isocyanate group, cyano group, amino group and amide group.

Examples of alkoxyl groups having 1 to 6 carbon atoms include the aforementioned methoxy group, ethoxy group, n-propoxy group, isopropoxy group, n-butoxy group, sec-butoxy group, t-butoxy group, n-pentyloxy group and n-hexyloxy group. Examples of acyloxy groups include an acetoxy group, propionyloxy group, n-propylcarbonyloxy group, isopropylcarbonyloxy group and n-butylcarbonyloxy group. Examples of substituents thereof include a carboxyl group, amide group, imide group, ester group and hydroxyl group.

Among these, X is preferably an alkoxy group having 1 to 6 carbon atoms, acyloxy group or isocyanate group, and more preferably an alkoxy group having 1 to 4 carbon atoms or an acyloxy group.

m represents the valence of a metal atom M.

n represents an integer from 1 to (m−1), and n is preferably 1 in terms of forming a highly dense organic thin film.

$R^{100}$ may be the same or different when n is 2 or more.

In addition, X may be the same or different when (m−n) is 2 or more.

In the present invention, preferable examples of a compound represented by the aforementioned formula (V) include compounds represented by (i) to (v) below, with compounds represented by (i) being particularly preferable.

(i) $CF_3$—$(CF_2)_p$—$R^2_q$-$MY_rX_{m-r}$
(ii) $CH_3$—$(CH_2)_g$-$MY_rX_{m-r-1}$
(iii) $CH_3$—$(CH_2)_s$—O—$(CH_2)_t$-$MY_rX_{m-r-1}$
(iv) $CH_3$—$(CH_2)_u$—$Si(CH_3)_2$—$(CH_2)_v$-$MY_rX_{m-r-1}$
(v) $CF_3COO$—$(CH_2)_w$-$MY_rX_{m-r-1}$ In (i) to (v) above, M, X and m are the same as previously defined.

$R^2$ represents an alkylene group, vinylene group, ethynylene group, arylene group or divalent linking group containing a silicon atom and/or an oxygen atom.

Specific examples of $R^2$ are the same as the aforementioned $R^4$ and $R^{41}$.

Y represents, for example, a hydrogen atom; an alkyl group such as a methyl group, ethyl group, n-propyl group, isopropyl group, n-butyl group, isobutyl group, sec-butyl group, t-butyl group, n-pentyl group, isopentyl group, neopentyl group, t-pentyl group, n-hexyl group or isohexyl group; an alkoxy group such as a methoxy group, ethoxy group, n-propoxy group, isopropoxy group, n-butoxy group, sec-butoxy group, t-butoxy group, n-pentyloxy group or n-hexyloxy group; a fluorine-containing alkyl group in which a portion or all of the hydrogen atoms of an alkyl group are substituted with fluorine atoms; or a fluorine-containing alkoxy group in which a portion or all of the hydrogen atoms of an alkoxy group are substituted with fluorine atoms.

Although r represents an integer from 0 to (m−2), it is preferably 0 in terms of producing a highly dense organic thin film. In addition, Y may be the same or different when r is 2 or more, and X may be the same or different when (m−r−1) is 2 or more.

p represents 0 or a natural number, and q represents 0 or 1.

g, S, t, u, v and w represent an arbitrary integer, and the particularly preferable ranges thereof are 1 to 25 for g, 0 to 12 for s, 1 to 20 for t, 0 to 12 for u, 1 to 20 for v, and 1 to 25 for w.

Specific examples of compounds represented by the aforementioned formula (V) are indicated below.

Although compounds in which the metal atom is a silicon atom are shown as typical examples in the following examples, the present invention is not limited thereto. In addition, the hydrolytic group is not limited to the previously listed functional groups, but rather other hydrolytic groups may be bonded.

$CH_3(CH_2)_7Si(OCH_3)_3$
$CH_3(CH_2)_8Si(OCH_3)_3$
$CH_3(CH_2)_9Si(OCH_3)_3$
$CH_3(CH_2)_{11}Si(OCH_3)_3$
$CH_3(CH_2)_{11}Si(OCH_3)_3$
$CH_3(CH_2)_{12}Si(OCH_3)_3$
$CH_3(CH_2)_{13}Si(OCH_3)_3$
$CH_3(CH_2)_{14}Si(OCH_3)_3$
$CH_3(CH_2)_{15}Si(OCH_3)_3$
$CH_3(CH_2)_{16}Si(OCH_3)_3$
$CH_3(CH_2)_{17}Si(OCH_3)_3$
$CH_3(CH_2)_{18}Si(OCH_3)_3$
$CH_3(CH_2)_{19}Si(OCH_3)_3$
$CH_3(CH_2)_7Si(OC_2H_5)_3$
$CH_3(CH_2)_8Si(OC_2H_5)_3$
$CH_3(CH_2)_9Si(OC_2H_5)_3$
$CH_3(CH_2)_{10}Si(OC_2H_5)_3$
$CH_3(CH_2)_{11}Si(OC_2H_5)_3$
$CH_3(CH_2)_{12}Si(OC_2H_5)_3$
$CH_3(CH_2)_{13}Si(OC_2H_5)_3$
$CH_3(CH_2)_{14}Si(OC_2H_5)_3$
$CH_3(CH_2)_{15}Si(OC_2H_5)_3$
$CH_3(CH_2)_{16}Si(OC_2H_5)_3$
$CH_3(CH_2)_{17}Si(OC_2H_5)_3$
$CH_3(CH_2)_{18}Si(OC_2H_5)_3$
$CH_3(CH_2)_{19}Si(OC_2H_5)_3$
$CH_3CH_2O(CH_2)_{15}Si(OCH_3)_3$
$CF_3CH_2O(CH_2)_{15}Si(OCH_3)_3$
$CH_3(CH_2)_2Si(CH_3)_2(CH_2)_{15}Si(OCH_3)_3$
$CH_3(CH_2)_6Si(CH_3)_2(CH_2)_9Si(OCH_3)_3$
$CH_3COO(CH_2)_{15}Si(OCH_3)_3$
$CF_3(CF_2)_5(CH_2)_2Si(OCH_3)_3$
$CF_3(CF_2)_7(CH=CH)_3Si(OCH_3)_3$
$CH_3CH_2O(CH_2)_{15}Si(OC_2H_5)_3$
$CH_3(CH_2)_2Si(CH_3)_2(CH_2)_{15}Si(OC_2H_5)_3$
$CH_3(CH_2)_6Si(CH_3)_2(CH_2)_{15}Si(OC_2H_5)_3$
$CF_3(CH_2)_6Si(CH_3)_2(CH_2)_{15}Si(OC_2H_5)_3$
$CH_3COO(CH_2)_{15}Si(OC_2H_5)_3$
$CF_3COO(CH_2)_{15}Si(OC_2H_5)_3$
$CF_3COO(CH_2)_{15}Si(OCH_3)_3$
$CF_3(CF_2)_9(CH_2)_2Si(OC_2H_5)_3$
$CF_3(CF_2)_7(CH_2)_2Si(OC_2H_5)_3$
$CF_3(CF_2)_5(CH_2)_2Si(OC_2H_5)_3$
$CF_3(CF_2)_7(CH=CH)_3Si(OC_2H_5)_3$
$CF_3(CF_2)_9(CH_2)_2Si(OCH_3)_3$
$CF_3(CF_2)_5(CH_2)_2Si(OCH_3)_3$
$CF_3(CF_2)_7(CH_2)_2Si(CH_3)(OC_2H_5)_2$
$CF_3(CF_2)_7(CH_2)_2Si(CH_3)(OCH_3)_2$
$CF_3(CF_2)_7(CH_2)_2Si(CH_3)_2(OC_2H_5)$
$CF_3(CF_2)_7(CH_2)_2Si(CH_3)_2(OCH_3)$
$CF_3(CH_2)_2Si(OCH_3)_3$ $CF_3(CF_2)_3(CH_2)_2Si(OCH_3)_3$
$CF_3(CF_2)_5(CH_2)_2Si(OCH_3)_3$
$CF_3(CF_2)_7(CH_2)_2Si(OCH_3)_3$
$CF_3(CF_2)_3(CH_2)_3Si(OCH_3)_3$
$CF_3(CF_2)_5(CH_2)_3Si(OCH_3)_3$
$CF_3(CF_2)_7(CH_2)_3Si(OCH_3)_3$
$CF_3(CF_2)_4O(CF_2)_2(CH_2)_2Si(OCH_3)_3$
$CF_3(CF_2)_4O(CF_2)_2(CH_2)_3Si(OCH_3)_3$
$CF_3(CF_2)_7(CH_2)_2O(CH_2)_3Si(OCH_3)_3$
$CF_3(CF_2)_7CONH(CH_2)_2Si(OCH_3)_3$
$CF_3(CF_2)_7CONH(CH_2)_3Si(OCH_3)_3$
$CF_3(CF_2)_3O[CF(CF_3)CF(CF_3)O]_2CF(CF_3)CONH(CH_2)_3Si(OCH_3)_3$
$CF_3(CF_2)_3(CH_2)_2Si(CH_3)(OCH_3)_2$
$CF_3(CF_2)_5(CH_2)_2Si(CH_3)(OCH_3)_2$
$CF_3(CH_2)_2Si(CH_3)(OCH_3)_2$
$CF_3(CF_2)_3(CH_2)_3Si(CH_3)(OCH_3)_2$
$CF_3(CF_2)_5(CH_2)_3Si(CH_3)(OCH_3)_2$
$CF_3(CF_2)_7(CH_2)_3Si(CH_3)(OCH_3)_2$
$CF_3(CF_2)_4(CF_2)_2(CH_2)_2Si(CH_3)(OCH_3)_2$
$CF_3(CF_2)_4(CF_2)_2(CH_2)_3Si(CH_3)(OCH_3)_2$
$CF_3(CF_2)_4(CH_2)_2O(CH_2)_3Si(CH_3)(OCH_3)_2$
$CF_3(CF_2)_7CONH(CH_2)_2Si(CH_3)(OCH_3)_2$
$CF_3(CF_2)_7CONH(CH_2)_3Si(CH_3)(OCH_3)_2$
$CF_3(CF_2)_3O[CF(CF_3)CF(CF_3)O]_2CF(CF_3)CONH(CH_2)_3Si(CH_3)(OCH_3)_2$
$CH_3(CH_2)_7Si(OCH_3)_3$
$CH_3(CF_2)_7(CH_2)_2Si(OCH_3)_3$
$CH_3(CF_2)_7(CH_2)_2Si(CH_3)(OCH_3)_2$
$CH_3(CF_2)_7(CH_2)_2Si(OCH_3)_3$
$CH_3(CF_2)_7(CH_2)_2Si(NCO)_3$
$CH_3(CF_2)_8(CH_2)_2Si(OCH_3)_3$
$CH_3(CF_2)_8(CH_2)_2Si(NCO)_3$
$CH_3(CF_2)_9(CH_2)_2Si(OCH_3)_3$
$CH_3(CF_2)_9(CH_2)_2Si(NCO)_3$
$CH_3CH_2(CF_2)_6(CH_2)_2Si(OCH_3)_3$
$CH_3CH_2(CF_2)_6(CH_2)_2Si(OCH_3)_3$
$CH_3CH_2(CF_2)_6(CH_2)_2Si(NCO)_3$
$CH_3CH_2(CF_2)_8(CH_2)_2Si(OCH_3)_3$
$CH_3CH_2(CF_2)_8(CH_2)_2Si(NCO)_3$
$CH_3CH_2(CF_2)_{10}(CH_2)_2Si(OCH_3)_3$
$CH_3(CF_2)_4O(CF_2)_2(CH_2)_2Si(OCH_3)_3$
$CH_3(CF_2)_7(CH_2)_2O(CH_2)_3Si(OCH_3)_3$
$CH_3(CF_2)_8(CH_2)_2O(CH_2)_3Si(OCH_3)_3$
$CH_3(CF_2)_9(CH_2)_2O(CH_2)_3Si(OCH_3)_3$
$CH_3CH_2(CF_2)_6(CH_2)_2O(CH_2)_3Si(OCH_3)_3$
$CH_3(CF_2)_6CONH(CH_2)_3Si(OCH_3)_3$
$CH_3(CF_2)_8CONH(CH_2)_3Si(OCH_3)_3$ and,
$CH_3(CF_2)_3O[CF(CF_3)CF(CF_3)O]_2CF(CF_3)CONH(CH_2)_3Si(OCH_3)_3$.

These compounds can be used alone or two or more types can be used in combination.

Although there are no particular limitations on the content of metal surfactant in the organic solvent solution, a range of 0.1 to 30% by weight is preferable to produce a fine, monolayer.

(3) Compound Capable of Interacting with Metal Surfactant (1)

There are no particular limitations on the compound capable of interacting with the metal surfactant (1) used in the present invention provided it is a compound which activates a hydrolytic group or hydroxyl group to promote condensation by interacting with the metal portion or hydrolytic group portion of the metal surfactant (1) by means of coordinate bonding, hydrogen bonding and so forth.

In the present invention, at least one type of compound selected from the group consisting of a metal oxide, metal alkoxide, partial hydrolysis product of a metal alkoxide, silanol condensation catalyst and acid catalyst is preferable for the aforementioned compound, while the use of at least one type of metal alkoxide or partial hydrolysis product of a metal alkoxide is more preferable.

Although there are no particular limitations on the metal alkoxide, an alkoxide of at least one type of metal selected from the group consisting of titanium, zirconium, aluminum, silicon, germanium, indium, tin, tantalum, zinc and tungsten is preferable for reasons such as being able to obtain an organic thin film having superior transparency.

Although there are no particular limitations on the number of carbon atoms of the alkoxy group of the metal alkoxide, it is more preferably 1 to 4 carbon atoms in view of contained oxide concentration, ease of eliminating organic substances, ease of acquisition and so forth.

Specific examples of metal alkoxides used in the present invention include silicon alkoxides such as $Si(OCH_3)_4$, $Si(OC_2H_5)_4$, $Si(OC_3H_7-i)_4$ and $Si(OC_4H_9-t)_4$; titanium alkoxide such as $Ti(OCH_3)_4$, $Ti(OC_2H_5)_4$, $Ti(OC_3H_7-i)_4$ and $Ti(OC_4H_9)_4$; tetraquis-trialkylsiloxytitanium such as $Ti[OSi(CH_3)_3]_4$ and $Ti[OSi(C_2H_5)_3]_4$; zirconium alkoxides such as $Zr(OCH_3)_4$, $Zr(OC_2H_5)_4$, $Zr(OC_3H_7)_4$ and $Zr(OC_4H_9)_4$; aluminum alkoxides such as $Al(OCH_3)_4$, $Al(OC_2H_5)_4$, $Al(OC_3H_7-i)_4$ and, $Al(OC_4H_9)_3$; germanium alkoxides such as $Ge(OC_2H_5)_4$; indium alkoxides such as $In(OCH_3)_3$, $In(OC_2H_5)_3$, $In(OC_3H_7-i)_3$ and $In(OC_4H_9)_3$; tin alkoxides such as $Sn(OCH_3)_4$, $Sn(OC_2H_5)_4$, $Sn(OC_3H_7-i)_4$ and $Sn(OC_4H_9)_4$; tantalum alkoxides such as $Ta(OCH_3)_5$, $Ta(OC_2H_5)_5$, $Ta(OC_3H_7-i)_5$ and $Ta(OC_4H_9)_5$; tungsten alkoxides such as $W(OCH_3)_6$, $W(OC_2H_5)_6$, $W(OC_3H_7-i)_6$ and $W(OC_4H_9)_6$; zinc alkoxides such as $Zn(OC_2H_5)_2$; and, lead alkoxides such as $Pb(OC_4H_9)_4$. These metal alkoxides can be used alone, or two or more types can be used in combination.

In addition, in the present invention, complex alkoxides obtained by reacting two or more types of metal alkoxides, complex alkoxides obtained by reacting one or more types of metal alkoxides and one or more types of a metal salt, and combinations thereof can be used for the metal alkoxide.

Examples of complex alkoxides obtained by reacting two or more types of metal alkoxides include complex alkoxides obtained by reacting an alkoxide of an alkaline metal or alkaline earth metal with an alkoxide of a transition metal, and complex alkoxides obtained in the form of a complex salt by combining a group 3B element.

Specific examples include $BaTi(OR)_6$, $SrTi(OR)_6$, $BaZr(OR)_6$, $SrZr(OR)_6$, $LiNb(OR)_6$, $LiTa(OR)_6$ and combinations thereof, and reaction products, condensation products and so forth of the aforementioned metal alkoxides and silicon alkoxides such as $LiVO(OR)_4$, $MgAl_2(OR)_8$, $(RO)_3SiOAl(OR')_2$, $(RO)_3SiOTi(OR')_3$, $(RO)_3SiOZr(OR')_3$, $(RO)_3SiOB(OR')_2$, $(RO)_3SiONb(OR')_4$ and $(RO)_3SiOTa(OR')_4$. Here, R and R' represent, for example, alkyl groups.

Examples of complex alkoxides obtained by reacting one or more types of metal alkoxides with one or more types of metal salts include compounds obtained by reacting a metal salt with a metal alkoxide.

Examples of metal salts include chlorides, nitrates, sulfates, acetates, formates, and succinates, while examples of metal alkoxides include the same examples of metal alkoxides previously described.

A partial hydrolysis product of a metal alkoxide is obtained prior to a metal alkoxide being completely hydrolyzed, and is present in the state of an oligomer.

A preferable example of a method for producing a partial hydrolysis product of a metal alkoxide consists of using 0.5 to less than 2.0 times moles of water to the aforementioned examples of metal alkoxides, and hydrolyzing within a temperature range from −100° C. to the reflux temperature of the organic solvent in the aforementioned organic solvent.

Specific examples of such methods include:
(i) adding 0.5 to less than 1.0 times moles of water to a metal alkoxide in an organic solvent;
(ii) adding 1.0 to less than 2.0 times moles of water to a metal alkoxide in an organic solvent at a temperature equal to or lower than the temperature at which hydrolysis begins, preferably at 0° C. or lower, and more preferably within a range of −20 to −100° C., and
(iii) adding 0.5 to less than 2.0 times moles of water to a metal alkoxide at room temperature in an organic solvent while controlling the hydrolysis rate by, for example, a method for controlling the rate of addition of water, or a method using an aqueous solution in which the water concentration has been lowered by adding a water-soluble solvent to the water.

In the aforementioned method (i), after adding a predetermined amount of water at an arbitrary temperature, the reaction can be carried out by further adding water at a temperature equal to or lower than the temperature at which hydrolysis begins, and preferably at −20° C. or lower.

Although the reaction between metal alkoxide and water can be carried out by directly mixing the metal alkoxide and the water without using an organic solvent, the reaction is preferably carried out in an organic solvent. More specifically, although the reaction can be carried out using either a method in which water diluted with an organic solvent is added to an organic solvent solution of a metal alkoxide, or a method in which an metal alkoxide or organic solvent solution thereof is added to an organic solvent in which water has been suspended or dissolved, the former method in which water is added later is preferable.

Although there are no particular limitations on the concentration of the metal alkoxide in the organic solvent provided it inhibits violent generation of heat and has fluidity which allows stirring, it is normally within the range of 5 to 30% by weight.

There are no particular limitations on the reaction temperature between the metal alkoxide and the water in the aforementioned method (i), it is normally within the range of −100 to +100° C., and preferably within a temperature range from −20° C. to the boiling point of the organic solvent used or alcohol eliminated by hydrolysis.

Although there are no particular limitations on the addition temperature of the water in the aforementioned method (ii) provided it is dependent on the stability of the metal alkoxide and a temperature equal to or lower than the hydrolysis starting temperature or 0° C. or lower, depending on the type of metal alkoxide, the addition of water to the metal alkoxide is preferably carried out within a temperature range of −50 to −100° C. In addition, a dehydration/condensation reaction can also be carried out by hydrolyzing at a temperature from room temperature to the reflux temperature of the solvent used after having added water at a low temperature and heating for a fixed period of time.

The reaction between the metal alkoxide and the water in the aforementioned method (iii) can be carried out by controlling the rate of hydrolysis by a method other than that using temperature such as controlling the addition rate of the water within a temperature range which allows cooling without the use of a special cooling apparatus, such as a temperature within the range of 0° C. to room temperature. A dehydration/condensation reaction can be further carried out by hydrolyzing at a temperature from room temperature to the reflux temperature of the solvent used after heating for a fixed period of time.

An organic solvent which enables the hydrolysis product of the metal alkoxide to be dispersed in the form of a dispersoid in the organic solvent is preferable for the organic solvent used, and a solvent having high water solubility which does not coagulate at a low temperature is more preferable since the reaction for treating a metal surfactant with water can be carried out at a low temperature.

Specific examples of organic solvents used include alcohol solvents such as methanol, ethanol or isopropanol; halogenated hydrocarbon solvents such as methylene chloride, chloroform or chlorobenzene; hydrocarbon solvents such as hexane, cyclohexane, benzene, toluene or xylene; ether solvents such as tetrahydrofuran, diethyl ether or dioxane; ketone solvents such as acetone, methyl ethyl ketone or methyl isobutyl ketone; amide solvents such as dimethylformamide or N-methylpyrrolidone; sulfoxide solvents such as dimethylsulfoxide; and silicones such as methylpolysiloxane, octamethylcyclotetrasiloxane, decamethylcyclopentane siloxane or methylphenylpolysiloxane (see, for example, Japanese Unexamined Patent Application, First Publication No. H9-208438).

These solvents can be used alone, or two or more types can be used after mixing.

In the case of using a mixed solvent, combinations of a hydrocarbon solvent such as toluene or xylene and a lower alcohol solvent such as methanol, ethanol, isopropanol or t-butanol are preferable. Preferable examples of lower alcohol solvents in this case include secondary or higher lower alcohol solvents such as isopropanol or t-butanol. Although there are no particular limitations on the mixing ratio of the mixed solvent, the mixing ratio of a hydrocarbon solvent and lower alcohol solvent is preferably within the range of 99/1 to 50/50 by volume.

Although there are no particular limitations on the water used provided it is neutral, pure water, distilled water or ion exchange water is used preferably from the viewpoint of few impurities and obtaining a fine organic thin film.

The amount of water used is 0.5 to less than 2.0 times moles to 1 mole of the metal alkoxide.

In addition, an acid, base or dispersion stabilizer may be added during the partial hydrolysis reaction of the metal alkoxide by water. There are no particular limitations on the acid or base provided it functions as a dispersing agent for redispersing coagulated precipitate, a catalyst for producing a dispersoid such as colloidal particles by hydrolyzing and dehydrating/condensing the metal alkoxide, or a dispersant for the dispersoid formed.

Examples of acids used include inorganic acids such as hydrochloric acid, nitric acid, boric acid or fluoroboric acid; organic acids such as acetic acid, formic acid, oxalic acid, carbonic acid, trifluoroacetic acid, p-toluenesulfonic acid or methanesulfonic acid; and, photo acid generators which generate acid by being irradiated with light such as diphenyliodinium hexafluorophosphate or triphenylphosphonium hexafluorophosphate.

Examples of bases used include triethanol amine, triethyl amine, 1,8-diazabicyclo[5.4.0]-7-undecene, ammonia, dimethylformamide and phosphine.

Dispersion stabilizers are agents having the effect of stably dispersing a dispersoid in a dispersion medium, examples of which include dispersing agents, protective colloids and anti-coagulation agents such as surfactants. Specific examples include multivalent carboxylic acids such as glycolic acid, gluconic acid, lactic acid, tartaric acid, citric acid, malic acid or succinic acid; hydroxycarboxylic acids; phosphoric acids such as pyrophosphoric acid or tripolyphosphoric acid; polydentate ligand compounds having a strong chelating ability with respect to metal atoms such as acetyl acetone, methyl acetoacetic acid, ethyl acetoacetic acid, n-propyl acetoacetic acid, isopropyl acetoacetic acid, n-butyl acetoacetic acid, sec-butyl acetoacetic acid, t-butyl acetoacetic acid, 2,4-hexanedione, 2,4-heptanedione, 3,5-heptanedione, 2,4-octanedione, 2,4-nonanedione or 5-methyl-hexanedione; fatty acid amines, hydrostearic acids or polyester amines such as Solsperse 3000, 9000, 17000, 20000 or 24000 (all of the above are products of Zeneca Corp.) or Disperbyk-161, -162, -163 or -164 (all of the above are products of BYK-Chemie Corp.); and, silicone compounds such as dimethylpolysiloxane-methyl(polysiloxyalkylene)siloxane copolymer, trimethylsiloxysilicic acid, carboxy-modified silicone oil or amine-modified silicone (see, for example, Japanese Unexamined Patent Application, First Publication Nos. H9-208438 and 2000-53421).

The partial hydrolysis product obtained in the manner described above is in the form of a dispersoid having the property of stably dispersing without aggregating in an organic solvent and in the absence of an acid, base and/or dispersion stabilizer. In this case, a dispersoid refers to fine particles dispersed in a dispersion system, a specific example of which is colloidal particles.

Here, the state of stably dispersing without aggregating refers to the state in which a dispersoid of a hydrolysis product is not coagulate or non-uniformly separate in an organic solvent in the absence of an acid, base and/or dispersion stabilizer, and preferably refers to a transparent, uniform state.

In addition, transparent refers to the state of having high transmittance in visible light, and more specifically, refers to a state represented in terms of spectral transmittance as measured under conditions of a dispersoid concentration of 0.5% by weight as oxide, a quartz cell optical path length of 1 cm, the use of an organic solvent for the contrastive sample, and a light wavelength of 550 nm, and preferably refers to transmittance of 80 to 100%.

Although there are no particular limitations on the particle diameter of the dispersoid of the partial hydrolysis product, in order to obtain a high transmittance in visible light, it is normally 1 to 100 nm, preferably 1 to 50 nm, and more preferably 1 to 10 nm.

(4) Catalyst Capable of Interacting with Metal Surfactant

There are no particular limitations on the catalyst capable of interacting with the metal surfactant provided it interacts with the metal portion or hydrolytic group portion of the metal surfactant by means of coordinate or hydrogen bonding, and has action which promotes condensation by activating a hydrolytic group or hydroxyl group. In particular, it is preferably at least one type of compound selected from the group consisting of a metal oxide, metal alkoxide, metal alkoxide partial hydrolysis product, silanol condensation catalyst and acid catalyst, and more preferably a metal alkoxide or metal alkoxide partial hydrolysis product.

Although there are no particular limitations on the metal oxide, preferable examples include an oxide of at least one type of metal selected from the group consisting of titanium, zirconium, aluminum, silicon, germanium, indium, tin, tantalum, zinc, tungsten and lead.

The metal oxide can be used in the state of a sol, gel or solid and so forth. There are no particular limitations on the method used to produce a gel or sol, and examples of methods for producing a silica sol include a method consisting of cationic exchange of a sodium silicate solution, and a method consisting of hydrolysis of a silicon alkoxide. In particular, a sol stably dispersed in an organic solvent is preferable, and the particle diameter of the sol is preferably within the range of 10 to 100 nm, and more preferably 10 to 20 nm. There are no particular limitations on the form of the sol, and a spherical or long, narrow particles, and so forth can be used.

Specific examples include methanol silica sol, IPA-ST-UP, IPA-ST-ZL, NPC-ST-30, DMAC-ST, MEK-ST, MIBK-ST, XBA-ST and PMA-ST (all of the above are trade names of organosilica sols manufactured by Nissan Chemical Industries, Ltd.).

Although there are no particular limitations on the metal alkoxide, alkoxides of the aforementioned metals are preferable for reasons such as being able to obtain an organic thin film having superior transparency, and although there are no particular limitations on the number of carbon atoms of the alkoxy group of the metal alkoxide, it is more preferably 1 to 4 carbon atoms in view of the contained oxide concentration, ease of eliminating organic substances, ease of acquisition and so forth.

Specific examples of metal alkoxides used in the present invention include metal alkoxides of the aforementioned metal alkoxides, and these metal alkoxides can be used alone or two or more types can be used in combination.

In addition, in the present invention, complex alkoxides obtained by reacting two or more types of metal alkoxides, complex alkoxides obtained by reacting one or more types of metal alkoxides and one or more types of a metal salt, and combinations thereof can be used for the metal alkoxide.

Examples of complex alkoxides obtained by reacting two or more types of metal alkoxides include the previously listed examples of complex alkoxides.

Specific examples include the aforementioned $BaTi(OR)_6$, $SrTi(OR)_6$, $BaZr(OR)_6$, $SrZr(OR)_6$, $LiNb(OR)_6$, $LiTa(OR)_6$ and combinations thereof, and reaction products, condensation products and so forth of the aforementioned metal alkoxides and silicon alkoxides such as $LiVO(OR)_4$, $MgAl_2(OR)_8$, $(RO)_3SiOAl(OR')_2$, $(RO)_3SiOTi(OR')_3$, $(RO)_3SiOZr(OR')_3$, $(RO)_3SiOB(OR')_2$, $(RO)_3SiONb(OR')_4$ and $(RO)_3SiOTa(OR')_4$. Here, R and R' represent, for example, alkyl groups.

Examples of complex alkoxides obtained by reacting one or more types of metal alkoxides with one or more types of metal salts include compounds obtained by reacting a metal salt with a metal alkoxide.

Examples of metal salts and metal alkoxide partial hydrolysis products include the previously listed examples.

In addition, a preferable example of a method for producing a partial hydrolysis product of a metal alkoxide consists of using 0.5 to less than 2.0 times moles of water to the aforementioned examples of metal alkoxides, and hydrolyzing within a temperature range from −100° C. to the reflux temperature of the organic solvent in the aforementioned organic solvent. Specific examples include the aforementioned method.

The previously described examples can be used for the reaction between the metal alkoxide and water, concentration of the metal alkoxide in the organic solvent, methods (i), (ii) and (iii), organic solvent used, and specific examples of organic solvents used.

These solvents can be used alone, or two or more types can be used after mixing.

In the case of using a mixed solvent, combinations of a hydrocarbon solvent such as toluene or xylene and a lower alcohol solvent such as methanol, ethanol, isopropanol or t-butanol are preferable. Preferable examples of lower alcohol solvents in this case include secondary or higher lower alcohol solvents such as isopropanol or t-butanol. Although there are no particular limitations on the mixing ratio of the mixed solvent, the mixing ratio of a hydrocarbon solvent and lower alcohol solvent is preferably within the range of 99/1 to 50/50 by volume.

Although there are no particular limitations on the water used provided it is neutral, pure water, distilled water or ion exchange water is used preferably from the viewpoint of few impurities and obtaining a fine organic thin film.

The amount of water used is 2 times moles or more, preferably 2.0 to 8.0 times moles, and more preferably 3 to 5 times moles to the aforementioned metal alkoxide.

In addition, an acid, base or dispersion stabilizer may be added during the hydrolysis reaction of the metal alkoxide by water. There are no particular limitations on the acid or base provided it functions as a dispersing agent for redispersing coagulated precipitate, catalyst for hydrolyzing the metal alkoxide and producing a dispersoid such as colloidal particles by dehydration/condensation, and a dispersant for the dispersoid formed.

Examples of acids used, dispersion stabilizers, partial hydrolysis products, the state of stably dispersing without coagulating and transparency are the same as previously described, and although there are no particular limitations on the particle diameter of the dispersoid of the hydrolysis product, in order to obtain a high transmittance in visible light, it is normally 1 to 100 nm, preferably 1 to 50 nm, and more preferably 1 to 10 nm.

Examples of silanol condensation catalysts used as catalysts capable of interacting with the metal surfactant include metal carboxylates, metal carboxylate esters, metal carboxylate polymers, metal carboxylate chelates, titanate esters and titanate ester chelates.

Specific examples include stannous acetate, dibutyl tin dilaurate, dibutyl tin dioctate, dibutyl tin diacetate, dioctyl tin dilaurate, dioctyl tin dioctate, dioctyl tin diacetate, stannous dioctanoate, lead naphthenate, cobalt naphthenate, iron 2-ethylhexanoate, dioctyl tin bisoctylthioglycoate, dioctyl tin maleate, dibutyl tin maleate polymer, dimethyl tin mercaptopropionate polymer, dibutyl tin bisacetyl acetate, dioctyl tin bisacetyl laurate, titanium tetraethoxide, titanium tetrabutoxide, titanium tetraisopropoxide and titanium bis(acetylacetonyl)dipropoxide.

Examples of acid catalysts used as a catalyst capable of interacting with the metal surfactant include mineral acids such as hydrochloric acid, nitric acid, boric acid or fluoroboric acid, and organic acids such as acetic acid, formic acid, oxalic acid, carbonic acid, trifluoroacetic acid, p-toluenesulfonic acid and methanesulfonic acid, as well as photo acid generators which generate acid by being irradiated with light, specific examples of which include diphenyliodinium hexafluorophosphate or triphenylphosphonium hexafluorophosphate.

Although there are no particular limitations on the amount of catalyst capable of interacting with the metal surfactant used provided it is an amount which does not effect the physical properties of the unimolecular organic thin film formed, it is normally 0.001 to 1 mole and preferably 0.001 to 0.2 moles to 1 mole of metal surfactant in terms of the number of moles as oxide.

(5) Hydroxyl Group-Containing Compound

The aforementioned hydroxyl group-containing compound is a compound in which a hydrolytic group of the metal surfactant has been changed to a hydroxyl group due to the metal surfactant being hydrolyzed as a result of reacting with water. There are no particular limitations on the hydroxyl group-containing compound provided it has at least one hydroxyl group and hydrophobic group within the same molecule. Specific examples include compounds having one hydroxyl group, compounds having two hydroxyl groups, and compounds having three hydroxyl groups, while a particularly preferable example is a compound represented by the following formula (VI):

$$R^{100}{}_n MX_{m-n-1}(OH) \quad (VI)$$

(wherein, $R^{100}$, M, X, m and n are the same as previously defined, and X may be the same or different when (m−n−1) is 2 or more).

Specific examples of hydroxyl group-containing compounds are indicated in groups A to C below. Although compounds in which a silicon atom is used for the metal atom M are shown as typical examples in the following examples, examples also include similar compounds in the case of another metal atom M as well.

(Group A) Compounds Having One Hydroxyl Group $CH_3(CH_2)_7Si(OCH_3)_2(OH)$
$CH_3(CH_2)_8Si(OCH_3)_2(OH)$
$CH_3(CH_2)_9Si(OCH_3)_2(OH)$
$CH_3(CH_2)_{10}Si(OCH_3)_2(OH)$
$CH_3(CH_2)_{11}Si(OCH_3)_2(OH)$
$CH_3(CH_2)_{12}Si(OCH_3)_2(OH)$
$CH_3(CH_2)_{13}Si(OCH_3)_2(OH)$
$CH_3(CH_2)_{14}Si(OCH_3)_2(OH)$
$CH_3(CH_2)_{15}Si(OCH_3)_2(OH)$
$CH_3(CH_2)_{16}Si(OCH_3)_2(OH)$
$CH_3(CH_2)_{17}Si(OCH_3)_2(OH)$
$CH_3(CH_2)_{18}Si(OCH_3)_2(OH)$
$CH_3(CH_2)_{19}Si(OCH_3)_2(OH)$
$CH_3CH_2O(CH_2)_{15}Si(OCH_3)_2(OH)$
$CF_3CH_2O(CH_2)_{15}Si(OCH_3)_2(OH)$
$CH_3(CH_2)_2Si(CH_3)_2(CH_2)_{15}Si(OCH_3)_2(OH)$
$CH_3(CH_2)_6Si(CH_3)_2(CH_2)_9Si(OCH_3)_2(OH)$
$CH_3COO(CH_2)_{15}Si(OCH_3)_2(OH)$
$CF_3(CF_2)_5(CH_2)_2Si(OCH_3)_2(OH)$
$CH_3CH_2O(CH_2)_{15}Si(OC_2H_5)_2(OH)$
$CF_3(CF_2)_7(CH=CH)_3Si(OCH_3)_2(OH)$
$CH_3(CH_2)_2Si(CH_3)_2(CH_2)_{15}Si(OC_2H_5)_2(OH)$
$CH_3(CH_2)_6Si(CH_3)_2(CH_2)_9Si(OC_2H_5)_2(OH)$
$CF_3(CH_2)_6Si(CH_3)_2(CH_2)_9Si(OC_2H_5)_2(OH)$
$CH_3COO(CH_2)_{15}Si(OC_2H_5)_2(OH)$
$CF_3COO(CH_2)_{15}Si(OC_2H_5)_2(OH)$
$CF_3COO(CH_2)_{15}Si(OCH_3)_2(OH)$
$CF_3(CF_2)_9(CH_2)_2Si(OC_2H_5)_2(OH)$
$CF_3(CF_2)_7(CH_2)_2Si(OC_2H_5)_2(OH)$
$CF_3(CF_2)_5(CH_2)_2Si(OC_2H_5)_2(OH)$
$CF_3(CF_2)_7(CH=CH)_3Si(OC_2H_5)_2(OH)$
$CF_3(CF_2)_9(CH_2)_2Si(OCH_3)_2(OH)$
$CF_3(CF_2)_5(CH_2)_2Si(OCH_3)_2(OH)$
$CF_3(CF_2)_7(CH_2)_2Si(CH_3)(OC_2H_5)(OH)$
$CF_3(CF_2)_7(CH_2)_2Si(CH_3)(OCH_3)(OH)$
$CF_3(CH_2)_2Si(OCH_3)_2(OH)$
$CF_3(CF_2)_3(CH_2)_2Si(OCH_3)_2(OH)$
$CF_3(CF_2)_5(CH_2)_2Si(OCH_3)_2(OH)$
$CF_3(CF_2)_7(CH_2)_2Si(OCH_3)_2(OH)$
$CF_3(CF_2)_3(CH_2)_3Si(OCH_3)_2(OH)$
$CF_3(CF_2)_5(CH_2)_3Si(OCH_3)_2(OH)$
$CF_3(CF_2)_7(CH_2)_3Si(OCH_3)_2(OH)$
$CF_3(CF_2)_4O(CF_2)_2(CH_2)_2Si(OCH_3)_2(OH)$
$CF_3(CF_2)_4O(CF_2)_2(CH_2)_3Si(OCH_3)_2(OH)$
$CF_3(CF_2)_7(CH_2)_2O(CH_2)_3Si(OCH_3)_2(OH)$
$CF_3(CF_2)_7CONH(CH_2)_2Si(OCH_3)_2(OH)$
$CF_3(CF_2)_7CONH(CH_2)_3Si(OCH_3)_2(OH)$
$CF_3(CF_2)_3O[CF(CF_3)CF(CF_3)O]_2CF(CF_3)CONH(CH_2)_3Si(OCH_3)_2(OH)$
$CF_3(CF_2)_3(CH_2)_2Si(CH_3)(OCH_3)(OH)$ CF$_3$(CF$_2$)$_5$(CH$_2$)$_2$Si(CH$_3$)(OCH$_3$)(OH)
CF$_3$(CH$_2$)$_2$Si(CH$_3$)(OCH$_3$)(OH)
CF$_3$(CF$_2$)$_3$(CH$_2$)$_3$Si(CH$_3$)(OCH$_3$)(OH)
CF$_3$(CF$_2$)$_5$(CH$_2$)$_3$Si(CH$_3$)(OCH$_3$)(OH)
CF$_3$(CF$_2$)$_7$(CH$_2$)$_3$Si(CH$_3$)(OCH$_3$)(OH)
CF$_3$(CF$_2$)$_4$(CF$_2$)$_2$(CH$_2$)$_2$Si(CH$_3$)(OCH$_3$)(OH)
CF$_3$(CF$_2$)$_4$(CF$_2$)$_2$(CH$_2$)$_3$Si(CH$_3$)(OCH$_3$)(OH)
CF$_3$(CF$_2$)$_4$(CH$_2$)$_2$O(CH$_2$)$_3$Si(CH$_3$)(OCH$_3$)(OH)
CF$_3$(CF$_2$)$_7$CONH(CH$_2$)$_2$Si(CH$_3$)(OCH$_3$)(OH)
CF$_3$(CF$_2$)$_7$CONH(CH$_2$)$_3$Si(CH$_3$)(OCH$_3$)(OH)
CF$_3$(CF$_2$)$_3$O[CF(CF$_3$)CF(CF$_3$)O]$_2$CF(CF$_3$)CONH(CH$_2$)$_3$Si(CH$_3$)(OCH$_3$)(OH)
CH$_3$(CH$_2$)$_7$Si(OCH$_3$)$_2$(OH)
CH$_3$(CF$_2$)$_7$(CH$_2$)$_2$Si(OCH$_3$)$_2$(OH)
CH$_3$(CF$_2$)$_7$(CH$_2$)$_2$Si(CH$_3$)(OCH$_3$)(OH)
CH$_3$(CF$_2$)$_7$(CH$_2$)$_2$Si(OCH$_3$)$_2$(OH)
CH$_3$(CF$_2$)$_7$(CH$_2$)$_2$Si(NCO)$_2$(OH)
CH$_3$(CF$_2$)$_8$(CH$_2$)$_2$Si(OCH$_3$)$_2$(OH)
CH$_3$(CF$_2$)$_8$(CH$_2$)$_2$Si(NCO)$_2$(OH)
CH$_3$(CF$_2$)$_9$(CH$_2$)$_2$Si(OCH$_3$)$_2$(OH)
CH$_3$(CF$_2$)$_9$(CH$_2$)$_2$Si(NCO)$_2$(OH)
CH$_3$CH$_2$(CF$_2$)$_6$(CH$_2$)$_2$Si(OCH$_3$)$_2$(OH)
CH$_3$CH$_2$(CF$_2$)$_6$(CH$_2$)$_2$Si(OCH$_3$)$_2$(OH)
CH$_3$CH$_2$(CF$_2$)$_6$(CH$_2$)$_2$Si(NCO)$_2$(OH)
CH$_3$CH$_2$(CF$_2$)$_8$(CH$_2$)$_2$Si(OCH$_3$)$_2$(OH)
CH$_3$CH$_2$(CF$_2$)$_8$(CH$_2$)$_2$Si(NCO)$_2$(OH)
CH$_3$CH$_2$(CF$_2$)$_{10}$(CH$_2$)$_2$Si(OCH$_3$)$_2$(OH)
CH$_3$(CF$_2$)$_4$O(CF$_2$)$_2$(CH$_2$)$_2$Si(OCH$_3$)$_2$(OH)
CH$_3$(CF$_2$)$_7$(CH$_2$)$_2$O(CH$_2$)$_3$Si(OCH$_3$)$_2$(OH)
CH$_3$(CF$_2$)$_8$(CH$_2$)$_2$O(CH$_2$)$_3$Si(OCH$_3$)$_2$(OH)
CH$_3$(CF$_2$)$_9$(CH$_2$)$_2$O(CH$_2$)$_3$Si(OCH$_3$)$_2$(OH)
CH$_3$CH$_2$(CF$_2$)$_6$(CH$_2$)$_2$O(CH$_2$)$_3$Si(OCH$_3$)$_2$(OH)
CH$_3$(CF$_2$)$_6$CONH(CH$_2$)$_3$Si(OCH$_3$)$_2$(OH)
CH$_3$(CF$_2$)$_8$CONH(CH$_2$)$_3$Si(OCH$_3$)$_2$(OH)
CH$_3$(CF$_2$)$_3$O[CF(CF$_3$)CF(CF$_3$)O]$_2$CF(CF$_3$)CONH(CH$_2$)$_3$Si(OCH$_3$)$_2$(OH)
CF$_3$(CF$_2$)$_7$(CH$_2$)$_2$Si(CH$_3$)$_2$(OH)

(Group B) Compounds Having Two Hydroxyl Groups

CH$_3$(CH$_2$)$_7$Si(OCH$_3$)(OH)$_2$
CH$_3$(CH$_2$)$_8$Si(OCH$_3$)(OH)$_2$
CH$_3$(CH$_2$)$_9$Si(OCH$_3$)(OH)$_2$
CH$_3$(CH$_2$)$_{10}$Si(OCH$_3$)(OH)$_2$
CH$_3$(CH$_2$)$_{11}$Si(OCH$_3$)(OH)$_2$
CH$_3$(CH$_2$)$_{12}$Si(OCH$_3$)(OH)$_2$
CH$_3$(CH$_2$)$_{13}$Si(OCH$_3$)(OH)$_2$
CH$_3$(CH$_2$)$_{14}$Si(OCH$_3$)(OH)$_2$
CH$_3$(CH$_2$)$_{15}$Si(OCH$_3$)(OH)$_2$
CH$_3$(CH$_2$)$_{16}$Si(OCH$_3$)(OH)$_2$
CH$_3$(CH$_2$)$_{17}$Si(OCH$_3$)(OH)$_2$
CH$_3$(CH$_2$)$_{18}$Si(OCH$_3$)(OH)$_2$
CH$_3$(CH$_2$)$_{19}$Si(OCH$_3$)(OH)$_2$
CH$_3$CH$_2$O(CH$_2$)$_{15}$Si(OCH$_3$)(OH)$_2$
CF$_3$CH$_2$O(CH$_2$)$_{15}$Si(OCH$_3$)(OH)$_2$
CH$_3$(CH$_2$)$_2$Si(CH$_3$)$_2$(CH$_2$)$_{15}$Si(OCH$_3$)(OH)$_2$
CH$_3$(CH$_2$)$_6$Si(CH$_3$)$_2$(CH$_2$)$_9$Si(OCH$_3$)(OH)$_2$
CH$_3$COO(CH$_2$)$_{15}$Si(OCH$_3$)(OH)$_2$
CF$_3$(CF$_2$)$_5$(CH$_2$)$_2$Si(OCH$_3$)(OH)$_2$
CF$_3$(CF$_2$)$_7$(CH=CH)$_3$Si(OCH$_3$)(OH)$_2$
CH$_3$CH$_2$O(CH$_2$)$_{15}$Si(OC$_2$H$_5$)(OH)$_2$
CH$_3$(CH$_2$)$_2$Si(CH$_3$)$_2$(CH$_2$)$_{15}$Si(OC$_2$H$_5$)(OH)$_2$
CH$_3$(CH$_2$)$_6$Si(CH$_3$)$_2$(CH$_2$)$_9$Si(OC$_2$H$_5$)(OH)$_2$
CH$_3$(CH$_2$)$_6$Si(CH$_3$)$_2$(CH$_2$)$_9$Si(OC$_2$H$_5$)(OH)$_2$
CH$_3$COO(CH$_2$)$_{15}$Si(OC$_2$H$_5$)(OH)$_2$
CF$_3$COO(CH$_2$)$_{15}$Si(OC$_2$H$_5$)(OH)$_2$
CF$_3$COO(CH$_2$)$_{15}$Si(OCH$_3$)(OH)$_2$
CF$_3$(CF$_2$)$_9$(CH$_2$)$_2$Si(OC$_2$H$_5$)(OH)$_2$
CF$_3$(CF$_2$)$_7$(CH$_2$)$_2$Si(OC$_2$H$_5$)(OH)$_2$
CF$_3$(CF$_2$)$_5$(CH$_2$)$_2$Si(OC$_2$H$_5$)(OH)$_2$
CF$_3$(CF$_2$)$_7$(CH=CH)$_3$Si(OC$_2$H$_5$)(OH)$_2$
CF$_3$(CF$_2$)$_9$(CH$_2$)$_2$Si(OCH$_3$)(OH)$_2$
CF$_3$(CF$_2$)$_5$(CH$_2$)$_2$Si(OCH$_3$)(OH)$_2$
CF$_3$(CF$_2$)$_7$(CH$_2$)$_2$Si(CH$_3$)(OH)$_2$
CF$_3$(CF$_2$)$_9$(CH$_2$)$_2$Si(CH$_3$)(OH)$_2$
CF$_3$(CH$_2$)$_2$Si(OCH$_3$)(OH)$_2$
CF$_3$(CF$_2$)$_3$(CH$_2$)$_2$Si(OCH$_3$)(OH)$_2$
CF$_3$(CF$_2$)$_5$(CH$_2$)$_2$Si(OCH$_3$)(OH)$_2$
CF$_3$(CF$_2$)$_7$(CH$_2$)$_2$Si(OCH$_3$)(OH)$_2$
CF$_3$(CF$_2$)$_3$(CH$_2$)$_3$Si(OCH$_3$)(OH)$_2$
CF$_3$(CF$_2$)$_5$(CH$_2$)$_3$Si(OCH$_3$)(OH)$_2$
CF$_3$(CF$_2$)$_7$(CH$_2$)$_3$Si(OCH$_3$)(OH)$_2$
CF$_3$(CF$_2$)$_4$O(CF$_2$)$_2$(CH$_2$)$_2$Si(OCH$_3$)(OH)$_2$
CF$_3$(CF$_2$)$_4$O(CF$_2$)$_2$(CH$_2$)$_3$Si(OCH$_3$)(OH)$_2$
CF$_3$(CF$_2$)$_7$(CH$_2$)$_2$O(CH$_2$)$_3$Si(OCH$_3$)(OH)$_2$
CF$_3$(CF$_2$)$_7$CONH(CH$_2$)$_2$Si(OCH$_3$)(OH)$_2$
CF$_3$(CF$_2$)$_7$CONH(CH$_2$)$_3$Si(OCH$_3$)(OH)$_2$
CF$_3$(CF$_2$)$_3$O[CF(CF$_3$)CF(CF$_3$)O]$_2$CF(CF$_3$)CONH(CH$_2$)$_3$Si(OCH$_3$)(OH)$_2$
CH$_3$(CH$_2$)$_7$Si(OCH$_3$)(OH)$_2$
CH$_3$(CF$_2$)$_7$(CH$_2$)$_2$Si(OCH$_3$)(OH)$_2$
CH$_3$(CF$_2$)$_7$(CH$_2$)$_2$Si(OCH$_3$)(OH)$_2$
CH$_3$(CF$_2$)$_7$(CH$_2$)$_2$Si(NCO)(OH)$_2$
CH$_3$(CF$_2$)$_8$(CH$_2$)$_2$Si(OCH$_3$)(OH)$_2$
CH$_3$(CF$_2$)$_8$(CH$_2$)$_2$Si(NCO)(OH)$_2$
CH$_3$(CF$_2$)$_9$(CH$_2$)$_2$Si(OCH$_3$)(OH)$_2$
CH$_3$(CF$_2$)$_9$(CH$_2$)$_2$Si(NCO)(OH)$_2$
CH$_3$CH$_2$(CF$_2$)$_6$(CH$_2$)$_2$Si(OCH$_3$)(OH)$_2$
CH$_3$CH$_2$(CF$_2$)$_6$(CH$_2$)$_2$Si(OCH$_3$)(OH)$_2$
CH$_3$CH$_2$(CF$_2$)$_6$(CH$_2$)$_2$Si(NCO)(OH)$_2$
CH$_3$CH$_2$(CF$_2$)$_8$(CH$_2$)$_2$Si(OCH$_3$)(OH)$_2$
CH$_3$CH$_2$(CF$_2$)$_8$(CH$_2$)$_2$Si(NCO)(OH)$_2$
CH$_3$CH$_2$(CF$_2$)$_{10}$(CH$_2$)$_2$Si(OCH$_3$)(OH)$_2$
CH$_3$(CF$_2$)$_4$O(CF$_2$)$_2$(CH$_2$)$_2$Si(OCH$_3$)(OH)$_2$
CH$_3$(CF$_2$)$_7$(CH$_2$)$_2$O(CH$_2$)$_3$Si(OCH$_3$)(OH)$_2$
CH$_3$(CF$_2$)$_8$(CH$_2$)$_2$O(CH$_2$)$_3$Si(OCH$_3$)(OH)$_2$
CH$_3$(CF$_2$)$_9$(CH$_2$)$_2$O(CH$_2$)$_3$Si(OCH$_3$)(OH)$_2$
CH$_3$CH$_2$(CF$_2$)$_6$(CH$_2$)$_2$O(CH$_2$)$_3$Si(OCH$_3$)(OH)$_2$
CH$_3$(CF$_2$)$_6$CONH(CH$_2$)$_3$Si(OCH$_3$)(OH)$_2$
CH$_3$(CF$_2$)$_8$CONH(CH$_2$)$_3$Si(OCH$_3$)(OH)$_2$
CH$_3$(CF$_2$)$_3$O[CF(CF$_3$)CF(CF$_3$)O]$_2$CF(CF$_3$)CONH(CH$_2$)$_3$Si(OCH$_3$)(OH)$_2$ (Group C) Compounds Having Three Hydroxyl Groups CH$_3$(CH$_2$)$_7$Si(OH)$_3$
CH$_3$(CH$_2$)$_8$Si(OH)$_3$
CH$_3$(CH$_2$)$_9$Si(OH)$_3$
CH$_3$(CH$_2$)$_{10}$Si(OH)$_3$
CH$_3$(CH$_2$)$_{11}$Si(OH)$_3$
CH$_3$(CH$_2$)$_{12}$Si(OH)$_3$
CH$_3$(CH$_2$)$_{13}$Si(OH)$_3$
CH$_3$(CH$_2$)$_{14}$Si(OH)$_3$
CH$_3$(CH$_2$)$_{15}$Si(OH)$_3$
CH$_3$(CH$_2$)$_{16}$Si(OH)$_3$
CH$_3$(CH$_2$)$_{17}$Si(OH)$_3$
CH$_3$(CH$_2$)$_{18}$Si(OH)$_3$
CH$_3$(CH$_2$)$_{19}$Si(OH)$_3$
CH$_3$CH$_2$O(CH$_2$)$_{15}$Si(OH)$_3$
CF$_3$CH$_2$O(CH$_2$)$_{15}$Si(OH)$_3$
CH$_3$(CH$_2$)$_2$Si(CH$_3$)$_2$(CH$_2$)$_{15}$Si(OH)$_3$
CH$_3$(CH$_2$)$_6$Si(CH$_3$)$_2$(CH$_2$)$_9$Si(OH)$_3$
CH$_3$COO(CH$_2$)$_{15}$Si(OH)$_3$
CF$_3$(CF$_2$)$_5$(CH$_2$)$_2$Si(OH)$_3$
CF$_3$(CF$_2$)$_7$(CH=CH)$_3$Si(OH)$_3$
CH$_3$CH$_2$O(CH$_2$)$_{15}$Si(OH)
CH$_3$(CH$_2$)$_2$Si(CH$_3$)$_2$(CH$_2$)$_{15}$Si(OH)$_3$
CH$_3$(CH$_2$)$_6$Si(CH$_3$)$_2$(CH$_2$)$_9$Si(OH)$_3$ $CF_3(CH_2)_6Si(CH_3)_2(CH_2)_9Si(OH)_3$
$CH_3COO(CH_2)_{15}Si(OH)_3$
$CF_3COO(CH_2)_{15}Si(OH)_3$
$CF_3COO(CH_2)_{15}Si(OH)_3$
$CF_3(CF_2)_9(CH_2)_2Si(OH)_3$
$CF_3(CF_2)_7(CH_2)_2Si(OH)_3$
$CF_3(CF_2)_5(CH_2)_2Si(OH)_3$
$CF_3(CF_2)_7(CH=CH)_3Si(OH)_3$
$CF_3(CF_2)_9(CH_2)_2Si(OH)_3$
$CF_3(CF_2)_5(CH_2)_2Si(OH)_3$
$CF_3(CH_2)_2Si(OH)_3$
$CF_3(CF_2)_3(CH_2)_2Si(OH)_3$
$CF_3(CF_2)_5(CH_2)_2Si(OH)_3$
$CF_3(CF_2)_7(CH_2)_2Si(OH)_3$
$CF_3(CF_2)_3(CH_2)_3Si(OH)_3$
$CF_3(CF_2)_5(CH_2)_3Si(OH)_3$
$CF_3(CF_2)_7(CH_2)_3Si(OH)_3$
$CF_3(CF_2)_4O(CF_2)_2(CH_2)_2Si(OH)_3$
$CF_3(CF_2)_4O(CF_2)_2(CH_2)_3Si(OH)_3$
$CF_3(CF_2)_7(CH_2)_2O(CH_2)_3Si(OH)_3$
$CF_3(CF_2)_7CONH(CH_2)_2Si(OH)_3$
$CF_3(CF_2)_7CONH(CH_2)_3Si(OH)_3$
$CF_3(CF_2)_3O[CF(CF_3)CF(CF_3)O]_2CF(CF_3)CONH(CH_2)_3Si(OH)_3$
$CH_3(CH_2)_7Si(OH)_3$
$CH_3(CF_2)_7(CH_2)_2Si(OH)_3$
$CH_3(CF_2)_7(CH_2)_2Si(OH)_3$
$CH_3(CF_2)_7(CH_2)_2Si(OH)_3$
$CH_3(CF_2)_8(CH_2)_2Si(OH)_3$
$CH_3(CF_2)_8(CH_2)_2Si(OH)_3$
$CH_3(CF_2)_9(CH_2)_2Si(OH)_3$
$CH_3(CF_2)_9(CH_2)_2Si(OH)_3$
$CH_3CH_2(CF_2)_6(CH_2)_2Si(OH)_3$
$CH_3CH_2(CF_2)_6(CH_2)_2Si(OH)_3$
$CH_3CH_2(CF_2)_6(CH_2)_2Si(OH)_3$
$CH_3CH_2(CF_2)_8(CH_2)_2Si(OH)_3$
$CH_3CH_2(CF_2)_8(CH_2)_2Si(OH)_3$
$CH_3CH_2(CF_2)_{10}(CH_2)_2Si(OH)_3$
$CH_3(CF_2)_4O(CF_2)_2(CH_2)_2Si(OH)_3$
$CH_3(CF_2)_7(CH_2)_2O(CH_2)_3Si(OH)_3$
$CH_3(CF_2)_8(CH_2)_2O(CH_2)_3Si(OH)_3$
$CH_3(CF_2)_9(CH_2)_2O(CH_2)_3Si(OH)_3$
$CH_3CH_2(CF_2)_6(CH_2)_2O(CH_2)_3Si(OH)_3$
$CH_3(CF_2)_6CONH(CH_2)_3Si(OH)_3$
$CH_3(CF_2)_8CONH(CH_2)_3Si(OH)_3$
$CH_3(CF_2)_3O[CF(CF_3)CF(CF_3)O]_2CF(CF_3)CONH(CH_2)_3Si(OH)_3$ These compounds can be used alone or two or more types can be used in combination.

(6) Organic Solvent

Examples of the organic solvent used in the aforementioned organic solvent solution include hydrocarbon solvents, fluorocarbon solvents and silicone solvents, with hydrocarbon solvents being preferable, and hydrocarbon solvents having a boiling point of 100 to 250° C. being particularly preferable.

Specific examples of organic solvents include hydrocarbon solvents such as n-hexane, cyclohexane, benzene, toluene, xylene, petroleum naphtha, solvent naphtha, petroleum ether, petroleum benzene, isoparaffin, normal paraffin, decalin, industrial gasoline, kerosene or ligroin; chlorofluorohydrocarbon solvents such as $CBr_2ClCF_3$, $CClF_2CF_2CCl_3$, $CClF2CF_2CHFCl$, $CF_3CF_2CHCl_2$, $CF_3CBrFCBrF_2$, $CClF_2CClFCF_2CCl_3$, $Cl(CF_2CFCl)_2Cl$, $Cl(CF_2CFCl)_2CF_2CCl_3$ and $Cl(CF_2CFCl)_3Cl$; fluorocarbon solvents such as fluorinert (manufactured by 3M) or Afrude (manufactured by Asahi Glass); and, silicone solvents such as dimethyl silicone, phenyl silicone, alkyl-modified silicone and polyether silicone. These solvents can be used alone or two or more types can be used in combination.

(7) Preparation of Auxiliary Agent for Forming an Organic Thin Film

An auxiliary agent for forming an organic thin film of the present invention can be obtained by mixing the aforementioned metal surfactant (1) and a compound capable of interacting with the aforementioned metal surfactant (1) (hereinafter to be referred to as "component B").

More specifically, the auxiliary agent for forming an organic thin film can be prepared by treating the aforementioned metal surfactant (1) with water in an organic solvent in the presence of component B.

In the present invention, the metal surfactant (1) is preferably contained in the auxiliary agent for forming an organic thin film at 0.5 to 8.0 moles, and more preferably at 1.5 to 3.0 moles, to 1 mole of component B.

Specific examples of methods for treating the metal surfactant (1) with water in an organic solvent in the presence of component (B) include: (a) a method in which water is added to an organic solvent solution of the metal surfactant (1) and component B, and (b) a method in which component B is added to an organic solvent solution of the metal surfactant (1) and water. Component B is typically used in the state of an organic solvent containing water.

Preferable examples of organic solvents used to prepare the auxiliary agent for forming an organic thin film include hydrocarbon solvents, fluorocarbon solvents and silicone solvents, with those having a boiling point of 100 to 250° C. being used particularly preferably.

Specific examples of organic solvents include hydrocarbon solvents such as n-hexane, cyclohexane, benzene, toluene, xylene, petroleum naphtha, solvent naphtha, petroleum ether, petroleum benzene, isoparaffin, normal paraffin, decalin, industrial gasoline, kerosene or ligroin; chlorofluorohydrocarbon solvents such as $CBr_2ClCF_3$, $CClF_2CF_2CCl_3$, $CClF2CF_2CHFCl$, $CF_3CF_2CHCl_2$, $CF_3CBrFCBrF_2$, $CClF_2CClFCF_2CCl_3$, $Cl(CF_2CFCl)_2Cl$, $Cl(CF_2CFCl)_2CF_2CCl_3$ and $Cl(CF_2CFCl)_3Cl$; fluorocarbon solvents such as fluorinate (3M) or Afrude (Asahi Glass); and, silicone solvents such as dimethyl silicone, phenyl silicone, alkyl-modified silicone and polyether silicone. These solvents can be used alone or two or more types can be used in combination.

In addition, the water added in method (a) and component B added in method (b) are preferably diluted with an organic solvent and so forth to inhibit violent reactions.

An auxiliary agent for forming an organic thin film obtained in the manner described above is preferably able to interact with the aforementioned metal surfactant (2).

(8) Preparation of Solution for Forming an Organic Thin Film

A solution for forming an organic thin film of the present invention can be obtained from the auxiliary agent for forming an organic thin film and the metal surfactant (2). More specifically, the solution for forming an organic thin film of the present invention can be obtained by stirring a mixture of the metal surfactant (2), an organic solvent, the auxiliary agent for forming an organic thin film and, as desired, water.

Although there are no particular limitations on the amount of auxiliary agent for forming an organic thin film used to prepare the solution for forming an organic thin film of the present invention provided it does not effect the physical properties of the unimolecular organic thin film formed, it is normally 0.001 to 1 mole and preferably 0.001 to 0.2 moles to 1 mole of metal surfactant (2) as the number of moles as oxide.

Specific examples of methods for preparing the solution for forming an organic thin film of the present invention include: (a) a method in which water is added to an organic solvent solution of the auxiliary agent for forming an organic thin film and the metal surfactant (2), and (b) a method in which the auxiliary agent for forming an organic thin film is added to a mixed solution of the metal surfactant (2) and water. In addition, the water added in method (a) and the auxiliary agent for forming an organic thin film added in method (b) are preferably diluted with an organic solvent and so forth to inhibit violent reactions.

Preferable examples of organic solvents used to prepare the solution for forming an organic thin film of the present invention include hydrocarbon solvents, fluorocarbon solvents and silicone solvents, with those having a boiling point of 100 to 250° C. being used particularly preferably. More specifically, the same hydrocarbon solvents, fluorocarbon solvents, and silicone solvents previously listed as examples able to be used to prepare the auxiliary agent for forming an organic thin film can be used.

The amount of water used to prepare the solvent for forming an organic thin film of the present invention can be suitably determined according to the types of metal surfactant (2) used, auxiliary agent for forming an organic thin film used, substrate to be coated and so forth. If the amount of water used is excessively large, the metal surfactant (2) bonds to itself and chemical adsorption to the substrate surface is inhibited, thereby resulting in the risk of a monolayer not being formed.

The stirring temperature of the mixture of the metal surfactant (2), organic solvent, auxiliary agent for forming an organic thin film and water is normally −100 to +100° C. and preferably −20 to +50° C. The stirring time is normally from several minutes to several hours.

In addition, ultrasound treatment is preferably carried out in this case to obtain a uniform solution for forming an organic thin film.

Although a precipitate containing metal oxide and so forth may form in the prepared solution for forming an organic thin film, impurities such as these precipitates are preferably removed to obtain a fine, unimolecular organic thin film free of impurities. Precipitates can be easily removed by a procedure such as filtration or decanting.

In the present invention, a solution in which the moisture content thereof has been adjusted or maintained to be within a predetermined range is used for the solution for forming an organic thin film. The moisture content of the solution for forming an organic thin film is preferably an amount within a range which does not cause problems such as inhibition of chemical adsorption to the substrate surface, prevention of the production of a fine, monolayer, loss of the amount of metal surfactant enabling effective use, or catalyst deactivation. In addition, in the case of contacting the solution with the substrate by dipping, a moisture content greater than that sufficient for promoting and activating the substrate surface or film formation is preferable for forming a fine, uniform organic thin film once and over the entire surface of the substrate contacted by the solution within a contact time of 10 minutes and preferably within 5 minutes.

More specifically, the moisture content of the solution for forming an organic thin film is preferably 50 ppm or more, and more preferably within the range from 50 ppm to the saturated moisture content of the organic solvent (and more specifically, within the range of 50 to 1000 ppm).

Furthermore, the moisture content indicated here refers to the value as measured using the Karl Fischer method by sampling a portion of the aforementioned organic solvent solution, and there are no particular limitations on the measuring instrument provided the value is measured with an instrument which uses this method and principle. Furthermore, in the case the organic solvent solution is uniform, measurement is carried out by sampling a portion of the uniform solution, in the case the solution has two layers consisting of an organic solvent layer and an aqueous layer, measurement is carried out by sampling a portion of the organic solvent layer, and in the case the aqueous layer in the organic solvent is dispersed and cannot be separated, measurement is carried out by sampling the dispersion itself to indicate the measured value.

Examples of methods for adjusting or maintaining the moisture content of the solution for forming an organic thin film to be within a predetermined range include: (i) a method in which an aqueous layer is provided in contact with the solution for forming an organic thin film, (ii) a method in which the solution for forming an organic thin film is made to be present with a moisture-retaining substance while containing water, and (iii) a method in which a gas containing moisture is blown into the solution for forming an organic thin film.

The solution for forming an organic thin film of the present invention has superior storage stability, and is capable of forming a satisfactory organic thin film even after stored sealed at room temperature (20 to 30° C.) for 40 to 60 days. Namely, although the residual amount of metal surfactant contained in the solution for forming an organic thin film of the present invention gradually decreases over time following preparation thereof, the amount of hydroxyl group-containing compound formed remains nearly constant.

This means that the reaction by which the hydroxyl group-containing compound is formed by hydrolysis of the metal surfactant is an equilibrium reaction, and although several hydroxyl group-containing compounds are polymerized over time by dehydration and condensation, hydroxyl group-containing compounds are thought to be formed by hydrolysis of the metal surfactant corresponding to the amount of hydroxyl group-containing compounds consumed. In addition, since a satisfactory organic thin film can be formed even in the case of using a stored solution of the solution for forming an organic thin film, polymers (or oligomers) of the dehydrated and condensed hydroxyl group-containing compounds are not thought to have a detrimental effect on the formation of an organic thin film.

(9) Organic Thin Film Forming Method

An organic thin film forming method of the present invention forms an organic thin film on the surface of a substrate by contacting the solution for forming an organic thin film obtained in the manner described above with the substrate.

A substrate having active hydrogen on the surface thereof is preferably used for the substrate, specific examples of which include substrates composed of metals such as aluminum, copper or stainless steel, ceramics, glass, plastic, paper, natural or synthetic fibers, leather and other hydrophilic substances.

In the case of a substrate composed of a material not having a hydroxyl group and so forth on the surface thereof, the surface of the substrate can be pre-treated in a plasma atmosphere containing oxygen, or hydrophilic groups can be introduced by corona treatment. Although hydroxyl groups (—OH) are preferable for the hydrophilic groups, they may also be other functional groups such as —COOH, —CHO, =NH or —$NH_2$ having an active hydrogen.

In addition, in the case of a substrate not having active hydrogen on the surface thereof, a silica undercoating layer having active hydrogen on the surface thereof can be formed on the substrate surface by preliminarily contacting with at least one compound selected from the group consisting of $SiCl_4$, $SiHCl_3$, $SiH_2Cl_2$, $Cl-(SiCl_2O)_c-SiCl_3$ (wherein, c represents 0 or a natural number) followed by a dehydrochlorination reaction.

There are no particular limitations on the method for contacting the solution for forming an organic thin film of the present invention (to be abbreviated as the "solution of the present invention") with the surface of a substrate, and known methods can be used. Specific examples of such methods include dipping, spin coating, spraying, roller coating, Meyer bar, screen printing and brush coating, with dipping in particular being used preferably.

There are no particular limitations on the temperature at which the liquid of the present invention contacts the substrate surface provided it is within a temperature range which maintains the stability of the solution of the present invention. Contact can normally be carried out within a temperature range from room temperature to the reflux temperature of the solvent used to prepare the solution. The solution of the present invention may be heated or the substrate itself may be heated to reach a temperature suitable for contact.

In addition, ultrasonic waves can also be used to promote film formation. The step for contacting with the substrate surface may be carried out once over an extended period of time, or may be carried out in several coating steps of short duration.

After having contacted the solution of the present invention with the substrate surface, a washing step can be provided to remove any excess reagents, impurities, and so forth adhered to the film surface. Film thickness can be more effectively controlled by providing a washing step. There are no particular limitations on the washing step provided it is able to remove substances adhered to the surface. Specific examples of such methods include a method in which the substrate is immersed in a solution able to dissolve the metal surfactant used, a method employing evaporation by allowing the substrate to stand in a vacuum or in air at normal pressure, and a method in which adhered substance of the substrate are blown off by blowing an inert gas such as dry nitrogen gas onto the surface of the substrate.

After having contacted the solution of the present invention with the substrate or washed the substrate, the substrate is preferably heated to stabilize the film formed on the substrate surface. The heating temperature can be suitably selected according to the stability of the substrate, or organic thin film formed and so forth.

When the solution of the present invention is coated onto the substrate, the metal surfactant in the solution is adsorbed to the substrate surface resulting in the formation of a thin film. Although the details of the mechanism by which the metal surfactant is adhered to the substrate surface are not clear, the following type of mechanism has been considered in the case of a substrate having active hydrogen on the surface thereof. Namely, hydrolytic groups of the metal surfactant are in a hydrolyzed state in the solution for forming an organic thin film. The metal surfactant reacts with active hydrogen on the substrate surface while in this state, resulting in the formation of a thin film due to the formation of strong chemical bonds with the substrate. The resulting thin film is formed by reacting with active hydrogen of the substrate, and is in the form of a monolayer.

An organic thin film, which is oil-repellent and water-repellent prior to irradiation with light, can be formed on the substrate surface by using a solution for forming an organic thin film obtained by using the metal surfactant (2) represented by the aforementioned formula (IV). More specifically, an organic thin film can be formed in which the contact angle of water prior to irradiation with light is preferably 80° C. or more, more preferably 85° or more, still more preferably 90° or more, and particularly preferably 100° or more, while the contact angle of toluene is 20° or more. This organic thin film changes to a hydrophilic thin film in which the contact angle of water is less than 80° by irradiating with light.

In addition, the organic thin film forming method of the present invention is a method for forming an organic thin film comprising forming an organic thin film on a substrate surface by contacting the substrate with an organic solvent solution obtained by mixing a metal surfactant having at least one hydrolytic group with a catalyst capable of interacting with the metal surfactant. The organic solvent solution contains a predetermined amount of water, and contains a hydroxyl group-containing compound in the form of a hydrolysis product of the metal surfactant at 20 to 2000 ppm, preferably 50 to 500 ppm, and particularly preferably 200 to 400 ppm.

The moisture content in the organic solvent solution used in the present invention is determined according to the type of substrate, metal surfactant, catalyst, organic solvent, and so forth used. More specifically, the moisture content is preferably less than or equal to an amount which does not cause problems such as inhibition of chemical adsorption to the substrate surface, prevention of the production of a fine, monolayer and loss of the amount of metal surfactant used, or catalyst deactivation, while being an amount more than or equal to that sufficient for promoting and activating film formation.

A moisture content sufficient for promoting and activating formation of an organic thin film refers to that to the degree of being able to form a fine, and uniform organic thin film once and over the entire surface of the substrate within a contact time of 10 minutes and preferably within 5 minutes in the case of contacting the substrate with the solution, for example, by dipping.

More specifically, the moisture content is preferably 50 ppm or more, and more preferably within the range from 50 ppm to the saturated moisture content of the organic solvent, and more specifically, more preferably within the range of 50 to 1000 ppm and particularly preferably within the range of 200 to 800 ppm. If the moisture content is 50 ppm or more, an organic thin film can be formed rapidly. In addition, if the moisture content is 1000 ppm or less, the problem of deactivation of the metal surfactant and so forth does not occur.

The moisture content indicated here refers to the value as measured using the Karl Fischer method by sampling a portion of the organic solvent solution, and there are no particular limitations on the measuring instrument provided the value is measured with an instrument which uses this method and principle. In the case the organic solvent solution is uniform, measurement is carried out by sampling a portion of the uniform solution, in the case the solution has two layers consisting of an organic solvent layer and an aqueous layer, measurement is carried out by sampling a portion of the organic solvent layer, and in the case the aqueous layer in the organic solvent is dispersed and cannot be separated, measurement is carried out by sampling the dispersion itself to indicate the measured value.

In the present invention, the step for contacting the organic solvent solution with the substrate is carried out with the moisture content of the organic solvent solution within the aforementioned predetermined range.

Specific examples of methods for making the moisture content of the organic solvent solution to be within a predetermined range include:

(a) a method in which an aqueous layer is provided in contact with the organic solvent solution, (b) a method in which a moisture-retaining substance is additionally made to be present in the organic solvent solution in the state of containing water,
(c) a method in which a gas containing moisture is blown into the organic solvent solution, and
(d) a method water is suitably added.

These methods may be used alone or two or more methods may be used in combination.

Although there are no particular limitations on the water used in the aforementioned methods (a) to (d) provided it is neutral, pure water or distilled water is used preferably. In addition, the organic solvent used may not contain moisture or may contain a certain amount of moisture in advance.

In the aforementioned method (a), in the case of using an organic solvent which separates from the aqueous layer such as a hydrocarbon solvent, the aqueous layer may be made to be present in a form which is separated from the organic solvent layer, or an organic solvent layer may be used in which the organic solvent solution has been separated by circulating or passing through the aqueous layer.

In the case of using an organic solvent having a high degree of water solubility which does not separate from the aqueous layer such as a lower alcohol, a method can be used, for example, in which the organic solvent solution and aqueous layer are contacted by interposing a membrane and so forth which does not allow the permeation of organic solvent but does allow the permeation of water.

In the aforementioned method (b), a substance which is not cause separation of water in the organic solvent solution and is suspended in the organic solvent solution is preferably used for the moisture-retaining substance.

Specific examples of such a substance include organic moisture-retaining materials such as hydrophilic polymers or cellulose; inorganic moisture-retaining materials such as zeolite, silicate clay, vermiculite or porous ceramics; and, compounds capable of forming micelle molecules having water at the core of a solution such as surfactants. In particular, a glass fiber filter or cellulose filter is particularly preferable for reasons such as being able to avoid contamination by debris and so forth. In addition, another possible method involves the use of a hydrophilic solvent to increase the solubility of water in the organic solvent. The hydrophilic solvent in this case as well contains a substance capable of suitably retaining moisture.

Although there are no particular limitations on the amount of moisture contained in the moisture-retaining substance, an amount up to the state in which water in the organic solvent solution is not released as a result of separating from the moisture-retaining substance is preferable. In addition, a substance can also be contained which is able to retain moisture by the suitable addition of water. In addition, by providing a moisture-retaining substance at the interface of a solution and the outside air or in a solution continuous with the outside air, the solution can be replenished with moisture by absorbing humidity and so forth from the outside air.

In the aforementioned method (c), there are no particular limitations on the gas used provided it does not effect each component in the solution, specific examples of which include air, nitrogen gas and argon gas.

Examples of methods for obtaining a gas containing moisture include a method in which moisture is contained in the gas, and a method in which the gas is humidified.

Examples of methods for containing moisture in a gas include a method in which the gas is contacted with water by passing the gas through the water or contacting the gas with the surface of water or hot water, and a method in which a gas containing water vapor is used directly.

Examples of methods for humidifying a gas include steam humidification, water spraying humidification and gasification heating.

Examples of methods for contacting a gas containing moisture with the organic solvent solution include a method in which the moisture-containing gas is blown into the organic solvent solution or blown onto the surface of the organic solvent solution, a method in which the organic solvent solution is allowed to stand in an atmosphere of the moisture-containing gas while agitating as necessary, and a method in which the organic solvent solution is allowed to stand in a humidified atmosphere while agitating as necessary. In addition, a blowing apparatus, washing apparatus, filtering apparatus, and so forth are preferably additionally provided as necessary in methods involving blowing in a moisture-containing gas.

In the aforementioned method (d), specific examples of methods thereof include a method in which a decrease in the moisture content of the organic solvent solution is measured, and water, compatible organic solvent, or water diluted with the same organic solvent is suitably added corresponding to the decrease, and a method in which an organic solvent solution of the same composition containing a fixed amount of water is supplied.

In the organic thin film forming method of the present invention, the same solution is preferably repeatedly contacted with two or more substrates while maintaining the amount of moisture contained in the organic solvent solution within a predetermined range, and the moisture content of the organic solvent solution is more preferably maintained within the range of 50 to 1000 ppm.

Here, a predetermined range has the same meaning as the previously described moisture content predetermined range, and refers to the range which allows the formation of a fine and uniform organic thin film by maintaining the moisture content within that range even if repeatedly carrying out the contact step without replacing the liquid. According to this method, a fine and uniform organic thin film can be formed in a short contact time over the entire contacted surface by a procedure in which two or more substrates are contacted in a single contact step using the same solution.

In this case, the same solution excludes the case of discarding all or a portion of the solution after having carried out a single contact step and replacing with fresh solution, and as will be described later, a solution in which the moisture content thereof is maintained within a predetermined range by any method is included in the meaning of the same solution.

Although there are no particular limitations on the method used to maintain the moisture content of the organic solvent solution within the aforementioned predetermined range, a preferable example is a method similar to the aforementioned methods (a) to (d).

Although there are no particular limitations on the substrate used in the organic thin film forming method of the present invention, a substrate having functional groups capable of interacting with molecules forming an organic thin film in an organic solvent solution on the surface thereof is preferable, while a substrate having active hydrogen on the surface thereof is particularly preferable. The use of a substrate having active hydrogen on the surface thereof makes it possible to easily form an organic thin film on the surface of the substrate as a result of chemical interaction between the active hydrogen on the substrate surface and molecules in the organic solvent solution.

Active hydrogen refers to easily dissociated protons, and examples of functional groups containing active hydrogen include hydroxyl groups, carboxyl groups, formyl groups, imino groups, amino groups and mercapto groups, with hydroxyl groups being preferable.

Specific examples of substrates having hydroxyl groups on the surface thereof include substrates composed of metals such as aluminum, copper or stainless steel, glass, silicon wafer, ceramics, plastic, paper, natural or synthetic fibers, leather or other hydrophilic substances. In particular, substrates composed of metal, glass, silicon wafer, ceramics or plastic are preferable.

Hydrophilic groups can be introduced into substrates composed of materials not having hydroxyl groups on the surface thereof in the manner of plastic or synthetic fibers by pretreating the substrate surface in a plasma atmosphere containing oxygen (for example, for 20 minutes at 100 W), or by subjecting to corona treatment. Since substrates composed of polyamide resin, polyurethane resin, and so forth have imino groups on the surface thereof, surface treatment is not particularly required since a dealcoholation reaction occurs between the active hydrogen of the imino groups and the alkoxysilyl groups of the metal surfactant, resulting in the formation of siloxane bonds (—SiO—).

In addition, in the case of a substrate not having active hydrogen on the surface thereof, a silica undercoating layer having active hydrogen on the surface thereof can be formed on the substrate surface by preliminarily contacting with at least one compound selected from the group consisting of $SiCl_4$, $SiHCl_3$, $SiH_2Cl_2$, $Cl—(SiCl_2O)_b—SiCl_3$ (wherein, b represents a natural number) followed by a dehydrochlorination reaction.

The step for contacting the organic solvent solution with the substrate may be carried out once over an extended period of time, or may be carried out in several coating steps of short duration. Ultrasonic waves can also be used to promote film formation.

The step for contacting the substrate with the organic solvent solution is preferably a step in which the substrate is immersed in the organic solvent solution. The following lists specific examples of methods for immersing the substrate while maintaining the moisture content of the organic solvent solution:
(a) a method in which a moisture adjustment tank and a substrate immersion tank are provided, and liquid for which moisture content has been adjusted in the moisture adjustment tank is circulated to the substrate immersion tank;
(b) a method in which a plurality of substrate immersion tanks are provided, and moisture content is adjusted in one substrate immersion tank during the time a substrate is immersed in another substrate immersion tank; and,
(c) a method in which a means for maintaining the previously described moisture content within a predetermined range is provided directly in a substrate immersion tank, and moisture is suitably replenished.

There are no particular limitations on the washing method provided it is able to remove substances adhered to the substrate surface, specific examples of which include a method in which the substrate is immersed in a solvent able to dissolve the metal surfactant, a method for employing evaporation by allowing the substrate to stand in a vacuum or in air at normal pressure, and a method in which adhered substance of the substrate are blown off by blowing an inert gas such as dry nitrogen gas onto the surface of the substrate.

In the present invention, the step for contacting the substrate with the organic solvent solution is preferably carried out in a space in which the humidity is maintained at 40% RH or higher, and more preferably carried out in a space in which the humidity is maintained at 60% RH or higher. In such a space, the moisture content of the organic solvent solution is preferably maintained, and a fine and monolayer can be formed with good reproducibility even if substrates are contacted continuously.

The organic thin film forming method of the present invention can be used for the production of monolayers as well as the production of multilayer films having two or more layers, and can be particularly preferably used to produce monolayers. In addition, the method of the present invention can also be used as a method for forming a film on a surface by physical adsorption.

Although there are no particular limitations on the organic thin film formed according to the organic thin film forming method of the present invention, a crystalline organic thin film is preferable. Whether or not an organic thin film formed according to the organic thin film forming method of the present invention is crystalline can be confirmed by measuring the film using a thin film X-ray diffraction apparatus.

Although there are no particular limitations on the thickness of an organic thin film formed according to the organic thin film forming method of the present invention, it is normally 1 to 5 nm, with a monolayer having a thickness of 1.5 to 2.5 nm being preferable.

An organic thin film formed according to the organic thin film forming method of the present invention is preferably a chemically adsorbed film, and more preferably, the substrate is not crystalline while the chemically adsorbed film is crystalline. In this case, crystallinity may be in the form of polycrystals or single crystals. An example of a chemically adsorbed film is an organic thin film covalently bonded by means of metal-oxygen bonds.

An organic thin film formed according to the organic thin film forming method of the present invention is preferably a self-assembly monolayer. Here, a self-assembly monolayer refers to a film which forms an orderly structure without being subjected to coercive force from the outside. Molecules forming a self-assembly monolayer are obtained from a metal surfactant used to prepare a solution for forming a self-assembly monolayer. Molecules of the metal surfactant are solvated and not independently present in the solution for forming a self-assembly monolayer, with several such molecules aggregating to form aggregates.

In the case of using a metal surfactant having at least one hydrolytic group for the metal surfactant, aggregates are obtained by treating the metal surfactant with water and a catalyst capable of interacting with the metal surfactant, while in the case of using a metal surfactant having at least one hydroxyl group for the metal surfactant, aggregates are obtained by treating the metal surfactant with water.

Examples of aggregate forms include a form in which the molecules are aggregated by intermolecular force, coordinate bonds or hydrogen bonds between hydrophobic portions or hydrophilic portions, a form in which film-forming molecules are bonded by covalent bonds, a form in which micelles and so forth have been formed by other medium, such as water, serving as a core or mediator, and combinations thereof.

There are no particular limitations on the shape of the aggregates, and they may be spherical, chain-like, band-like, and so forth. Although there are no particular limitations on the mean particle diameter of the aggregates, it is preferably within the range of 10 to 1000 nm.

In addition, the value of the zeta potential (interface electrokinetic potential) of the aggregates is preferably greater than the zeta potential of the substrate in the same solution, and it is particularly preferable that the zeta potential of the aggregates be positive while the zeta potential of the substrate be negative. The use of a solution for forming a self-assembly monolayer which forms aggregates having this type of zeta potential makes it possible to produce a fine, monolayer having crystallinity.

As previously described, the use of the method of the present invention makes it possible to form a fine, organic thin film having few impurities rapidly, regardless of the type of substrate, compared with when a conventional metal surfactant is used. This type of organic thin film is used to form design patterns for electrical devices and so forth, and can be applied extremely easily to equipment requiring heat-resistant, weather-resistant and wear-resistant ultra-thin film coatings such as electronics products, and especially electrical appliances, automobiles, industrial equipment, mirrors and eyeglass lenses.

Although the following provides a more detailed explanation of the present invention through examples thereof, the present invention is not limited by the following examples.

EXAMPLE 1

Preparation of Auxiliary Agent for Forming an Organic

Thin Film (1)

12.4 g of titanium tetraisopropoxide (trade name "A-1" manufactured by Nippon Soda Co., Ltd: 99% of purity, 28.2% of concentration as titanium oxide) were dissolved in 45.0 g of toluene in a four-neck flask, and after replacing the inside of the flask with nitrogen gas, the solution was cooled to −40° C. in denatured alcohol/dry ice. Separate from this procedure, after mixing 1.26 g of ion exchange water (molar ratio of $H_2O/Ti=1.6$) with 11.3 g of isopropanol, the mixture was dropped into the four-neck flask while cooled to −40° C. and stirring. During dropping, the liquid temperature inside the flask was maintained at −40° C. Following completion of dropping, the solution was stirred for 30 minutes while cooling followed by warming to room temperature to obtain a colorless, transparent partially hydrolyzed solution (T-1). The solid concentration of the solution was 5% by weight as titanium oxide.

An amount of n-octadecyltrimethoxysilane (ODS manufactured by Gelest, Inc.) equivalent to a $TiO_2$:ODS ratio of 1:1 (molar ratio) was added to 20 g of this solution (T-1), and then diluted with an amount of toluene equivalent to 1% by weight as $TiO_2$. Next, 5 g of distilled water were added followed by stirring for 3 days at 40° C. and cooling to room temperature. The excess water which had separated into two phases was removed to obtain a transparent solution of an auxiliary agent for forming an organic thin film (C-1). In addition, neither Ti or ODS was detected from the separated aqueous layer.

EXAMPLE 2

Preparation of Auxiliary Agent for Forming an Organic

Thin Film (2)

A transparent solution of an auxiliary agent for forming an organic thin film (C-2) was obtained in the same manner as Example 1 with the exception of using decyltrimethoxysilane (DES manufactured by Azmax.co) instead of n-octadecyltrimethoxysilane.

EXAMPLES 3-5

Preparation of Solution for Forming an Organic Thin Film

The following metal surfactants M-1 to M-4 were used for metal surfactant (2).
M-1: n-octadecyltrimethoxysilane (ODS manufactured by Gelest, Inc.)
M-2: decyltrimethoxysilane (DES manufactured by Azmax.co)
M-3: Heptadecafluorodecyltrimethoxysilane (FAS-17 manufactured by Shin-Etsu Chemical Co., Ltd.)
M-4: Trifluoropropyltrimethoxysilane (FAS-3 manufactured by Shin-Etsu Chemical Co., Ltd.)

Raw material M-1 of the solution for forming an organic thin film equivalent to a final concentration of 0.5% by weight was added to toluene having a moisture content of 450 ppm followed by stirring for 30 minutes at room temperature. Next, a solution of an auxiliary agent for forming an organic thin film (C-1) equivalent to $1/10$ times moles (as $TiO_2$) of the raw material M-1 of the solution for forming an organic thin film was dropped in and stirred for 3 hours at room temperature following completion of dropping. Water was added to this solution so that the moisture content was 500 ppm to obtain a solution for forming an organic thin film (SA-1) (Example 3).

In addition, a solution for forming an organic thin film (SA-2) was obtained in the same manner with the exception of using solution (C-2) of an auxiliary agent for forming an organic thin film instead of solution (C-1) (Example 4).

Moreover, a solution for forming an organic thin film (SA-3) was obtained in the same manner with the exception of using raw material (M-2) of a solution for forming an organic thin film instead of raw material (M-1) (Example 5).

EXAMPLE 6

Preparation of Solution for Forming an Organic Thin Film

A mixed solvent was prepared by adding an equal weight of a fluorine solvent in the form of Novec HFE-7200 (manufactured by Sumitomo 3M Limited) to toluene having a moisture content of 500 ppm. Next, raw material M-3 of a solution for forming an organic thin film equivalent to a final concentration of 0.5% by weight was added to this solution followed by stirring for 30 minutes at room temperature. Moreover, a solution (C-1) of an auxiliary agent for forming an organic thin film equivalent to $1/10$ times moles (as $TiO_2$) of raw material M-3 of a solution for forming an organic thin film was dropped in followed by stirring for 3 hours at room temperature following completion of dropping. Water was then added so that the moisture content of this solution was 300 ppm to obtain a solution (SA-4) for forming an organic thin film (Example 6).

EXAMPLE 7

Preparation of Solution for Forming an Organic Thin Film

A mixed solvent was prepared by adding a fluorine solvent in the form of Novec HFE-7200 (manufactured by Sumitomo 3M Limited) at a weight ratio of 1/3 to toluene having a moisture content of 500 ppm. Next, raw material M-4 of a solution for forming an organic thin film equivalent to a final concentration of 0.5% by weight was added to this solution followed by stirring for 30 minutes at room temperature. Moreover, a solution (C-1) of an auxiliary agent for forming an organic thin film equivalent to 1/10 times moles (as $TiO_2$) of raw material M-3 of a solution for forming an organic thin film was dropped in followed by stirring for 3 hours at room temperature following completion of dropping. Water was then added so that the moisture content of this solution was 350 ppm to obtain a solution (SA-5) for forming an organic thin film (Example 7).

EXAMPLES 8-22

After immersing a soda lime glass (SLG) substrate, alkaline-free glass substrate (AN100 manufactured by Asahi Glass Co., Ltd.) and silicon wafer (Si) washed with ultrasonic waves and ozone in solutions for forming an organic thin film (SA-1 to SA-5) for a predetermined amount of time, the substrates were lifted out and subjected to ultrasonic washing for 10 seconds in toluene followed by drying for 10 minutes at 60° C. to obtain organic thin films (Examples 8 to 22).

COMPARATIVE EXAMPLES 1-6

Solutions (H-1 to H-4) were separately prepared in the same manner as preparation of the aforementioned solutions for forming an organic thin film (SA-2 to SA-5) with the exception of not adding an assistance for forming an organic thin film. Organic thin films were then obtained using the resulting solutions (H-1 to H-4) under the same conditions as the examples using SLG substrates (Comparative Examples 1 to 4).

In addition, organic thin films were obtained using solutions (C-1) and (C-2) of an auxiliary agent for forming an organic thin film under the same conditions as the examples using SLG substrates (Comparative Examples 5 and 6).

COMPARATIVE EXAMPLES 7, 8

Organic thin film raw material M-2 was added to toluene having a moisture content of 450 ppm to a final concentration of 0.5% by weight followed by stirring for 30 minutes at room temperature. Next, a catalyst (T-1: partially hydrolyzed solution of titanium tetraisopropoxide) equivalent to 1/10 times moles (as $TiO_2$) the organic thin film raw material of were dropped into this solution followed by stirring for 3 hours at room temperature following completion of dropping. Water was then added so that the moisture content of this solution was 500 ppm to obtain a solution for forming an organic thin film (H-5). A film-forming process was then performed using this solution under the same conditions as the examples (Comparative Examples 7 and 8).

<Evaluation and Testing of Thin Film Physical Properties>

The organic thin films were evaluated using the methods described below.

(1) Measurement of Contact Angle

After dropping 5 μl of water and toluene onto the surface of each sample from a microsyringe, the contact angle was measured 60 seconds later using a contact angle measuring instrument (Model 360S manufactured by Erma Inc.).

(2) Evaluation of Film Adhesion

After carrying out ultrasonic washing of the resulting films in water for 1 hour, contact angle was re-measured and compared with the value obtained before ultrasonic washing. Those films that exhibited similar values without changing were evaluated with a ○, while those for which a decrease in contact angle was observed were evaluated with an X.

(3) Evaluation of Film Appearance

Those films in which there were no changes in appearance before and after immersion as determined by visual observation were evaluated with a ○, while those in which soiling or optical abnormalities were observed were evaluated with an X.

(4) XPS Analysis

An XPS analyzer (Quantum 2000 manufactured by Ulvac-Phi, Inc.) was used to analyzes the elements in the films.

In the case of obtaining data on elements originated from the substrate, the film thickness was judged to be 10 nm or less based on the measurement principle of the analyzer, and evaluated with a ○. Films were evaluated with a ○, Sodium and potassium elementary data in case of using SLG substrate, barium elementary data in the case of AN100, and $SiO_2$ oxide coating data in the case of a Si wafer are strongly obtained.

In all other cases, the films were evaluated with an X for film thicknesses of 10 nm or more.

The solutions for forming an organic thin film, the type of substrate and the results of evaluating and testing the physical properties of the thin films for Examples 8 to 22 and Comparative Examples 1 to 8 are summarized in Table 1.

TABLE 1

| | Solution for forming organic thin film | | | | Immersion time (min) | Organic thin film | | Film contact angle (°) | | |
|---|---|---|---|---|---|---|---|---|---|---|
| | Type of Substrate | Solution | Metal surfactant | Auxiliary agent- and for forming organic thin film | | Appearance | Adhesion | Water | Toluene | XPS |
| Ex. 8 | SLG | SA-1 | M-1 | C-1 | 1 | ○ | ○ | 108 | 33 | ○ |
| Ex. 9 | SLG | SA-1 | M-1 | C-1 | 2 | ○ | ○ | 105 | 32 | ○ |
| Ex. 10 | AN100 | SA-1 | M-1 | C-1 | 2 | ○ | ○ | 104 | 31 | ○ |
| Ex. 11 | Si wafer | SA-1 | M-1 | C-1 | 3 | ○ | ○ | 105 | 30 | ○ |
| Ex. 12 | SLG | SA-2 | M-1 | C-2 | 3 | ○ | ○ | 105 | 30 | ○ |
| Ex. 13 | Si wafer | SA-2 | M-1 | C-2 | 3 | ○ | ○ | 102 | 29 | ○ |

TABLE 1-continued

| | | Solution for forming organic thin film | | | | Organic thin film | | Film contact angle (°) | | |
|---|---|---|---|---|---|---|---|---|---|---|
| | Type of Substrate | Solution | Metal surfactant | Auxiliary agent- and for forming organic thin film (2) | Immersion time (min) | Appearance | Adhesion | Water | Toluene | XPS |
| Ex. 14 | SLG | SA-3 | M-2 | C-1 | 3 | ○ | ○ | 100 | 23 | ○ |
| Ex. 15 | AN100 | SA-3 | M-2 | C-1 | 5 | ○ | ○ | 98 | 22 | ○ |
| Ex. 16 | Si wafer | SA-3 | M-2 | C-1 | 10 | ○ | ○ | 98 | 21 | ○ |
| Ex. 17 | SLG | SA-4 | M-3 | C-1 | 5 | ○ | ○ | 110 | 63 | ○ |
| Ex. 18 | AN100 | SA-4 | M-3 | C-1 | 10 | ○ | ○ | 107 | 60 | ○ |
| Ex. 19 | Si wafer | SA-4 | M-3 | C-1 | 10 | ○ | ○ | 105 | 61 | ○ |
| Ex. 20 | SLG | SA-5 | M-4 | C-1 | 5 | ○ | ○ | 88 | 40 | ○ |
| Ex. 21 | AN100 | SA-5 | M-4 | C-1 | 10 | ○ | ○ | 85 | 38 | ○ |
| Ex. 22 | Si wafer | SA-5 | M-4 | C-1 | 10 | ○ | ○ | 85 | 37 | ○ |
| Comp. Ex. 1 | SLG | H-1 | M-1 | None | 10 | ○ | X | 78 | 5 | ○ |
| Comp. Ex. 2 | SLG | H-2 | M-2 | None | 10 | ○ | X | 65 | 4 | ○ |
| Comp. Ex. 3 | SLG | H-3 | M-3 | None | 10 | X, soiling | X | 85 | 15 | ○ |
| Comp. Ex. 4 | SLG | H-4 | M-4 | None | 10 | X, soiling | X | 65 | 13 | ○ |
| Comp. Ex. 5 | SLG | C-1 | None | None | 10 | X, soiling | X | 65 | 4 | ○ |
| Comp. Ex. 6 | SLG | C-2 | None | None | 10 | X, soiling | X | 58 | 3 | ○ |
| Comp. Ex. 7 | AN100 | H-5 | M-2 | T-1 | 10 | ○ | X | 82 | 12 | ○ |
| Comp. Ex. 8 | Si wafer | H-5 | M-2 | T-1 | 10 | ○ | X | 79 | 18 | ○ |

According to Table 1, the solutions for forming an organic thin film of the present invention yielded self-assembly monolayers having satisfactory appearance, adhesion, water repellency and oil repellency within an immersion time of 10 minutes. These solutions for forming an organic thin film allowed the formation of organic thin films on various substrates (Examples 8 to 22).

However, those solutions to which an auxiliary agent for forming an organic thin film was not added or consisted only of an auxiliary agent for forming an organic thin film did not result in the formation of films on the substrates (Comparative Examples 1 to 6).

In addition, adequate contact angles were unable to be obtained in case of using only a titanium tetraisopropoxide partial hydrolysis product (T-1) for the auxiliary agent for forming an organic thin film (Comparative Examples 7 and 8).

<Synthesis of Silanol Standard>

10 g (26.7 mmol) of n-octadecyltrimethoxysilane (abbreviated as "ODS") (manufactured by Gelest, Inc.) were diluted with 100 g of THF followed by the addition of 0.5 g (2.67 mmol) of 0.05N aqueous hydrochloric acid solution at −10° C., stirring for 3 hours and allowing the temperature to spontaneously rise to room temperature. The resulting solution was used as Standard (1).

<Compound Identification>

Monosilanol of ODS was separated and purified by HPLC and identified by $^1$H-NMR (ECP500 manufactured by JEOL Ltd.) and mass analysis (Navigator manufactured by Nippon Thermo Co., Ltd.). The respective spectral data are shown in Table 2.

TABLE 2

| 1H-NMR and Mass Analysis Data | | |
|---|---|---|
| Compound | 1H-NMR ($C_5D_6$, δ ppm) | Mass ($M^-$) |
| n-octadecyltrimethoxy-silane $C_{18}H_{37}Si(OCH_3)_3$ | 0.75 (t, 2H), 0.93 (t, 3H), 1.2-1.6 (m, 32H), 3.46 (s, 6H) | 359, 375 |
| n-octadecyldimethoxy-silanol $C_{18}H_{37}Si(OCH_3)_2(OH)$ | 0.75 (t, 2H), 0.92 (t, 3H), 1.2-1.6 (m, 32H), 3.48 (s, 6H) | 359 |

In addition, the HPLC chart is shown in FIG. 1. In FIG. 1, retention time (minutes) is plotted on the horizontal axis, while peak intensity (intensity) is plotted on the vertical axis. On the basis of FIG. 1, in the case of carrying out hydrolysis of ODS using hydrochloric acid, all of n-octadecyldimethoxysilanol (n-$C_{18}H_{37}$)Si(OCH$_3$)$_2$(OH), n-octadecylmethoxydisilanol (n-$C_{18}H_{37}$)Si(OCH$_3$)(OH)$_2$, and n-octadecyltrisilanol (n-$C_{18}H_{37}$)Si(OH)$_3$ of the ODS hydrolysis products were detected.

Catalyst Preparation—1

1.0 g (3.54 mmol) of titanium tetraisopropoxide (A-1 manufactured by Nippon Soda Co., Ltd., 99.9% of purity, 28% by weight of concentration as titanium oxide) were dissolved in 27.0 g of dehydrated toluene to prepare catalyst N-1.

Catalyst Preparation—2

24.2 g (61.4 mmol) of ODS (manufactured by Gelest, Inc., 95% of purity) were diluted with 84.6 g of dehydrated toluene followed by dissolving by adding 6.9 g (24.3 mmol) of titanium tetraisopropoxide (A-1 manufactured by Nippon Soda Co., Ltd.: 99.9% of purity, 28% by weight of concentration as titanium oxide), adding 1.7 g of ion exchange water and stirring for 10 hours to prepare catalyst N-2.

Catalyst Preparation—3

24.2 g (61.4 mmol) of ODS (manufactured by Gelest, Inc.) were diluted with 84.6 g of dehydrated toluene followed by dissolving by adding 10 g (24.3 mmol) of zirconium tetrabutoxide (TBZR manufactured by Nippon Soda Co., Ltd.: 99.9% of purity, 31% by weight of concentration as zirconium oxide), adding 1.7 g of ion exchange water and stirring for 10 hours to prepare catalyst N-3.

EXAMPLE 23

Production of Solution for Forming an Organic Thin Film (SB-1)

Water-containing toluene (moisture content: 550 ppm, to apply similarly hereinafter) was prepared by adding ion exchange water to dehydrated toluene and stirring vigorously. 2.6 g (6.6 mmol) of ODS (manufactured by Gelest, Inc., 95% of purity) were added to 392 g of this water-containing toluene followed by stirring for 30 minutes at room temperature. Next, 5.5 g of catalyst N-1 were dropped into this solution and stirred for 3 hours at room temperature following completion of dropping to obtain solution for forming an organic thin film SB-1.

Solution for forming an organic thin film SB-1 was analyzed by HPLC. The HPLC chart is shown in FIG. 2.

Figure 2:
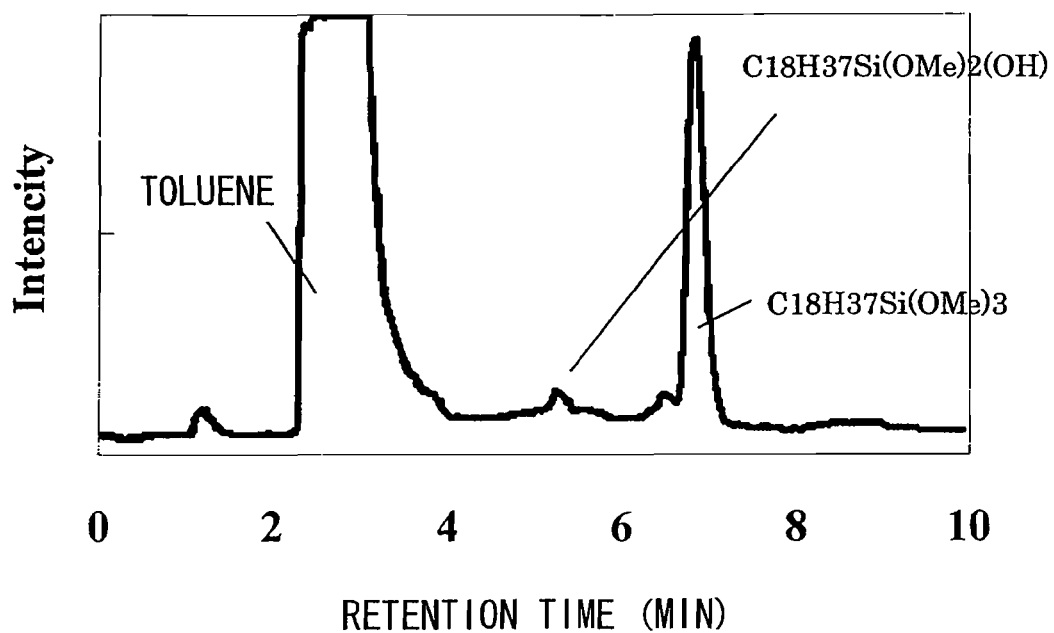
FIG. 2 is a graph showing the separation curve of a solution SB-1 for forming an organic thin film obtained by HPLC.

In FIG. 2, retention time (minutes) is plotted on the horizontal axis, while peak intensity (intensity) is plotted on the vertical axis. As can be understood from FIG. 2, in the case of carrying out hydrolysis of ODS using catalyst N-1, only n-octadecyldimethoxysilanol $(n-C_{18}H_{37})Si(OCH_3)_2(OH)$ was detected as a partial hydrolysis product of ODS.

EXAMPLE 24

Production of Solution for Forming an Organic Thin Film (SB-2)

Water-containing toluene was prepared by adding ion exchange water to dehydrated toluene and stirring vigorously. 2.6 g (6.6 mmol) of ODS (manufactured by Gelest, Inc., 95% of purity) were added to 393 g of this water-containing toluene followed by stirring for 30 minutes at room temperature. Next, 4.1 g of catalyst N-2 were dropped into this solution and stirred for 3 hours at room temperature following completion of dropping to obtain solution for forming an organic thin film SB-2.

EXAMPLE 25

Production of Solution for Forming an Organic Thin Film (SB-3)

Water-containing toluene was prepared by adding ion exchange water to dehydrated toluene and stirring vigorously. 2.6 g (6.6 mmol) of n-octadecyltrimethoxysilane (ODS) (manufactured by Gelest, Inc., 95% of purity) were added to 393 g of this water-containing toluene followed by stirring for 30 minutes at room temperature. Next, 4.1 g of catalyst N-3 were dropped into this solution and stirred for 3 hours at room temperature following completion of dropping to obtain solution for forming an organic thin film SB-3.

COMPARATIVE EXAMPLE 9

Production of Solution for Forming an Organic Thin Film (SB-4)

The solution of Comparative Example 9 (SB-4) was obtained in the same manner as the solution for forming an organic thin film (SA-1) with the exception of not adding a catalyst.

COMPARATIVE EXAMPLE 10

Production of Solution for Forming an Organic Thin Film (SB-5)

The solution for forming an organic thin film of Comparative Example 10 (SB-5) was obtained by storing the solution for forming an organic thin film (SB-2) for 2 months until the amount of silanol had fallen below the detection limit (less than 20 ppm).

<Measurement of Properties of Solutions for Forming an Organic Thin Film>

The moisture contents, ODS amounts and monosilanol amounts of the solutions for forming an organic thin film obtained as described above (SB-1 to SB-5) were measured according to the methods described below. The results for measuring the amounts of monosilanol are summarized in Table 3.

(1) Measurement of Moisture Content

Moisture content was measured using a Karl Fischer moisture meter employing coulometric titration (CA-07 manufactured by Dia Instruments Co., Ltd.) The moisture contents of the solutions for forming an organic thin film of Examples 23 to 25 and Comparative Examples 9 and 10 were all adjusted to be within the range of 400 to 500 ppm.

(2) Measurement of Amounts of ODS and Monosilanol

The amounts of ODS and monosilanol were measured by high-performance liquid chromatography (HPLC: LC8020 manufactured by Tosoh Corporation).

Column: Mightysil RP-18 (C18 label)
Mobile phase: Acetonitrile/THF=85:15, flow rate:
1 mL/min, constant temperature bath: 35° C.

The amount of monosilanol (%) was determined using the formula: amount of monosilanol (surface area ratio)/amount of injected ODS (surface area ratio)×100.

EXAMPLES 26-31, COMPARATIVE EXAMPLES 11, 12

Formation of Organic Thin Films

Soda lime glass (SLG) substrates, alkaline-free glass substrates (AN100 manufactured by Asahi Glass Co., Ltd., Examples), silicon wafers (Si), and stainless steel substrates (SUS316, SUS304) washed by ultrasonic washing and ozone were immersed in the solutions for forming an organic thin film obtained as described above (SB-1 to SB-5) for the predetermined amounts of time shown in Table 3 followed by lifting out the substrates, ultrasonic washing with toluene and drying for 10 minutes at 60° C. to form organic thin films.

<Evaluation of Organic Thin Films>

The contact angles, film thicknesses and crystallinity of each of the organic thin films obtained in Examples 26 to 31 and Comparative Examples 11 and 12 were measured using the methods described below.

(1) Measurement of Contact Angle

After dropping 5 μl of water, toluene or tetradecane (TD) onto the surface of each sample from a microsyringe in the same manner as previously described, the contact angle was measured 60 seconds later using a contact angle measuring instrument (Model 360S manufactured by Erma Inc.)

(2) Measurement of Film Thickness

The film thicknesses of the resulting organic thin films were measured with a multi-incident angle ellipsometer (manufactured by Woollam Co., Ltd.) Film thickness was about 2 to 2.5 nm for each of the organic thin films of Examples 26 to 31, suggesting them to be monolayers. On the other hand, the film thicknesses of the organic thin films formed in Comparative Examples 11 and 12 exhibited considerable variation, and monolayers of uniform thickness were not formed.

(3) Evaluation of Organic Thin Film Crystallinity

Figure 3:
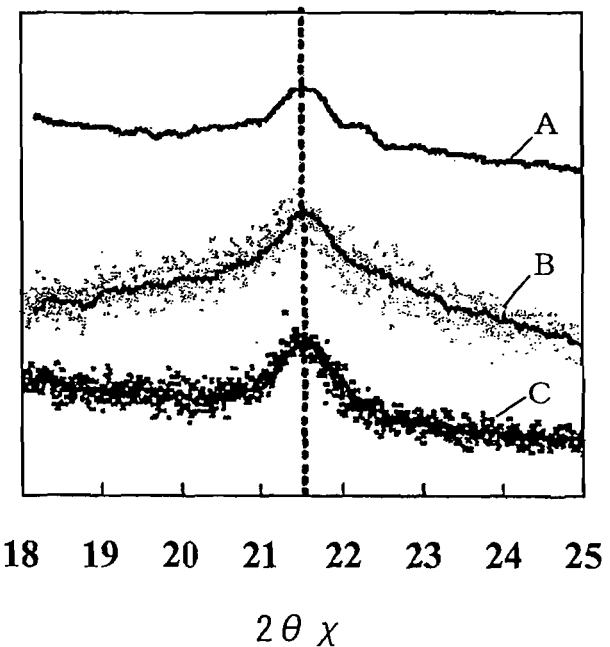
FIG. 3 is thin film crystal X-ray diffraction diagram of the organic thin films of Examples 26, 28 and 29.

The crystallinity of the organic thin films obtained in Examples 26, 28 and 29 were measured with a thin film X-ray diffraction analyzer (ATX-G manufactured by Rigaku Corporation). The measurement results are shown in FIG. 3. In FIG. 3, 2θ/χ(° )is plotted on the horizontal axis, while peak intensity (intensity (CPS)) is plotted on the vertical axis for each example. A represents the results for Example 26, B for Example 28, and C for Example 29. On the basis of FIG. 3, each of the organic thin films of Examples 26, 28 and 29 were determined to have crystallinity in the form of a lattice plane spacing of 0.42±0.02 nm.

TABLE 3

| | Solution for forming organic thin film | Catalyst | Amount of mono-silanol (ppm) | Substrate | Substrate immersion time (min) | Contact angle (°) | |
|---|---|---|---|---|---|---|---|
| | | | | | | Water | TD |
| Ex. 26 | SB-1 | N-1 | 260 | SLG | 1 | 105.5 | 36.2 |
| Ex. 27 | SB-1 | N-1 | 260 | SLG | 10 | 107.0 | 38.2 |
| Ex. 28 | SB-1 | N-1 | 260 | AN100 | 3 | 103.9 | 35.8 |
| Ex. 29 | SB-1 | N-1 | 260 | Si | 3 | 108.3 | 35.2 |
| Ex. 30 | SB-2 | N-2 | 450 | Si | 3 | 107.3 | 34.7 |
| Ex. 31 | SB-3 | N-3 | 450 | Si | 3 | 105.7 | 32.2 |
| Comp. Ex. 11 | SB-4 | — | 0 | SLG | 5 | 56.6 | 3.0 |
| Comp. Ex. 12 | SB-5 | — | <20 | Si | 5 | 74.4 | 13.3 |

<Storage Stability Test>

Figure 4:
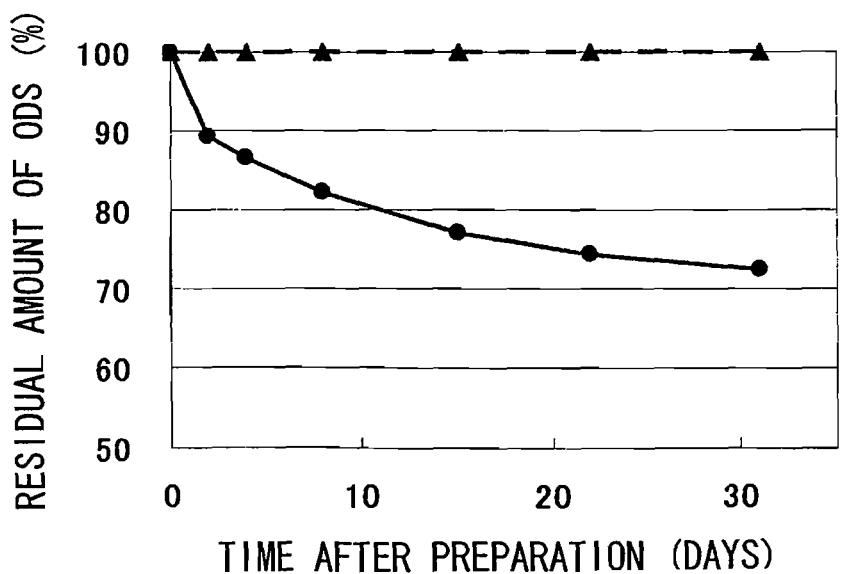
FIG. 4 is a graph showing the relationship between residual ODS (vertical axis) and elapsed time (horizontal axis) of stored solutions of solution SB-1 for forming an organic thin film and a toluene solution of ODS respectively sealed and stored at room temperature.
Figure 5:
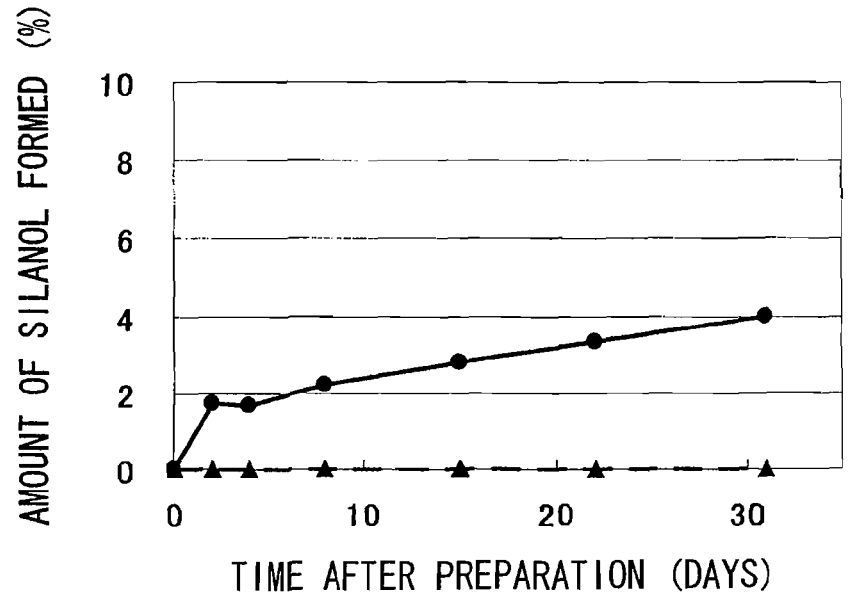
FIG. 5 is a graph showing the relationship between the amount of silanol formed (vertical axis) and elapsed time (horizontal axis) of stored solutions of solution SB-1 for forming an organic thin film and a toluene solution of ODS respectively sealed and stored at room temperature; and, FIG. 6 is a graph showing the relationship between the contact angle (°) (vertical axis) of organic thin films, obtained by forming an organic thin films using stored solutions of solution SB-1 for forming an organic thin film and a toluene solution of ODS respectively sealed and stored at room temperature, to water and TD, and elapsed time of the stored solutions (horizontal axis).

The solution for forming an organic thin film obtained in Example 23 was sealed and allowed to stand at room temperature for 30 days. The residual amount of ODS and the amount of monosilanol formed were measured every 5 days. Those results are shown in FIG. 4 and FIG. 5 (indicated with black dots (●) in FIGS. 4 and 5). FIG. 4 shows the measurement results for the residual amount of ODS, while FIG. 5 shows the measurement results for the amount of monosilanol formed.

In addition, a solution consisting of ODS dissolved in toluene was sealed and stored for 30 days for comparative purposes followed by similarly measuring the residual amount of ODS and the amount of monosilanol formed every 5 days. The measurement results are shown in FIG. 4 and FIG. 5 (indicated with black triangles in FIGS. 4 and 5).

On the basis of FIGS. 4 and 5, although the residual amount of ODS decreased over time when the moisture content of the solution for forming an organic thin film was maintained at 400 to 500 ppm, the amount of monosilanol formed was determined to remain nearly constant. In addition, when the residual amount of ODS fell to 20% or less, it was determined that the amount of monosilanol formed tended to decrease.

Figure 6:
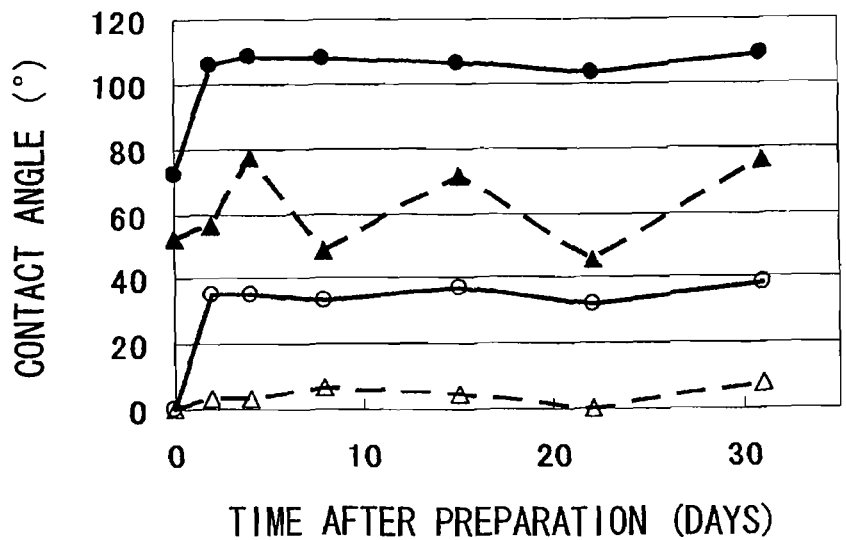

Organic thin films were formed on an SLG substrate in the same manner as Example 4 using the solution for forming an organic thin film of Example 23 used in the aforementioned storage stability test after storing for 10 days, 20 days and 30 days. The contact angles (°) of the resulting organic thin films were measured for water and TD, respectively. The measurement results are shown in FIG. 6. In addition, stored solutions consisting of ODS dissolved in toluene were similarly measured for comparison purposes.

In FIG. 6, black dots (●) indicate the contact angle (°) with respect to water of the organic film thin formed from the stored solution for forming an organic thin film of Example 23, white dots (○) indicate the contact angle with respect to TD of the organic thin film formed from the stored solution for forming an organic thin film of Example 23, black triangles indicate the contact angle (°) with respect to water of the organic thin film formed from the stored ODS toluene solution of the comparative example, and white triangles (Δ) indicate the contact angle (°) with respect to TD of the organic thin film formed from the stored ODS toluene solution of the comparative example.

On the basis of FIG. 6, the contact angles with respect to water and TD of the organic thin films formed from the stored solution for forming an organic thin film of Example 23 demonstrated hardly any change from the contact angles with respect to water and TD of the organic thin films formed in Example 26.

The following findings were determined from the aforementioned results.

(1) Although the residual amount of ODS decreases over time for the solution for forming an organic thin film of Example 23, the amount of monosilanol formed is nearly constant.

(2) On the basis of this finding, the reaction by which monosilanol is formed by hydrolysis of ODS is an equilibrium reaction, and although several monosilanol molecules polymerize over time due to dehydration and condensation, it is thought that an amount of monosilanol is formed by hydrolysis of ODS which corresponds to the amount of monosilanol consumed.

(3) Since a satisfactory organic thin film is formed similar to the case of Example 26 even when using a stored solution of the solution for forming an organic thin film of Example 23, polymers (or oligomers) resulting from dehydration and condensation of monosilanol molecules are thought to not have a detrimental effect on organic thin film formation.

INDUSTRIAL APPLICABILITY

A fine, monolayer having few impurities can be rapidly formed by using the organic thin film forming method of the present invention. In addition, a unimolecular, uniform chemically adsorbed film having high crystallinity can be formed even on a noncrystalline substrate by using a substrate containing active hydrogen.

An organic thin film obtained according to the organic thin film forming method of the present invention is a chemically adsorbed film used to form a design pattern of electrical devices and so forth, and can be preferably applied to equipment requiring heat-resistant, weather-resistant and wear-resistant ultra-thin film coatings such as electrical products, automobiles, industrial equipment, mirrors and eyeglass lenses.

In the case of forming a chemically adsorbed film with the organic thin film forming method of the present invention, the resulting chemically adsorbed film is preferable for forming a design pattern of electrical devices and so forth. In addition, since the resulting chemically adsorbed film can also be extremely easily applied to equipment requiring heat-resistant, weather-resistant and wear-resistant ultra-thin film coatings such as electronics products, and especially electrical appliances, automobiles, industrial equipment, mirrors and eyeglass lenses, the industrial use value is high.

The invention claimed is:

1. A method for forming an organic thin film on a substrate surface comprising the successive steps of:
   obtaining an auxiliary agent for forming the organic thin film by an interaction between a first metal surfactant having at least one hydrolytic group and a compound capable of interacting with the first metal surfactant in an organic solvent;
   obtaining a solution for forming the organic thin film from the auxiliary agent and a second metal surfactant in an organic solvent; and
   contacting the substrate with the solution for forming the organic thin film;
   wherein:
   a moisture content in the solution for forming the organic thin film is adjusted or maintained to 50 to 1000 ppm;
   the auxiliary agent for forming the organic thin film contains 0.5 to 3.0 moles of the first surfactant per 1 mole of the compound capable of interacting with the first metal surfactant;
   a solid content in the auxiliary agent for forming the organic thin film in terms of the number of moles as oxide is 0.001 to 1 mole per 1 mole of the second metal surfactant;
   the first metal surfactant is a compound represented by formula (I):

$$R^1_n MX_{m-n} \qquad (I)$$

where:
   $R^1$ represents:
   an optionally substituted alkyl having 10 to 30 carbon atoms,
   an optionally substituted fluorinated alkyl group having 10 to 30 carbon atoms,
   an alkyl group having 10 to 30 carbon atoms and containing a linking group selected from —O— and —SO$_2$—, or
   a fluorinated alkyl group having 10 to 30 carbon atoms and containing a linking group selected from —O— and —SO$_2$—,
   M represents a silicon atom,
   X represents a hydroxyl group, an alkoxy group having 1 to 4 carbon atoms, or an acyloxy group having 1 to 4 carbon atoms,
   m represents the valence of M,
   n represents 1, and
   X may be the same or different when (m-n) is 2 or more;
   the compound capable of interacting with the first metal surfactant is at least one type selected from the group consisting of a metal oxide, a metal alkoxide, a partial hydrolysis product of a metal alkoxide, a silanol condensation catalyst, and an acid catalyst;
   the metal of the metal alkoxide or the partial hydrolysis product of the metal alkoxide is at least one type selected from the group consisting of titanium, zirconium, aluminum, silicon, germanium, indium, tin, tantalum, zinc, tungsten, and lead; and
   the second metal surfactant is a compound represented by formula (III):

$$R^{11}_{n1} M^1 X^1_{m1-n1} \qquad (III)$$

where:
   $R^{11}$ represents:
   an optionally substituted alkyl group having 10 to 30 carbon atoms,
   an optionally substituted fluorinated alkyl group having 10 to 30 carbon atoms,
   an alkyl group having 10 to 30 carbon atoms and containing a linking group selected from —O— and —SO$_2$—, or
   a fluorinated alkyl group having 10 to 30 carbon atoms and containing a linking group selected from —O— and —SO$_2$—,
   $M^1$ represents a silicon atom,
   $X^1$ represents a hydroxyl group, an alkoxy group having 1 to 4 carbon atoms, or an acyloxy group having 1 to 4 carbon atoms,
   $m^1$ represents the valence of M,
   $n^1$ represents 1, and
   $X^1$ may be the same or different when ($m^1$-$n^1$) is 2 or more.

2. The method according to claim 1, wherein the auxiliary agent for forming the organic thin film is obtained by mixing the first metal surfactant, the compound capable of interacting with the first metal surfactant, and water in the organic solvent.

3. The method according to claim 1, wherein the auxiliary agent for forming the organic thin film contains 1.5 to 3.0 moles of the first metal surfactant per 1 mole of the compound capable of interacting with the first metal surfactant.

4. The organic thin film forming method according to claim 1, wherein the substrate is immersed in the solution for forming the organic thin film.

5. The method according to claim 1, wherein the organic solvent is a hydrocarbon solvent or a fluorocarbon solvent.

6. The method for forming an organic thin film on a substrate surface according to claim 1, wherein:
   the solution for forming the organic thin film contains 20 to 2000 ppm of a hydroxyl group-containing compound which is a partial hydrolysis product of the first and second metal surfactants.

7. The method according to claim 6, wherein the hydrolytic group represented by X is a $C_1$-$C_6$ alkoxy group or acyloxy group.

8. The method according to claim 1, further comprising immersing the substrate in the organic solvent solution.

9. The method according to claim 1, wherein:
   the substrate is not crystalline; and
   the organic thin film is a crystalline organic thin film.

* * * * *